United States Patent
Ogawa et al.

(10) Patent No.: US 12,497,599 B2
(45) Date of Patent: Dec. 16, 2025

(54) ENZYME CAPABLE OF DEHYDROXYLATING HYDROXYL GROUP IN UROLITHIN COMPOUND

(71) Applicant: DAICEL CORPORATION, Osaka (JP)

(72) Inventors: Jun Ogawa, Kyoto (JP); Shigenobu Kishino, Kyoto (JP); Hiroaki Yamamoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 946 days.

(21) Appl. No.: 17/629,694

(22) PCT Filed: Jul. 22, 2020

(86) PCT No.: PCT/JP2020/028541
§ 371 (c)(1),
(2) Date: Jan. 24, 2022

(87) PCT Pub. No.: WO2021/015267
PCT Pub. Date: Jan. 28, 2021

(65) Prior Publication Data
US 2022/0267741 A1  Aug. 25, 2022

(30) Foreign Application Priority Data

Jul. 25, 2019 (JP) .................. 2019-136904
Feb. 14, 2020 (JP) .................. 2020-023399

(51) Int. Cl.
| | |
|---|---|
| C12N 15/74 | (2006.01) |
| C12N 1/20 | (2006.01) |
| C12N 9/02 | (2006.01) |
| C12N 15/52 | (2006.01) |
| C12P 17/06 | (2006.01) |

(52) U.S. Cl.
CPC ............ *C12N 9/0004* (2013.01); *C12P 17/06* (2013.01)

(58) Field of Classification Search
CPC ...... C12N 9/0004; C12N 1/205; C12N 15/74; C12N 9/18; C12N 9/00; C12N 15/52; C12P 17/06; C12R 2001/01; C12R 2001/145; C12R 2001/19; C07K 14/195
See application file for complete search history.

(56) References Cited

U.S. PATENT DOCUMENTS

2019/0323045 A1   10/2019   Kudoh et al.

FOREIGN PATENT DOCUMENTS

| JP | 2019-126309 A | 8/2019 |
|---|---|---|
| WO | WO 2014/147280 A1 | 9/2014 |
| WO | WO 2018/124135 A1 | 7/2018 |

OTHER PUBLICATIONS

Nakashima N. et al., "Isolation and Characterization of a Rolling-Circle-Type Plasmid from Rhodococcus erythropolis and Application of the Plasmid to Multiple-Recombinant-Protein Expression", Applied and Environmental Microbiology, Sep. 2004, vol. 70, No. 9, pp. 5557-5568. (Year: 2004).*

García-Villalba, et al., "Time Course Production of Urolithins from Ellagic Acid by Human Gut Microbiota", Journal of Agricultural and Food Chemistry, vol. 61, Aug. 28, 2013, pp. 8797-8806.

Partial Supplementary European Search Report for European Application No. 20843486.0, dated Aug. 9, 2023.

Danylec et al.,: "Gordonibacter urolithinfaciens amidohydrolase", Database EMBL [Online], Jan. 22, 2019, XP093103995, retrieved from EBI accession No. EMBL:ROT88165, Database accession No. ROT88165.

Danylec et al.,: "Gordonibacter urolithinfaciens dehydrogenase", Database EMBL [Online], Jan. 22, 2019, XP093103837, retrieved from EBI accession No. EMBL:ROT88158, Database accession No. ROT88158.

Danylec et al.,: "Gordonibacter urolithinfaciens hypothetical protein", Database EMBL [Online], Jan. 22, 2019, XP093103857, retrieved from EBI accession No. EMBL:ROT88156, Database accession No. ROT88156.

Danylec et al.,: "Gordonibacter urolithinfaciens MFS transporter", Database EMBL [Online], Jan. 22, 2019, XP093103971, retrieved from EBI accession No. EMBL:ROT88164, Database accession No. ROT88164.

Danylec et al.,: "Gordonibacter urolithinfaciens oxidoreductase", Database EMBL [Online], Jan. 22, 2019, XP093103849, retrieved from EBI accession No. EMBL:ROT88157, Database accession No. ROT88157.

Extended European Search Report for European Application No. 20843486.0, dated Dec. 4, 2023.

Pajon et al., "Gordonibacter pamelaeae 7-10-1-b Anaerobic dehydrogenases, typically selenocysteine-containing ID—CBL04579; SV 1; linear; genomic DNA; STD; PRO; 2379 BP.", Database EMBL [Online], Mar. 25, 2010, XP093103609, retrieved from EBI accession No. EMBL:CBL04579.

Pajon et al., "Gordonibacter pamelaeae 7-10-1-b hypothetical protein ID—CBL04578; SV 1; linear; genomic DNA; STD; PRO; 360 BP.", Database EMBL [Online], Mar. 25, 2010, XP093103619, retrieved from EBI accession No. EMBL:CBL04578.

(Continued)

*Primary Examiner* — Satyendra K Singh
(74) *Attorney, Agent, or Firm* — Birch, Stewart, Kolasch & Birch, LLP

(57) ABSTRACT

An object of the present disclosure is, at least, to provide an enzyme that dehydroxylates hydroxyl groups at predetermined positions of urolithins having hydroxyl groups at the predetermined positions, and the object can be solved by an enzyme having the following properties (1) and (2): (1) dehydroxylating a hydroxyl group at the 4-position of urolithins; and (2) in the presence of methyl viologen (MV), being activated by one or more components selected from the group consisting of: reduced nicotinamide adenine dinucleotide (NADH); reduced nicotinamide adenine dinucleotide phosphate (NADPH); flavin adenine dinucleotide (FAD); and flavin adenine mononucleotide (FMN).

6 Claims, 9 Drawing Sheets

Specification includes a Sequence Listing.

(56) References Cited

OTHER PUBLICATIONS

Pajon et al.,: "Gordonibacter pamelaeae 7-10-1-b hypothetical protein", Database EMBL [Online], Mar. 25, 2010, XP093103800, retrieved from EBI accession No. EMBL:CBL04576, Database accession No. CBL04576.

Pajon et al.,: "Gordonibacter pamelaeae 7-10-1-b Nitrate/nitrite transporter", Database EMBL [Online], Mar. 25, 2010, XP093103985, retrieved from EBI accession No. EMBL:CBL04587, Database accession No. CBL04587.

Pajon et al.,: "Gordonibacter pamelaeae 7-10-1-b Predicted metal-dependent hydrolase of the TIM-barrel fold", Database EMBL [Online], Mar. 25, 2010, XP093104005, retrieved from EBI accession No. EMBL:CBL04588, Database accession No. CBL04588.

Danylec et al., "Amidohydrolase [Gordonibacter urolithinfaciens]" GenBank: ROT88165.1, GenBank [online], [retrieved on Sep. 14, 2020], Nov. 16, 2018, pp. 1-2, https://www.ncbi.nlm.nih.gov/pratein/ROT88165.1.

Danylec et al., "MFS transporter [Gordonibacter urolithinfaciens]" GenBank: ROT88164.1, GenBank [online], [retrieved on Sep. 16, 2020], Nov. 16, 2018, pp. 1-2, https://www/ncbi.nlm.nih.gov/protein/ROT88164.1/.

English translation of International Preliminary Report on Patentability and Written Opinion of the International Searching Authority for International Application No. PCT/JP2020/028541, dated Feb. 3, 2022.

English translation of International Search Report for International Application No. PCT/JP2020/028541, dated Oct. 6, 2020.

Ito et al., "Identification of Urinary and Intestinal Bacterial Metabolites of Ellagitannin Geraniin in Rats", Journal of Agricultural and Food Chemistry, vol. 56, No. 2, 2008, pp. 393-400.

Martinez-Blanch, "Gordonibacter urolithinfaciens strain DSM 27213T genome assembly, chromosome: I" GenBank: LT900217.1, GenBank[online], [retrieved on Sep. 14, 2020], Oct. 13, 2017, pp. 1-2, https://www.ncbi.nlm.nih.gov/nuccore/LT900217_1/.

Pajon et al., "Gordonibacter pamelaeae 7-10-1-b draft genome" NCBI Reference Sequence: NC_021021.1, GenBank [online], [retrieved on Sep. 14, 2020], Apr. 17, 2017, pp. 1-3, https://www.ncbi.nlm.nih.gov/nuccore/479173639.

Pajon et al., "Nitrate/nitrite transporter [Gordonibacter pamelaeae 7-10-1-b]" GenBank: CBL04587.1, GenBank [online], [retrieved on Sep. 18, 2020], Feb. 27, 2015, pp. 1-2, https://www.ncbi.nlm.nih.gov/protein/CBL04587.

Pajon et al., "Predicted metal-dependent hydrolase of the TIM-barrel fold [Gordonibacter pamelaeae 7-10-1-b]" GenBank: CBL04586.1, GenBank [online], [retrieved on Sep. 14, 2020], https://www.ncbi.nlm.nih.gov/protein/295107045?sat=2&satkey=42733141.

\* cited by examiner

SEQUENCE LISTING

```
<160> NUMBER OF SEQ ID NOS: 46

<210> SEQ ID NO 1
<211> LENGTH: 800
<212> TYPE: PRT
<213> ORGANISM: Gordonibacter urolithinfaciens

<400> SEQUENCE: 1

Met Ala Asp Ser Ala Gln Ala Pro Val Gln Glu His Trp Ser Glu Thr
1               5                   10                  15

Asn Gly Lys Lys Tyr Arg Arg Gly Ser Arg Leu Pro Lys Lys Thr Asp
            20                  25                  30

Thr Arg Pro Pro Val Pro Ala Ala Glu Thr Pro Lys Val Pro Trp Thr
        35                  40                  45

Trp Glu Glu Asp Gly Met Thr Val Ile Arg Gly Thr Ala Arg Ser Ala
    50                  55                  60

Pro Gly Cys His Asn Val Cys Gly Ile Leu Ser Tyr Val Lys Asp Gly
65                  70                  75                  80

Lys Leu Val Lys Val Glu Gly Asp Pro Glu Asp Pro Tyr Asn Gln Gly
                85                  90                  95

Arg Leu Cys Ser Arg Cys Leu Cys Ile Pro Asp Tyr Val Tyr His Glu
            100                 105                 110

Asp Arg Leu Thr Lys Pro Met Lys Arg Asp Arg Ala Asp Arg Gly Lys
        115                 120                 125

Asp Lys Phe Val Glu Ile Ser Trp Asp Glu Ala Tyr Asp Ile Ile Val
    130                 135                 140

Arg Glu Phe Lys Arg Val Val Asp Thr Tyr Gly Ala Asp Lys Ile Ala
145                 150                 155                 160

Met Cys Gln Gly Thr Gly Arg Asp Ile His Gln Val Thr Arg Leu Asn
                165                 170                 175

Ala Cys Val Gly Ser Pro Asn Glu Gly Val Pro Tyr Phe Ala Gly Asn
            180                 185                 190

Ser Cys Tyr Leu Pro Arg Ile Ala Ser Met Ala Cys Met Leu Gly Gly
        195                 200                 205

Ala Cys Val Met Asp Cys Ser Gln Phe Leu Pro Gln Arg Tyr Asp Asp
    210                 215                 220

Pro Arg Tyr Thr Val Pro Glu Tyr Cys Ile Val Trp Gly His Gln Pro
```

```
                225                 230                 235                 240
            Phe Tyr Ser Asn Ala Asp Gly Phe Tyr His Trp Ile Thr Asp Leu
                            245                 250                 255
            Met Lys Arg Gly Met Lys Val Ala Val Val Asp Pro Gln Leu Thr Trp
                        260                 265                 270
            Leu Ala Ala Arg Ala Gly Glu Asp Trp Leu Arg Val Arg Pro Gly Gly
                        275                 280                 285
            Asp Gly Ala Leu Ala Met Ala Met Leu Lys Val Val Cys Asp Glu Lys
                    290                 295                 300
            Leu Tyr Asp Gln Asp Phe Cys Asp Lys Trp Val Tyr Gly Leu Glu Ala
            305                 310                 315                 320
            Val Cys Glu Arg Val Ala Glu Met Asp Leu Asp Leu Cys Glu Arg
                            325                 330                 335
            Ala Trp Val Ala Lys Glu Asp Val Gln Arg Val Ala Arg Thr Tyr Ala
                        340                 345                 350
            Ala Ser Lys Pro Ala Ala Ile Gln Trp Gly Val Ala Leu Asp Gln Gln
                        355                 360                 365
            Thr Gly Gly Gln Gln Ala Ala His Ala Ile Thr Ala Leu Trp Cys Ile
                    370                 375                 380
            Thr Gly Asn Leu Asp Val Pro Gly Gly Asn Val Met Gly Asp Ala Cys
            385                 390                 395                 400
            Trp Gly Ile Glu Gln Pro Asn Trp Thr Gly Thr Trp Gly Trp Asp Glu
                            405                 410                 415
            Leu Met Thr Glu Glu Gln Ser Lys Arg Ile Gly Val Glu Arg Tyr
                        420                 425                 430
            Pro Met Phe Ala Val Gly Phe Lys Asn Leu Ser Ser Asn Ala Thr Ile
                        435                 440                 445
            Glu Ala Trp Gln Arg Gly Glu Ile Pro Ile Arg Ala Ala Tyr Ile Val
                    450                 455                 460
            Thr Asn Asn Phe Leu Ala Thr Met Gly Ala Gln Ala Ala Gln Gln Leu
            465                 470                 475                 480
            Glu Trp Tyr Lys Gln Ile Asp Phe Ile Val Val Ser Asp Leu Phe Met
                            485                 490                 495
            Thr Pro Thr Met Met Ala Leu Ala Asp Val Val Leu Pro Ala Ala Thr
                        500                 505                 510
            Tyr Glu Glu Arg Asp Gly Phe Gly Gly Leu Asn Ala Tyr Arg Ile Ser
                        515                 520                 525
            Cys Ile Asn Lys Ala Ile Glu Pro Val Gly Asp Ser Lys Pro Asp Asn
                    530                 535                 540
            Thr Ile Phe Leu Glu Leu Gly Lys Arg Leu Thr Ala Ala Ile Lys Pro
            545                 550                 555                 560
            Glu Asn Gln Asp Ile Ala Trp Pro Trp Asp Asp Val Gln Glu Met Trp
                            565                 570                 575
            Asp Tyr Ala Leu Glu Asp Gly Gly Phe Thr Trp Asp Glu Leu Arg Glu
                        580                 585                 590
            Ser Thr Trp Lys Tyr Pro Glu Phe Lys Tyr Arg Lys Tyr Glu Thr Gly
                        595                 600                 605
            Asp Leu Arg Pro Asp Gly Gln Pro Gly Phe Arg Thr Gly Thr Gly Arg
                    610                 615                 620
            Ala Glu Ile Tyr Ser Met Val Phe His His Thr Ser Trp Ser Gly Leu
            625                 630                 635                 640
            Asp Pro Leu Pro Ser Tyr Val Glu Pro Val Glu Ser Pro Tyr Ser Ala
                            645                 650                 655
```

```
Pro Glu Asp Val Glu Glu Tyr Pro Tyr Ile Val Thr Ser Gly Ala Arg
            660                 665                 670

Val Pro His Phe Phe His Ser Glu Gln Arg Gln Val Lys Lys Leu Arg
            675                 680                 685

Ala Leu His Pro Asp Pro Leu Val Tyr Leu His Pro Asp Thr Ala Ala
            690                 695                 700

Ala Asn Gly Ile Glu Glu Gly Asp Trp Val Trp Leu Glu Asn Lys His
705                 710                 715                 720

Gly Lys Cys Lys Tyr Lys Ala Ala Phe Asn Asp Thr Tyr Asp Pro Arg
            725                 730                 735

Val Met Gln Ala Glu His Gly Trp Trp Phe Pro Glu Arg Lys Asp Ala
            740                 745                 750

Ala Glu Glu Asn Val Glu Asn Glu Gln Glu Gly Leu Phe Gly Val Leu
            755                 760                 765

Glu Ser Asn Ile Asn Asn Leu Val Pro Phe Asp Ala Gly Val Ser Gly
            770                 775                 780

Phe Gly Ser Asn Tyr Lys Ala Met Met Cys Lys Ile Arg Lys Ala Asp
785                 790                 795                 800

<210> SEQ ID NO 2
<211> LENGTH: 114
<212> TYPE: PRT
<213> ORGANISM: Gordonibacter urolithinfaciens

<400> SEQUENCE: 2

Met Ala Tyr Gln Gly Ile Leu Val Asp Val Asp Tyr Cys Thr Gly Cys
1               5                   10                  15

Glu Ala Cys Val Leu Ala Cys Gln Gln Glu His Gly Tyr Thr Glu Ala
            20                  25                  30

Gln Phe Gly Leu Lys Ile Thr Lys Leu Gly Pro Leu His Ile Asp Glu
        35                  40                  45

Ala Lys Lys Asp Tyr Gln Tyr Asp Phe Ile Pro Gln Phe Thr Lys Trp
    50                  55                  60

Cys Asp Leu Cys Ala Glu Arg Val Gly Lys Gly Lys Gln Pro Thr Cys
65                  70                  75                  80

Val Gln His Cys Gln Ala Gln Cys Leu Asp Trp Gly Asp Val Glu Asp
            85                  90                  95

Leu Ala Lys Lys Val Asp Arg Glu Lys Gln Met Ile Val Ala Ile Asn
            100                 105                 110

Glu Ala

<210> SEQ ID NO 3
<211> LENGTH: 65
<212> TYPE: PRT
<213> ORGANISM: Gordonibacter urolithinfaciens

<400> SEQUENCE: 3

Met Ala Gln Arg Phe Glu Asp Asp Phe Gly Gly Arg Ile Ala Glu Lys
1               5                   10                  15

Leu Met Asn Val Asp Val His Leu Thr Arg Asp Phe Ser Arg Ser Val
            20                  25                  30

Thr Glu Leu Glu Arg Glu Gln Gly Arg Ile Asp Trp Lys Asp Arg Cys
        35                  40                  45

Gly Ala Asn Met Lys Lys Ile Ala Glu Arg Glu Val Thr Pro Ile Tyr
    50                  55                  60
```

Arg
65

<210> SEQ ID NO 4
<211> LENGTH: 792
<212> TYPE: PRT
<213> ORGANISM: Gordonibacter urolithinfaciens

<400> SEQUENCE: 4

Met Val Glu Asn Ala Val Ala Glu Lys Asp Arg Asp Glu Ile Gly Thr
1               5                   10                  15

Ser Lys Glu Glu Asn Gln Phe Asn Phe Gly Ala Gly Lys Arg Gln Glu
            20                  25                  30

Val Asp Pro Arg Trp Lys His Pro Lys Pro Phe Gln Tyr Glu Glu Asp
        35                  40                  45

Gly Met Val Val Thr Arg Thr Ser Val Trp Ser Ala Pro Gly Cys His
    50                  55                  60

Glu Gly Cys Gly Val Leu Val Tyr Ser Asp Lys Glu Thr Gly Lys Phe
65                  70                  75                  80

Ile Lys Cys Glu Gly Asp Pro Asp Pro Tyr Asn Arg Gly Ala Leu
                85                  90                  95

Cys Pro Arg Cys Leu Ala Phe Lys Gln Val Glu Phe His Pro Asp Arg
            100                 105                 110

Ile Leu His Pro Met Lys Arg Ala Gly Glu Arg Gly Ser Gly Gln Trp
        115                 120                 125

Glu Arg Ile Thr Trp Asp Glu Ala Leu Glu Thr Cys Tyr Lys Glu Phe
    130                 135                 140

Arg Arg Ile Ser Met Thr Tyr Gly Gly Asp Ser Ile His Cys Leu Arg
145                 150                 155                 160

Gly Thr Ala Arg Asp Asn Gln Trp Gln Val Gly Arg Met Ala Asn Thr
                165                 170                 175

Phe Gly Ser Pro Asn Glu Tyr Gly Phe Leu Ser Gly Thr Ala Cys Tyr
            180                 185                 190

Leu Pro Arg Leu Ser Leu Met Ile Met Thr Tyr Gly Gly Met Leu Ile
        195                 200                 205

Ala Asp Phe Ser Gln Phe Ser Ala Leu Arg Tyr Asp Asp Pro Glu Trp
    210                 215                 220

Val Cys Pro Glu Cys Thr Ile Val Trp Gly Cys Asn Pro Thr Ile Ser
225                 230                 235                 240

Asn Pro Asp Phe Phe Met Gly His Trp Val Thr Asp Ala Met Lys Leu
                245                 250                 255

Gly Cys Lys Leu Ile Ser Val Glu Pro Arg Val Thr Trp Leu Ala Ala
            260                 265                 270

His Ala Asp Ile His Leu Gln Leu Arg Pro Gly Thr Asp Thr Gly Leu
        275                 280                 285

Ala Leu Gly Met Ile Lys Val Ile Asp Glu Asp Leu Tyr Asp His
    290                 295                 300

Asp Phe Val Glu Arg Trp Thr Tyr Gly Phe Asp Glu Leu Ala Glu Arg
305                 310                 315                 320

Ala Arg Glu Leu Ser Leu Asp Gln Val Glu Ala Met Thr Trp Val Pro
                325                 330                 335

Lys Glu Lys Ile Ile Ala Ala Ala Arg Leu Phe Ala Thr Ser Lys Pro
            340                 345                 350

Ala Asn Val Val Trp Gly Leu Ala Val Asp Met Gln Ser Gln Gly Thr
        355                 360                 365

```
Pro Cys Ala Ala Ala Ile Ala Ala Leu Trp Thr Ile Thr Gly Asn Leu
    370                 375                 380

Asp Val Pro Gly Gly Met Cys Tyr Thr Ala Ser Pro Met Gly Val Asp
385                 390                 395                 400

Gln Pro Ser Ala Gly Ala Trp Gly Ile Tyr Asp Leu Ile Asn Glu Glu
                405                 410                 415

Met Gln Lys Lys Arg Val Gly Trp Lys Glu Phe Pro Met Tyr Arg Tyr
                420                 425                 430

Gly Leu Thr Gln Ala Met Pro Asp Met Cys Leu Glu Tyr Met Glu Glu
            435                 440                 445

Gly Lys Val Lys Gly Val Trp Ile Gln Thr Ser Asn Gly Ile Ala Cys
    450                 455                 460

Met Ser Cys Glu Thr Glu Arg Trp Tyr Gln Ala Met Lys Lys Pro Glu
465                 470                 475                 480

Phe Ile Ala Ala Val Asp Ile Phe Met Thr Pro Thr Ile Gln Ser Cys
                485                 490                 495

Ala Asp Ile Val Met Pro Val Gln Thr Trp Ala Glu Lys His Ser Val
                500                 505                 510

Arg Ala His Tyr Tyr Phe Leu Ser Ala Ile Thr Gly Gly Cys Ala Ala
            515                 520                 525

Glu Gly Glu Ala Lys Ser Asp Cys Glu Ile Asn Arg Glu Leu Ala Gln
    530                 535                 540

Tyr Phe Asp Asn Asp Asp Glu Phe Asn Gln Ala Ile Gly Arg Pro Glu
545                 550                 555                 560

Gly Lys Gln His Thr Trp Pro Trp Ala Thr Glu Asp Glu Val Tyr Asp
                565                 570                 575

Glu Ile Val Ser Pro Ser Gly Phe Thr Phe His Glu Leu Met Glu His
                580                 585                 590

Gly Pro Val Tyr Gln Lys Tyr Val Tyr Lys Lys Tyr Glu Lys Gly Leu
            595                 600                 605

Met Arg Pro Asp Gly Gln Pro Gly Phe Asn Thr Pro Thr Gly Arg Ile
    610                 615                 620

Glu Phe Tyr Ser Thr Leu Phe Glu Lys Phe Gly Tyr Asp Pro Leu Pro
625                 630                 635                 640

Tyr Ile Glu Glu Pro Gly Ile Gly Pro Val Thr Thr Pro Asp Leu Tyr
                645                 650                 655

Glu Glu Tyr Pro Leu Ile Met Ile Thr Gly Ala Arg Thr Thr Ser Phe
                660                 665                 670

Phe His Ser Glu His Arg Gln Ile Pro Tyr Leu Arg Gln Leu Thr Pro
            675                 680                 685

Asp Pro Trp Val Gln Ile His Pro Arg Thr Ala Lys Asp Leu Asn Ile
    690                 695                 700

Ser Glu Gly Asp Trp Val Trp Ile Glu Asn His Arg Gly Arg Cys Arg
705                 710                 715                 720

Gln Arg Ala Arg Leu Thr Phe Glu Val His Glu Lys Glu Ile Ala Ala
                725                 730                 735

Gln His Gly Trp Trp Phe Pro Glu Gln Asp Gly Ala Glu Pro Asn Leu
            740                 745                 750

Tyr Gly Phe Arg Gln Ser Asn Ile Asn Gln Leu Leu Ala Asn Lys Pro
            755                 760                 765

Gly Thr Thr Gly Phe Gly Ala Asp Leu Lys Cys Thr Leu Cys Lys Val
    770                 775                 780
```

Tyr Arg Cys Lys Glu Glu Leu
785              790

<210> SEQ ID NO 5
<211> LENGTH: 119
<212> TYPE: PRT
<213> ORGANISM: Gordonibacter urolithinfaciens

<400> SEQUENCE: 5

Met Ala Leu Asn Gly Ile Leu Val Asp Tyr Gln Tyr Cys Thr Gly Cys
1               5                   10                  15

Tyr Ser Cys Glu Val Ala Cys Gln Ala Glu His Glu Leu Pro Leu Glu
            20                  25                  30

Gln Trp Gly Val Lys Val Met Gln Asn Gly Pro Trp Pro Val Lys Asp
        35                  40                  45

Ala Glu Gly Asn Glu Thr Asp Asn Tyr Val Tyr Asp Phe Ile Pro Ala
    50                  55                  60

Phe Thr Lys Ile Cys Asp Leu Cys Ala Asp Arg Gln Glu Lys Gly Lys
65                  70                  75                  80

Leu Pro Ser Cys Val Phe His Cys Gln Ala Lys Cys Met Glu Phe Gly
                85                  90                  95

Pro Val Asp Glu Leu Ala Lys Arg Leu Asp Ala Lys Pro Gln Gln Tyr
            100                 105                 110

Leu Trp Val Pro Pro Cys Ala
        115

<210> SEQ ID NO 6
<211> LENGTH: 186
<212> TYPE: PRT
<213> ORGANISM: Gordonibacter urolithinfaciens

<400> SEQUENCE: 6

Met Lys Arg Arg Pro Ala Val Asp Tyr Gln Lys Leu Glu Glu Gly Ile
1               5                   10                  15

Glu Lys Ala Pro Leu Ala Ser Arg Pro Ala Leu Glu Arg Leu Leu Leu
            20                  25                  30

Tyr Val Ser Ala Gly Pro Asp Val Ser Pro Asp Tyr Ala Pro Tyr Leu
        35                  40                  45

Glu Gly Ser Ala Ser Tyr Gln Asp Phe Phe Asn Ala Ile Tyr Ala Asp
    50                  55                  60

Asp Ala Gln Lys Gly Thr Ser Val Trp Ala Glu Trp Ala Ala Leu Lys
65                  70                  75                  80

Arg Lys Ser Trp Ile Gly Arg Phe Glu Pro Val Leu Ala Val Glu Asn
                85                  90                  95

Leu Arg Leu Lys Gly Asp Gly Leu Pro Val Gln Phe Thr Gly Leu
            100                 105                 110

Phe Leu Ala Pro Thr Gly Ser Arg Asp Ser Ile Ala Asn Leu Tyr Val
        115                 120                 125

Phe Glu Arg Gly Ala Phe Asn Val Glu Ala Ala Glu Phe Val Thr Ser
    130                 135                 140

Ile Gly Gly Thr Phe Ser Cys Ala Gly Tyr Asp Phe Ala Gly Ile Tyr
145                 150                 155                 160

Gly Val Tyr Lys Tyr Arg Gly Ser Val Ile Leu Glu Gln Trp Glu Ala
                165                 170                 175

Glu Arg Asp Pro Val Pro Ala Lys Lys Gly
            180                 185

<210> SEQ ID NO 7
<211> LENGTH: 2403
<212> TYPE: DNA
<213> ORGANISM: Gordonibacter urolithinfaciens

<400> SEQUENCE: 7

| | | | | | |
|---|---|---|---|---|---|
| atggccgatt | cagcccaggc | ccccgtgcag | gagcactgga | gcgagaccaa | cgggaagaag | 60 |
| taccgccgcg | gctcgcgcct | gccgaagaag | accgacacgc | gcccacccgt | gcctgctgcc | 120 |
| gagacgccga | aagtgccttg | gacgtgggag | gaggacggca | tgaccgtcat | ccgcggcacc | 180 |
| gcgcgcagcg | cgcctggatg | ccacaacgtg | tgcggcatcc | tgtcctacgt | gaaggacggc | 240 |
| aagctggtga | aagtggaggg | cgacccggag | gaccctaca | accagggacg | cctgtgcagc | 300 |
| cgctgcctct | gcatccccga | ctacgtctac | catgaggacc | gcctgaccaa | accgatgaag | 360 |
| cgcgaccgcg | ccgaccgcgg | caaggacaag | ttcgtggaga | tcagctggga | cgaggcctac | 420 |
| gacatcatcg | tgcgcgagtt | caagcgcgtc | gtcgacacgt | acggcgccga | caagatcgcc | 480 |
| atgtgccagg | gcacgggccg | cgatatccac | caggtaacgc | gcctgaacgc | ctgtgtgggc | 540 |
| tccccgaacg | agggcgtgcc | ctacttcgcc | ggcaactcgt | gctacctgcc | ccgcatcgcg | 600 |
| tcgatggcct | gcatgctggg | cggcgcctgc | gtcatggact | gctcgcagtt | cctcccccag | 660 |
| cgctacgacg | atccgcgcta | cacggtgcca | gagtactgca | tcgtgtgggg | ccaccaaccc | 720 |
| ttctacagca | acgcagacgg | cttctacggc | cattggatca | ccgacctcat | gaagcgcggc | 780 |
| atgaaggtgg | ccgtggtgga | cccgcagctc | acgtggctcg | cggcccgcgc | cggcgaggac | 840 |
| tggctgcgcg | tgcgtcccgg | cggcgacggc | gcgctggcca | tggccatgct | gaaggtcgtc | 900 |
| tgcgacgaga | agctctacga | ccaggacttc | tgcgacaagt | gggtgtacgg | cctggaagcc | 960 |
| gtgtgcgagc | gcgtggcgga | gatggacctg | gacgacctgt | gcgagagggc | ctgggtggcc | 1020 |
| aaggaggacg | tgcagcgcgt | ggcgcgcacc | tacgccgcat | cgaagcccgc | cgccatccaa | 1080 |
| tggggcgtgg | cgctcgacca | gcagacgggc | ggccagcagg | cagcgcacgc | catcacggcc | 1140 |
| ctgtggtgca | tcaccggcaa | cctcgacgtg | cccggcggca | acgtgatggg | cgacgcctgc | 1200 |
| tgggcatcg | agcagccgaa | ctggaccggc | acctggggct | gggacgagct | catgaccgag | 1260 |
| gaggagcagt | ccaagcgcat | cggcgtggag | cgctaccca | tgttcgccgt | gggcttcaag | 1320 |
| aacctgtcct | ccaacgccac | catcgaggcg | tggcagcgcg | gcgagatacc | catccgcgcg | 1380 |
| gcctacatcg | tgacgaacaa | cttcctggcc | accatgggcg | cccaggccgc | ccagcagctg | 1440 |
| gaatggtaca | agcagatcga | cttcatcgtg | gtgtccgacc | tgttcatgac | ccccaccatg | 1500 |
| atggcgctgg | ccgacgtggt | gctgcccgcc | gccacctacg | aggagcgcga | cggcttcggc | 1560 |
| gggctcaacg | cctaccgcat | cagctgcatc | aacaaggcca | tcgagcccgt | gggcgactcc | 1620 |
| aagcccgaca | acaccatctt | cctggagctg | ggcaagcgcc | tgacggcggc | catcaagccc | 1680 |
| gagaaccagg | acatcgcctg | gccttgggac | gacgtgcagg | agatgtggga | ctacgccctt | 1740 |
| gaggacggcg | gcttcacctg | ggacgagctg | cgcgagtcca | cgtggaagta | ccccgagttc | 1800 |
| aagtaccgca | agtacgagac | gggagacctg | cgccccgacg | gccagccggg | cttccgcacc | 1860 |
| gagacgggcc | gcgcggagat | ctactccatg | gtgttccacc | acacgtcgtg | gtcgggcctc | 1920 |
| gacccgctgc | cgagctacgt | cgagccggtg | gagagcccct | cagcgccccc | cgaggacgtg | 1980 |
| gaggagtacc | cctacatcgt | cacgtccggc | gcgcgcgttc | cgcacttctt | ccactccgag | 2040 |
| cagcgccagg | tcaagaagct | gcgcgccctg | caccccgacc | cgctcgtgta | cctgcacccc | 2100 |
| gacaccgcag | ccgccaacgg | aatcgaggag | ggcgactggg | tgtggctgga | gaacaagcac | 2160 |

| | |
|---|---|
| ggcaagtgca agtacaaggc cgccttcaac gacacctacg acccgcgcgt catgcaggcc | 2220 |
| gagcacggct ggtggttccc cgagcgcaag gacgcggccg aggagaacgt ggagaacgag | 2280 |
| caagagggcc tgttcggcgt gctggagtcc aacatcaaca acctcgtgcc cttcgacgcc | 2340 |
| ggcgtatcgg gcttcggctc gaactacaag gccatgatgt gcaagatccg caaggccgac | 2400 |
| tag | 2403 |

<210> SEQ ID NO 8
<211> LENGTH: 345
<212> TYPE: DNA
<213> ORGANISM: Gordonibacter urolithinfaciens

<400> SEQUENCE: 8

| | |
|---|---|
| atggcttacc agggaatttt ggtcgacgtc gactactgca ccggctgcga ggcgtgcgtg | 60 |
| ctggcctgcc agcaggaaca cggctacacc gaggcgcagt tcggcctgaa gatcacgaag | 120 |
| ctgggcccgc tgcacatcga cgaggccaag aaggactacc agtacgactt catccccag | 180 |
| ttcaccaagt ggtgcgacct gtgcgccgag cgcgtgggca agggcaagca gcccacgtgc | 240 |
| gtgcagcact gccaggccca gtgcctggac tggggagacg tggaggacct cgcgaagaag | 300 |
| gtcgaccgcg agaagcagat gatcgtcgcc atcaacgagg cgtag | 345 |

<210> SEQ ID NO 9
<211> LENGTH: 198
<212> TYPE: DNA
<213> ORGANISM: Gordonibacter urolithinfaciens

<400> SEQUENCE: 9

| | |
|---|---|
| atggcccaga gattcgagga cgatttcggc gggaggatcg ccgagaagct gatgaacgtc | 60 |
| gacgttcacc tgacgcgcga cttcagccgc tcggtcaccg agctcgaacg cgagcagggc | 120 |
| cgcatcgact ggaaggaccg ctgcggcgcc aacatgaaga agatcgcgga gcgcgaagtt | 180 |
| acaccgatct accggtaa | 198 |

<210> SEQ ID NO 10
<211> LENGTH: 2379
<212> TYPE: DNA
<213> ORGANISM: Gordonibacter urolithinfaciens

<400> SEQUENCE: 10

| | |
|---|---|
| atggtagaga cgctgtcgc ggagaaggac gcgacgaga tcggcacgtc caaggaggag | 60 |
| aaccagttca acttcggcgc cggcaagagg caggaagtgg atcctcgctg gaagcatccg | 120 |
| aagcccttcc agtacgagga ggacggcatg gtggtcaccc gcacctcggt gtggagcgcg | 180 |
| ccgggctgcc acgagggctg tggcgtgctg gtgtactccg acaaggagac cggcaagttc | 240 |
| atcaagtgcg agggcgaccc ggacgacccg tacaaccgcg gcgcgctgtg cccgaggtgc | 300 |
| ctggccttca gcaggtgga gttccacccc gaccgcatcc tgcacccat gaagcgtgcc | 360 |
| ggcgagcgcg ggagcggcca gtgggagcgc atcacgtggg acgaggcgct ggaaacctgc | 420 |
| tacaaggaat tccgtcgcat ctccatgacc tacggcggcg actccatcca ctgcctgcgc | 480 |
| ggcaccgcac gcgacaacca gtggcaggtc ggccgcatgg cgaacacgtt cggcagcccc | 540 |
| aacgagtacg gcttcctgtc cggcaccgcc tgctacctgc cccgcctgtc gctcatgatc | 600 |
| atgacctacg gcggcatgct catcgccgac ttctcgcagt tctcggcgct cgctacgac | 660 |
| gaccccgagt gggtgtgccc cgagtgcacc atcgtttggg gctgcaaccc caccatctcc | 720 |

```
aaccccgact tcttcatggg acactgggtc accgacgcca tgaagctcgg ctgcaagctc    780
atctccgtcg agccgcgcgt cacctggctc gccgcgcacg ccgacatcca tctgcagctg    840
cgccccggca ccgacacggg cctcgctctc ggcatgatca aggtcatcat cgacgaggac    900
ctctacgacc atgacttcgt ggagcgctgg acctacggct cgacgagct ggccgagcgc     960
gcccgcgagc tgtcgctgga ccaggtggag gccatgacgt gggtccccaa ggagaagatc   1020
atcgccgctg cgcgcctgtt cgccacgtcc aagccggcca acgtcgtgtg gggcctcgcc   1080
gtggacatgc agagccaggg cacgccctgc gccgccgcca tcgccgcgct gtggaccatc   1140
accggcaacc tcgacgtgcc gggcggcatg tgctacaccg cctcccccat gggcgtcgac   1200
cagccgtccg ccggcgcatg ggcatctac gacctcatca acgaggagat gcagaagaag    1260
cgcgtgggct ggaaagaatt ccccatgtac cgctacggcc tcacccaggc catgcccgac   1320
atgtgcctgg agtatatgga ggagggcaag gtcaagggcg tgtggatcca gacatccaac   1380
ggcattgcct gcatgagctg cgagaccgag cgctggtacc aggccatgaa gaagccggag   1440
ttcatcgccg ccgtggacat cttcatgacg cctaccatcc agtcgtgcgc cgacatcgtc   1500
atgccggtgc agacgtgggc cgagaagcac tccgtacgcg cccactacta cttcctgtcc   1560
gctatcacgg gcggctgcgc ggccgagggc gaggcgaagt cggactgcga gatcaaccgc   1620
gagcttgccc agtacttcga caacgacgac gagttcaacc aggccatcgg ccgccccgag   1680
ggcaagcagc acacctggcc gtgggcgacc gaggacgagg tgtacgacga gatcgtgagc   1740
ccctccggct tcacgttcca cgagctcatg gagcacggcc cggtctacca gaagtacgtg   1800
tacaagaagt acgagaaggg cctcatgcgc cccgacggcc agcccggctt caacaccccc   1860
acgggccgca tcgagttcta ctccacgctg ttcgagaagt tcggctacga cccgctgccc   1920
tacatcgagg agccgggcat cgggcccgtc accacgcccg acctgtacga ggagtacccg   1980
ctcatcatga tcacgggcgc ccgcaccacg tcgttcttcc actcggagca ccgccagatc   2040
ccctacctgc gccagctcac acccgatccg tgggtgcaga tccacccgcg cacggccaag   2100
gacctgaaca tctccgaggg cgactgggtc tggatcgaga accaccgcgg ccgctgccgc   2160
cagcgtgccc gcctcacgtt cgaggtgcac gagaaggaga tcgccgcgca gcacggctgg   2220
tggttccccg aacaggacgg cgccgaaccc aacctgtacg gcttccgcca gtccaacatc   2280
aaccagcttc tggccaacaa gcccggcacg actggcttcg gtgccgacct gaagtgcacg   2340
ctctgcaagg tgtaccgctg caaggaggag gaactgtaa                          2379

<210> SEQ ID NO 11
<211> LENGTH: 360
<212> TYPE: DNA
<213> ORGANISM: Gordonibacter urolithinfaciens

<400> SEQUENCE: 11
atggctctca acggaattct cgtcgactac cagtactgca cggggtgcta ctcgtgcgag     60
gtggcctgcc aggccagca cgagctaccg ctcgagcagt ggggcgtgaa ggtcatgcag    120
aacggcccgt ggccggtgaa ggacgccgaa ggcaacgaga cggacaacta cgtctacgac    180
ttcatcccgg cgttcacgaa gatctgcgat ttgtgcgccg accgcaggga gaagggcaag    240
ctcccctcct gcgtgttcca ctgccaggcc aagtgcatgg agttcggccc ggtggacgag    300
ctcgcgaagc gcttggacgc caagccgcag cagtacctgt gggtgccgcc ctgcgcgtag    360

<210> SEQ ID NO 12
<211> LENGTH: 561
```

<212> TYPE: DNA
<213> ORGANISM: Gordonibacter urolithinfaciens

<400> SEQUENCE: 12

```
ttgaaaagga gaccggctgt ggactaccaa aagcttgaag agggcatcga gaaggcaccg      60
ctcgcctcgc gccccgcact ggaacgcctg ctgctgtacg tgtcggcagg cccggacgta     120
tcgcccgact acgcgccgta cctggaaggc tcggcatcct accaggactt tttcaacgcc     180
atctacgccg acgacgccca gaagggcacg tcggtatggg cggagtgggc ggcgctcaaa     240
cgcaagagct ggatcggccg cttcgaaccc gtcctggccg tggagaacct gcgcctcaag     300
ggcgacgggc tgccggtgca gttcggcacg ggcctgttcc tggcccctac cggcagccgc     360
gacagcatcg cgaacctcta cgtgttcgaa cgcggcgcgt caacgtggaa gcggccgag      420
ttcgtcacgt cgatcggcgg cacgttctcc tgcgccggct acgacttcgc cggcatctac     480
ggcgtgtaca agtaccgcgg cagcgtgata ctcgagcaat gggaggccga gcgggacccc     540
gtgccagcga agaagggcta g                                              561
```

<210> SEQ ID NO 13
<211> LENGTH: 800
<212> TYPE: PRT
<213> ORGANISM: Gordonibacter pamelaeae

<400> SEQUENCE: 13

```
Met Ala Asp Ser Ala Gln Ala Pro Val Gln Glu His Trp Ser Glu Thr
1               5                   10                  15

Asn Gly Lys Lys Tyr Arg Arg Gly Ser Arg Leu Pro Lys Lys Thr Asp
            20                  25                  30

Thr Arg Pro Pro Val Pro Ala Ala Glu Thr Pro Lys Val Pro Trp Thr
        35                  40                  45

Trp Glu Glu Asp Gly Met Thr Val Ile Arg Gly Thr Ala Arg Ser Ala
    50                  55                  60

Pro Gly Cys His Asn Val Cys Gly Ile Leu Ser Tyr Val Lys Asp Gly
65                  70                  75                  80

Lys Leu Val Lys Val Glu Gly Asp Pro Glu Asp Pro Tyr Asn Gln Gly
                85                  90                  95

Arg Leu Cys Ser Arg Cys Leu Cys Ile Pro Asn Tyr Val Tyr His Glu
            100                 105                 110

Asp Arg Leu Val Lys Pro Met Lys Arg Asp Arg Ala Asp Arg Gly Lys
        115                 120                 125

Asp Lys Phe Val Glu Cys Ser Trp Asp Glu Ala Tyr Asp Ile Ile Val
    130                 135                 140

Arg Glu Phe Lys Arg Val Val Asp Thr Tyr Gly Ala Asp Lys Ile Ala
145                 150                 155                 160

Met Cys Gln Gly Thr Gly Arg Asp Ile His Gln Val Thr Arg Leu Asn
                165                 170                 175

Ala Cys Val Gly Ser Pro Asn Glu Gly Val Pro Tyr Phe Ala Gly Asn
            180                 185                 190

Ser Cys Tyr Leu Pro Arg Ile Ala Ser Met Ala Cys Met Leu Gly Gly
        195                 200                 205

Ala Cys Val Met Asp Cys Ser Gln Phe Leu Pro Gln Arg Tyr Asp Asp
    210                 215                 220

Pro Arg Tyr Thr Val Pro Lys Tyr Cys Ile Val Trp Gly His Gln Pro
225                 230                 235                 240

Phe Tyr Ser Asn Ala Asp Gly Phe Tyr Gly His Trp Ile Thr Asp Leu
```

```
                        245                 250                 255
Met Lys Arg Gly Met Lys Val Ala Val Ile Asp Pro Gln Leu Thr Trp
                260                 265                 270

Leu Ala Ala Arg Ala Gly Glu Asp Trp Leu Arg Val Arg Pro Gly Gly
                275                 280                 285

Asp Gly Ala Leu Ala Met Ala Met Leu Lys Val Val Cys Asp Glu Lys
            290                 295                 300

Leu Tyr Asp Gln Glu Phe Cys Asp Lys Trp Val Tyr Gly Leu Glu Ala
305                 310                 315                 320

Val Cys Glu Arg Val Ala Glu Met Asp Leu Asp Asp Leu Cys Glu Lys
                325                 330                 335

Ser Trp Val Ala Lys Glu Asp Val Gln Arg Val Ala Arg Thr Tyr Ala
                340                 345                 350

Ala Ser Lys Pro Ala Ala Ile Gln Trp Gly Val Ala Leu Asp Gln Gln
                355                 360                 365

Thr Gly Gly Gln Gln Ala His Ala Ile Thr Ala Leu Trp Cys Ile
            370                 375                 380

Thr Gly Asn Leu Asp Val Pro Gly Gly Asn Val Met Gly Asp Ala Cys
385                 390                 395                 400

Trp Gly Ile Glu Gln Pro Asn Trp Thr Gly Thr Trp Gly Trp Asp Glu
                405                 410                 415

Leu Met Thr Glu Glu Gln Ser Lys Arg Ile Gly Val Glu Arg Tyr
            420                 425                 430

Pro Met Phe Ala Val Gly Phe Lys Asn Leu Ser Ser Asn Ala Thr Ile
                435                 440                 445

Glu Ala Trp Gln Arg Gly Glu Val Pro Ile Arg Ala Ala Tyr Ile Val
    450                 455                 460

Thr Asn Asn Phe Leu Ala Thr Met Gly Ala Gln Ala Glu Gln Gln Leu
465                 470                 475                 480

Glu Trp Tyr Lys Gln Ile Asp Phe Ile Val Val Ser Asp Leu Phe Met
                485                 490                 495

Thr Pro Thr Met Met Ala Leu Ala Asp Val Val Leu Pro Ala Ala Thr
            500                 505                 510

Tyr Glu Glu Arg Asp Gly Phe Gly Gly Leu Asn Ala Tyr Arg Ile Ser
            515                 520                 525

Cys Ile Asn Lys Ala Ile Glu Pro Val Gly Asp Ser Lys Pro Asp Asn
530                 535                 540

Thr Ile Phe Leu Glu Leu Gly Lys Arg Leu Thr Ala Ala Ile Lys Pro
545                 550                 555                 560

Glu Asn Gln Asp Ile Ala Trp Pro Trp Asp Asp Val Gln Glu Met Trp
                565                 570                 575

Asp Tyr Ala Leu Glu Asp Gly Gly Phe Thr Trp Asp Glu Leu Arg Glu
                580                 585                 590

Ser Thr Trp Lys Tyr Pro Glu Phe Lys Tyr Arg Lys Tyr Glu Thr Gly
                595                 600                 605

Asp Leu Arg Pro Asp Gly Gln Pro Gly Phe Arg Thr Glu Thr Gly Arg
                610                 615                 620

Ala Glu Ile Tyr Ser Met Val Phe His His Thr Ser Trp Ser Gly Leu
625                 630                 635                 640

Asp Pro Leu Pro Ser Tyr Val Glu Pro Val Glu Ser Pro Tyr Ser Ala
                645                 650                 655

Pro Glu Asp Val Glu Glu Tyr Pro Tyr Ile Val Thr Ser Gly Ala Arg
                660                 665                 670
```

Val Pro His Phe Phe His Ser Glu Gln Arg Gln Ile Ala Lys Leu Arg
            675                 680                 685

Ala Leu His Pro Asp Pro Leu Val Tyr Leu His Pro Asp Thr Ala Ala
        690                 695                 700

Ala Asn Gly Ile Glu Glu Gly Asp Trp Val Trp Leu Glu Asn Lys His
705                 710                 715                 720

Gly Lys Cys Lys Tyr Lys Ala Ala Phe Asn Asp Thr Tyr Asp Pro Arg
                725                 730                 735

Val Leu Gln Ala Glu His Gly Trp Trp Phe Pro Glu Arg Lys Asp Ala
            740                 745                 750

Ala Glu Glu Asn Val Glu Asn Gln Glu Gly Leu Phe Gly Val Leu
        755                 760                 765

Glu Ser Asn Ile Asn Asn Leu Val Pro Phe Asp Ala Gly Val Ser Gly
        770                 775                 780

Phe Gly Ser Asn Tyr Lys Ala Met Met Cys Lys Ile Arg Lys Ala Asp
785                 790                 795                 800

<210> SEQ ID NO 14
<211> LENGTH: 114
<212> TYPE: PRT
<213> ORGANISM: Gordonibacter pamelaeae

<400> SEQUENCE: 14

Met Gly Tyr Leu Gly Ile Leu Val Asp Val Asp Tyr Cys Thr Gly Cys
1               5                   10                  15

Glu Ala Cys Val Leu Ala Cys Gln Gln Glu His Gly Tyr Thr Glu Arg
            20                  25                  30

Glu Phe Gly Leu Lys Ile Thr Lys Leu Gly Pro Leu His Ile Asp Glu
        35                  40                  45

Ala Lys Lys Asp Tyr Gln Tyr Asp Phe Ile Pro Gln Phe Thr Lys Trp
    50                  55                  60

Cys Asp Leu Cys Glu Glu Arg Val Gly Lys Gly Lys Gln Pro Thr Cys
65                  70                  75                  80

Val Gln His Cys Gln Ala Gln Cys Leu Asp Trp Gly Arg Val Glu Asp
                85                  90                  95

Leu Ala Lys Lys Val Asp Arg Glu Lys Gln Met Ile Val Ala Val Lys
            100                 105                 110

Gln Ala

<210> SEQ ID NO 15
<211> LENGTH: 65
<212> TYPE: PRT
<213> ORGANISM: Gordonibacter pamelaeae

<400> SEQUENCE: 15

Met Ala Gln Arg Phe Glu Asp Asp Phe Gly Gly Arg Ile Ala Glu Lys
1               5                   10                  15

Leu Met Asn Val Asp Val His Leu Thr Arg Asp Phe Ser Arg Ser Val
            20                  25                  30

Thr Glu Leu Glu Arg Glu Gln Gly Arg Ile Asp Trp Lys Asp Arg Cys
        35                  40                  45

Gly Ala Asn Met Lys Lys Ile Ala Glu Arg Glu Val Thr Pro Ile Tyr
    50                  55                  60

Arg
65

```
<210> SEQ ID NO 16
<211> LENGTH: 792
<212> TYPE: PRT
<213> ORGANISM: Gordonibacter pamelaeae

<400> SEQUENCE: 16

Met Val Glu Asn Ala Val Ala Glu Lys Asp Arg Asp Glu Ile Gly Thr
1               5                   10                  15

Ser Lys Glu Glu Asn Gln Phe Asn Phe Gly Ala Gly Lys Arg Gln Glu
                20                  25                  30

Val Asp Pro Arg Trp Lys His Pro Lys Pro Phe Gln Tyr Glu Glu Asp
            35                  40                  45

Gly Met Val Val Thr Arg Thr Ser Val Trp Ser Ala Pro Gly Cys His
    50                  55                  60

Glu Gly Cys Gly Val Leu Val Tyr Ser Asp Lys Glu Thr Gly Lys Phe
65                  70                  75                  80

Ile Lys Cys Glu Gly Asp Pro Asp Pro Tyr Asn Arg Gly Ala Leu
                85                  90                  95

Cys Pro Arg Cys Leu Ala Phe Lys Gln Val Glu Phe His Pro Asp Arg
                100                 105                 110

Ile Leu His Pro Met Arg Arg Val Gly Glu Arg Gly Ser Gly Gln Trp
            115                 120                 125

Glu Arg Ile Thr Trp Asp Glu Ala Leu Glu Thr Cys Tyr Lys Glu Phe
    130                 135                 140

Arg Arg Ile Ser Met Thr Tyr Gly Gly Asp Ser Ile His Cys Leu Arg
145                 150                 155                 160

Gly Thr Ala Arg Asp Asn Gln Trp Gln Val Gly Arg Met Ala Asn Thr
                165                 170                 175

Phe Gly Ser Pro Asn Glu Tyr Gly Phe Leu Ser Gly Thr Ala Cys Tyr
            180                 185                 190

Leu Pro Arg Leu Ser Leu Met Ile Met Thr Tyr Gly Gly Met Leu Ile
        195                 200                 205

Ala Asp Phe Ser Gln Phe Ser Ala Leu Arg Tyr Asp Asp Pro Glu Trp
    210                 215                 220

Val Cys Pro Glu Cys Thr Ile Val Trp Gly Cys Asn Pro Thr Ile Ser
225                 230                 235                 240

Asn Pro Asp Phe Phe Met Gly His Trp Val Thr Asp Ala Met Lys Leu
                245                 250                 255

Gly Cys Lys Leu Ile Ser Val Glu Pro Arg Val Thr Trp Leu Ala Ala
            260                 265                 270

His Ala Asp Ile His Leu Gln Leu Arg Pro Gly Thr Asp Thr Gly Leu
        275                 280                 285

Ala Leu Gly Met Ile Lys Val Ile Asp Glu Asp Leu Tyr Asp His
    290                 295                 300

Asp Phe Val Glu Arg Trp Thr Tyr Gly Phe Asp Glu Leu Ala Glu Arg
305                 310                 315                 320

Ala Arg Glu Leu Ser Leu Asp Gln Val Glu Ala Met Thr Trp Val Pro
                325                 330                 335

Lys Glu Lys Ile Val Ala Ala Arg Leu Phe Ala Thr Ser Lys Pro
            340                 345                 350

Ala Asn Val Val Trp Gly Leu Ala Val Asp Met Gln Ser Gln Gly Thr
        355                 360                 365

Pro Cys Ala Ala Ala Ile Ala Ala Leu Trp Thr Ile Thr Gly Asn Leu
    370                 375                 380
```

```
Asp Val Pro Gly Gly Met Cys Tyr Thr Ala Ser Pro Met Gly Val Asp
385                 390                 395                 400

Gln Pro Ser Ala Gly Ala Trp Gly Ile Tyr Asp Leu Ile Asn Glu Glu
            405                 410                 415

Met Gln Lys Lys Arg Val Gly Trp Lys Glu Phe Pro Met Tyr Arg Tyr
        420                 425                 430

Gly Leu Thr Gln Ala Met Pro Asp Met Cys Leu Glu Tyr Met Glu Glu
        435                 440                 445

Gly Lys Val Lys Gly Val Trp Ile Gln Thr Ser Asn Gly Ile Ala Cys
        450                 455                 460

Met Ser Cys Glu Thr Glu Arg Trp Tyr Gln Ala Met Lys Lys Pro Glu
465                 470                 475                 480

Phe Ile Ala Ala Val Asp Ile Phe Met Thr Pro Thr Ile Gln Ser Cys
            485                 490                 495

Ala Asp Ile Val Met Pro Val Gln Thr Trp Ala Glu Lys His Ser Val
            500                 505                 510

Arg Ala His Tyr Tyr Phe Leu Ser Ala Ile Thr Gly Ala Cys Ala Ala
        515                 520                 525

Glu Gly Glu Ala Lys Ser Asp Cys Glu Ile Asn Arg Glu Leu Ala Gln
        530                 535                 540

Tyr Phe Asp Asn Asp Asp Glu Phe Asn Gln Ala Ile Gly Arg Pro Glu
545                 550                 555                 560

Gly Lys Gln Arg Thr Trp Pro Trp Ala Thr Glu Asp Glu Val Tyr Asp
                565                 570                 575

Glu Ile Val Ser Pro Ser Gly Phe Thr Phe His Glu Leu Met Glu His
            580                 585                 590

Gly Pro Val Tyr Gln Lys Tyr Val Tyr Lys Lys Tyr Glu Lys Gly Leu
        595                 600                 605

Met Arg Pro Asp Gly Gln Pro Gly Phe Asn Thr Pro Thr Gly Arg Ile
610                 615                 620

Glu Phe Tyr Ser Thr Leu Phe Glu Lys Phe Gly Tyr Asp Pro Leu Pro
625                 630                 635                 640

Tyr Ile Glu Glu Pro Gly Ile Gly Pro Val Thr Thr Pro Asp Leu Tyr
                645                 650                 655

Glu Glu Tyr Pro Leu Ile Met Ile Thr Gly Ala Arg Ala Thr Ser Phe
            660                 665                 670

Phe His Ser Glu His Arg Gln Ile Pro Tyr Leu Arg Gln Leu Thr Pro
        675                 680                 685

Asp Pro Trp Val Gln Ile His Pro Arg Thr Ala Lys Asp Leu Asn Ile
        690                 695                 700

Ser Glu Gly Asp Trp Val Trp Ile Glu Asn His Arg Gly Arg Cys Arg
705                 710                 715                 720

Gln Arg Ala Arg Leu Thr Phe Glu Val His Glu Lys Glu Ile Ala Ala
                725                 730                 735

Gln His Gly Trp Trp Phe Pro Glu Gln Asp Gly Ala Glu Pro Asn Leu
            740                 745                 750

Tyr Gly Phe Arg Gln Ser Asn Ile Asn Gln Leu Leu Ala Asn Lys Pro
        755                 760                 765

Gly Thr Thr Gly Phe Gly Ala Asp Leu Lys Cys Thr Leu Cys Lys Val
        770                 775                 780

Tyr Arg Cys Lys Glu Glu Glu Leu
785                 790
```

<210> SEQ ID NO 17
<211> LENGTH: 119
<212> TYPE: PRT
<213> ORGANISM: Gordonibacter pamelaeae

<400> SEQUENCE: 17

```
Met Ala Met Asn Gly Ile Leu Val Asp Tyr Gln Tyr Cys Thr Gly Cys
1               5                   10                  15

Tyr Ser Cys Glu Val Ala Cys Gln Ala Glu His Glu Leu Pro Leu Glu
            20                  25                  30

Gln Trp Gly Val Lys Val Met Gln Asn Gly Pro Trp Pro Val Lys Asp
        35                  40                  45

Ala Glu Gly Asn Glu Thr Asp Ala Tyr Val Tyr Asp Phe Ile Pro Ala
    50                  55                  60

Phe Thr Lys Ile Cys Asp Leu Cys Ala Asp Arg Arg Glu Lys Gly Lys
65                  70                  75                  80

Leu Pro Ser Cys Val Phe His Cys Gln Ala Lys Cys Met Glu Phe Gly
                85                  90                  95

Pro Val Glu Glu Leu Ala Lys Arg Leu Asp Ala Lys Pro Gln Gln Tyr
            100                 105                 110

Leu Trp Val Pro Pro Cys Ala
        115
```

<210> SEQ ID NO 18
<211> LENGTH: 180
<212> TYPE: PRT
<213> ORGANISM: Gordonibacter pamelaeae

<400> SEQUENCE: 18

```
Met Asp Tyr Gln Glu Leu Lys Glu Gly Ile Asp Gln Ala Pro Leu Ala
1               5                   10                  15

Ser Arg Ala Thr Leu Glu Arg Leu Leu Leu Tyr Val Ser Ala Gly Pro
            20                  25                  30

Gly Val Ser Pro Asp Tyr Ala Pro Tyr Leu Glu Gly Ala Ala Ser Tyr
        35                  40                  45

His Asp Phe Phe Asn Ala Val Tyr Thr Asp Asp Ala Gln Lys Gly Thr
    50                  55                  60

Ser Val Trp Ala Gly Trp Ala Ala Leu Lys Arg Lys Ser Trp Ile Gly
65                  70                  75                  80

Arg Phe Glu Pro Asp Leu Ala Val Glu Asn Leu Arg Leu Lys Gly Asp
                85                  90                  95

Gly Leu Pro Val Gln Phe Gly Thr Gly Leu Phe Leu Ala Pro Thr Gly
            100                 105                 110

Ser Arg Asp Asn Ile Ala Asn Leu Tyr Val Phe Gln Arg Gly Ala Phe
        115                 120                 125

Asn Val Glu Ala Ala Glu Phe Val Thr Ser Ile Gly Gly Thr Phe Ser
    130                 135                 140

Cys Ala Gly Tyr Asp Phe Ala Gly Ile Tyr Gly Val Tyr Lys Tyr Arg
145                 150                 155                 160

Gly Ser Val Ile Leu Glu Gln Trp Glu Ala Glu Arg Ala Pro Val Pro
                165                 170                 175

Thr Lys Lys Gly
        180
```

<210> SEQ ID NO 19
<211> LENGTH: 2403

```
<212> TYPE: DNA
<213> ORGANISM: Gordonibacter pamelaeae

<400> SEQUENCE: 19
ctagtcggcc ttgcggatct tgcacatcat ggccttgtag ttcgagccga agcccgacac      60
gccggcgtcg aagggcacga ggttgttgat gttggactcc aacacgccga acaggccctc     120
ctgctcgttc tccacgttct cctcggccgc gtctttgcgc tcggggaacc accagccgtg     180
ctcggcctgc aaaacgcgcg ggtcgtaggt gtcgttgaag gcggccttgt acttgcactt     240
gccgtgcttg ttctccagcc acacccagtc gccctcctcg atgccgttgg cggccgcggt     300
gtcgggatgc aggtacacga gcgggtcggg gtgcagggcg cgcagcttcg cgatttggcg     360
ctgctcggag tggaagaagt gcggcacgcg ggcgccggac gtgacgatgt aggggtactc     420
ctccacatcc tcgggcgcgc tgtagggcgct ctccaccggc tccacgtagc tcggcagcgg     480
gtcgaggccc gaccacgagg tgtggtggaa caccatggag tagatctccg cgcggcccgt     540
ctcggtgcgg aagcccggct ggccgtcggg gcgcaggtcg cccgtctcgt acttgcggta     600
cttgaactcg gggtacttcc acgtggactc gcgcagctcg tcccacgtga agccgccgtc     660
ctccagcgcg tagtcccaca tctcctgcac gtcgtcccag gccaggcga tgtcctggtt     720 ctcgggcttg atggccgccg tcaggcgctt gcccagctcc aggaagatgg tgttgtcggg     780
cttggagtcg cccacgggct cgatggcctt gtttatgcag ctgatgcggt aggcgttcag     840
cccgccgaag ccgtcgcgct cctcgtaggt ggccgccggc agcaccacgt cggctagcgc     900
catcatggtg ggggtcatga acaggtcgga caccacgatg aagtcgatct gcttgtacca     960
ttccagctgc tgctccgcct gcgcgcccat ggtggccagg aagttgttcg tcacgatgta    1020
ggccgcgcgg atgggcacct cgccgcgctg ccacgcctcg atggtggcgt tggaggacag    1080
gttcttgaag cccacggcga acatggggta gcgctccacg ccgatgcgct tggactgctc    1140
ctcctcggtc atgagctcgt cccagcccca ggtgccggtc cagttcggct gctcgatgcc    1200
ccagcacgcg tcgcccatga cgttgccgcc gggcacgtcg aggttgccgg tgatgcacca    1260
cagggccgtg atggcgtgcg cggcctgctg gccgcccgtc tgctggtcca gcgccacgcc    1320
ccactggatg gcggcgggct tcgacgcggc gtaggtgcgg gcgacgcgct gcacgtcctc    1380
cttggcaacc catgacttct cgcacagatc gtccaggtcc atctcggcca cgcgctcgca    1440
cacggcttcc aggccgtaga cccacttgtc gcagaactcc tggtcgtaga gcttctcgtc    1500
gcagacgacc ttcagcatgg ccatggccag cgcgccgtcg ccgccggggc gcacgcgtag    1560
ccagtcctcg ccggcgcggg ccgcgagcca cgtgagctgc gggtcaatca cggccacctt    1620
catgccgcgc ttcatgaggt cggtgatcca gtggccgtag aagccgtcgg cgttgctgta    1680
gaagggctgg tggccccaca cgatgcagta cttgggcacc gtgtagcgcg ggtcgtcgta    1740
gcgctggggg aggaactgcg agcagtccat gacgcaggcg ccgcccagca tgcaggccat    1800
cgacgcgatg cggggcaggt agcacgagtt gccggcgaag tagggcacgc cctcgttcgg    1860
gctgcccacg caggcgttca ggcgtgtcac ctgatggatg tcgcggcccg tgccctggca    1920
catggctatc ttgtcggcgc cgtaagtgtc cacgacgcgc ttgaactcgc gcacgatgat    1980
gtcgtaggcc tcgtcccacg agcattccac gaacttgtcc ttgccgcggt cggcgcggtc    2040
gcgcttcatg ggcttgacca ggcggtcctc atggtacacg tagttcggga tgcagaggca    2100
gcggctgcac aggcgcccct ggttgtaggg gtcctccggg tcgccctcca ccttcaccag    2160
cttgccgtcc ttcacgtagg acaggatgcc gcacacgttg tggcatcccg gcgcgctgcg    2220
```

```
cgcggtgccg cggatcacgg tcatgccgtc ctcctcccac gtccaaggca ccttcggcgt    2280
ctcggcggcg ggcacgggcg ggcgcgtgtc ggtcttcttc ggcaggcgcg agccgcggcg    2340
gtacttcttc ccgttggtct cgctccagtg ctcctgcacg ggtgcctggg ctgaatcggc    2400
cat                                                                 2403

<210> SEQ ID NO 20
<211> LENGTH: 345
<212> TYPE: DNA
<213> ORGANISM: Gordonibacter pamelaeae

<400> SEQUENCE: 20
ctacgcctgc ttgacggcga cgatcatctg cttctcgcgg tcgaccttct tcgcgaggtc      60
ctccacacgg ccccagtcca ggcactgggc ctggcagtgc tgcacgcagg tgggctgctt     120
gcccttgccc acgcgctctt cgcacaaatc gcaccacttg gtgaactggg ggatgaagtc     180
gtactggtag tccttcttgg cttcgtcgat gtgcagcggg cccagcttcg tgatcttcag     240
gccgaactcg cgctcggtgt agccgtgctc ctgctggcag gccagcacgc acgcctcgca     300
gccggtgcag tagtccacgt cgaccaaaat tccaaggtat cccat                    345

<210> SEQ ID NO 21
<211> LENGTH: 198
<212> TYPE: DNA
<213> ORGANISM: Gordonibacter pamelaeae

<400> SEQUENCE: 21
ttaccggtag atcggcgtga cttcgcgctc cgcgatcttc ttcatgttgg cgccgcagcg      60
gtctttccag tcgatgcggc cctgctcgcg ctcgagctcg gtgaccgagc ggctgaagtc     120
gcgcgtcagg tgaacgtcga cgttcatcag cttctcggcg atcctcccgc cgaagtcgtc     180
ctcgaatctc tgggccat                                                  198

<210> SEQ ID NO 22
<211> LENGTH: 2379
<212> TYPE: DNA
<213> ORGANISM: Gordonibacter pamelaeae

<400> SEQUENCE: 22
atggtagaga acgctgtcgc ggagaaggac cgcgacgaga tcggcacgtc caaggaggag      60
aaccagttca acttcggcgc cggcaagagg caggaggtgg atccgcgctg gaagcacccc     120
aaacccttcc agtacgagga ggacggcatg gtggtcaccc gcacctcggt gtggagcgcg     180
ccgggctgcc acgagggctg cggcgtgctg gtgtactccg acaaggagac cggcaagttc     240
atcaagtgcg agggcgaccc ggacgacccg tacaaccgcg cgcgctgtg ccccaggtgc     300 ctggccttca gcaggtgga gttccatccc gaccgcatcc tgcaccccat gaggcgcgtg     360
ggcgagcgcg gaagcggcca gtgggagcgc atcacgtggg acgaggcgct ggaaacctgc     420
tacaaggagt tccgccgcat ctccatgacc tacgcggcg actccatcca ctgcctgcgc     480
ggcaccgccc gcgacaacca gtggcaggtc ggccgcatgg cgaacacgtt cggcagcccc     540
aacgagtacg gcttcctgtc cggcaccgcc tgctacctgc ccgcctgtc gctcatgatc     600 atgacctacg gcggcatgct catcgccgac ttctcgcagt tctcggcgct gcgctacgac     660
gaccccgagt gggtgtgccc cgagtgcacc atcgtctggg gctgcaaccc caccatctcc     720
aaccccgact tcttcatggg ccactgggtg accgacgcca tgaagctcgg ttgcaagctc     780
atcagcgtgg agccgcgcgt cacgtggctc gccgcgcacg ccgacatcca cctgcagctg     840
```

```
cgccccggca ccgacacggg cctcgcgctc ggcatgatca aggtcatcat cgacgaggac    900
ctctacgacc acgacttcgt ggagcgctgg acctacggct cgacgagct ggccgagcgc    960 gcccgcgagc tgtcgctcga ccaggtggag gccatgacgt gggttcccaa ggagaagatc   1020
gtggccgccg cgcgcctgtt cgccacgtcc aagccggcca acgtcgtgtg gggactcgcc   1080
gttgacatgc agagccaggg cacgccctgc gccgccgcca tcgcggcgct gtggaccatc   1140
accggcaacc tcgacgtgcc gggcggcatg tgctacaccg cctcgcccat gggcgtggac   1200
cagcccctcc gccggcgcctg ggcatctac gacctcatca acgaggagat gcagaagaag   1260
cgcgtgggct ggaaagagtt ccccatgtac cgctacggcc tcacccaggc catgcccgac   1320
atgtgcctag agtacatgga ggagggcaag gtcaagggcg tgtggatcca cgtccaac    1380 ggcatcgcct gcatgagctg cgagaccgag cgctggtacc aggccatgaa gaagcccgag   1440
ttcatcgccg ccgtggacat cttcatgacg cccaccatcc agtcgtgcgc cgacatcgtc   1500
atgccggtgc agacctgggc cgagaagcac tcggtacgcg cgcactacta cttcctctcc   1560
gccatcacgg gcgcctgcgc ggccgagggc gaggcgaagt cggactgcga gatcaaccgc   1620
gagctcgcgc agtacttcga caacgacgac gagttcaacc aggccatcgg ccgccccgag   1680
ggcaagcagc gcacctggcc gtgggcgacc gaggacgagg tgtacgacga gatagtgagc   1740
ccctccggct tcacgttcca cgagctcatg gagcatggcc cggtctacca gaagtacgtg   1800
tacaagaagt acgagaaggg cctcatgcgc cccgacggtc agcccggctt caacaccccc   1860
accggccgca tcgagttcta ctccacgctg ttcgagaagt tcggctacga cccgctgccc   1920
tacatcgagg agccgggcat cgggcccgtc accacgcccg acctctacga ggagtacccg   1980
ctcatcatga tcacgggcgc ccgcgccacg tcgttcttcc actcggagca ccgccagatc   2040
ccctacctgc gccagctcac gcccgaccg tgggtgcaga tccacccgcg cacggcgaag   2100
gacctcaaca tctccgaggg cgactgggtg tggatcgaga accaccgcgg ccgctgccgc   2160
cagcgcgccc gcctcacctt cgaggtgcac gagaaggaga tcgccgcaca gcacggctgg   2220
tggttccccg agcaggacgg cgccgagccg aacctgtacg gcttccgcca gtccaacatc   2280
aaccagctgc tcgccaacaa gcccggcacc accggcttcg cgccgatct gaagtgcacg   2340 ctctgcaagg tgtaccgctg caaggaggag gaactgtaa                         2379

<210> SEQ ID NO 23
<211> LENGTH: 360
<212> TYPE: DNA
<213> ORGANISM: Gordonibacter pamelaeae

<400> SEQUENCE: 23
ctacgcgcag ggcggtaccc acaggtactg ctgcggcttg gcgtccaggc gcttcgcgag    60
ctcttccacc gggccgaact ccatgcactt ggcctggcag tggaacacgc aggaggggag   120
cttgcccttc tcccggcggt cggcgcacag atcgcagatc ttcgtgaacg cggggatgaa   180
gtcgtagacg taagcatccg tctcgttgcc ctcggcgtcc ttcaccggcc acgggccgtt   240
ctgcatgacc ttcacgcccc actgttcgag cggcagctcg tgctcggcct ggcaggccac   300
ctcgcacgag tagcaccccg tgcagtactg gtagtcgacg agaattccgt tcatggccat   360

<210> SEQ ID NO 24
<211> LENGTH: 543
<212> TYPE: DNA
<213> ORGANISM: Gordonibacter pamelaeae
```

<400> SEQUENCE: 24

```
ctagcccttc ttcgtcggca cgggcgcgcg ctcggcctcc cattgctcca gtatcacgct      60
gccgcggtac ttgtacacgc cgtagatgcc ggcgaagtcg tagccggcgc aggagaacgt     120
gccgccgatg gacgtgacga actcggccgc ctcgacgttg aacgcgccgc gttggaacac     180
gtagaggttc gcgatgttgt cgcggcttcc cgtgggggcc aggaacaggc ccgtgccgaa     240
ctgcaccggc agcccgtcgc ccttgaggcg caggttctcc acggccaggt cgggctcgaa     300
gcgtccgatc cagctctttc gcttgagcgc agcccacccc gcccacaccg acgtgccctt     360
ctgggcgtcg tcggtgtaga cggcgttgaa gaagtcatgg taggatgccg cgccttccag     420
gtacggcgcg taatcgggcg atacgcccgg gcccgccgac acgtacagca gcaggcgctc     480
cagcgtggca cgcgaggcga gcggcgcctg gtcgattccc tctttcagct cttggtagtc     540
cat                                                                   543
```

<210> SEQ ID NO 25
<211> LENGTH: 489
<212> TYPE: PRT
<213> ORGANISM: Gordonibacter urolithinfaciens

<400> SEQUENCE: 25

```
Met Ser Asn Pro Asn Ala Ala Val Ala Ala Arg Glu Ala Lys Pro Val
1               5                   10                  15

Glu Lys Thr Pro Ser Tyr Ala Trp Pro Cys Leu Ile Thr Ser Val Leu
            20                  25                  30

Ala Gly Ile Ala Leu Val Phe Ala Trp Gln Trp Leu Pro Gly Ile Thr
        35                  40                  45

Phe Pro Val Phe Lys Asn Trp Leu Ala Glu Asn Asn Ala Leu Phe Ala
    50                  55                  60

Asn Pro Ala Asn Phe Glu Leu Met Ser Asn Val Met Gly Leu Val Pro
65                  70                  75                  80

Ile Gly Ala Leu Ile Met Ala Leu Pro Ala Ser Tyr Leu Val Arg Lys
                85                  90                  95

Ile Gly Pro Lys Ala Ala Thr Val Ala Gly Leu Ala Leu Gly Ala Val
            100                 105                 110

Gly Thr Ala Val Ser Ala Val Phe Val Gly Asp Asn Phe Tyr Ala Phe
        115                 120                 125

Leu Val Gly Arg Phe Ile Leu Gly Val Ala Leu Ala Thr Thr Ile Val
    130                 135                 140

Ala Gly Pro Thr Cys Val Ser Val Trp Phe Pro Asp Ala Thr Arg Gly
145                 150                 155                 160

Arg Ala Met Ala Ile Trp Ser Ile Trp Ala Pro Val Gly Ile Phe Val
                165                 170                 175

Ile Asn Phe Ile Gly Asn Asn Val Phe Glu Met Ala Gly Ser Asp Met
            180                 185                 190

Val Ala Phe Gln Trp Ile Trp Val Ala Val Val Phe Ala Val
        195                 200                 205

Ile Phe Ala Ile Val Phe Arg Glu Pro Arg Glu Asn Glu Arg Ser Gln
    210                 215                 220

Val Ser Pro Glu Arg Lys Ser Phe Lys Glu Val Leu Pro Phe Phe Lys
225                 230                 235                 240

Ser Arg Gln Leu Trp Cys Leu Ile Leu Met Phe Ala Ile Tyr Asn Tyr
                245                 250                 255

Val Asn Tyr Gly Phe Ser Gln Tyr Leu Lys Thr Trp Met Gln Thr Pro
```

|  |  |  |  | 260 |  |  |  | 265 |  |  |  | 270 |  |
|---|---|---|---|---|---|---|---|---|---|---|---|---|---|
| Glu | Leu | Leu | Gly | Gly | Leu | Gly | Trp | Asp | Ala | Ala | Ala | Gly | Leu | Trp |
|  |  | 275 |  |  |  |  | 280 |  |  |  |  | 285 |  |  |

Gly Gly Leu Ile Cys Ala Cys Gly Ala Leu Ala Pro Ile Gly Gly Leu
            290                 295                 300

Ile Leu Asp Lys Thr Pro Arg Asp Lys Lys Tyr Leu Cys Val Val Val
305                 310                 315                 320

Gly Ile Leu Phe Leu Ala Leu Ala Ser Ala Thr Phe Ser Gln Val Thr
                    325                 330                 335

Phe Phe Leu Pro Tyr Val Val Phe Phe Cys Ala Gly Asn Met Leu Leu
                340                 345                 350

Asn Ala Cys Cys Arg Pro Leu Val Pro Thr Leu Val Phe Lys Gly Gly
                355                 360                 365

Ala Thr Ala Val Ala Phe Gly Leu Ser Phe Leu Thr Leu Gly Gln Tyr
            370                 375                 380

Ala Gly Gln Met Phe Thr Ser Tyr Val Met His Pro Phe Ser Asp Thr
385                 390                 395                 400

Leu Thr Ala Ala Ser Asn Val Ala Ile Glu Ala Lys Gln Ala Val Leu
                    405                 410                 415

Ala Ser Gly Gly Thr Pro Ala Asp Phe Gly Pro Ala Ile Ala Gln Ala
                420                 425                 430

Ala Gln Glu Ala Ala Ala Gly Ile His Val Asp Pro Met Leu Ala
            435                 440                 445

Val Tyr Ala Leu Val Pro Val Ser Ile Val Gly Ile Leu Leu Ala Phe
450                 455                 460

Gly Val Lys Pro Ser Lys Lys Gln Ala Ala Ser Ala Pro Ala Gly Lys
465                 470                 475                 480

Pro Ala Asp Glu Ala Ala Ala Gln His
                485

<210> SEQ ID NO 26
<211> LENGTH: 1470
<212> TYPE: DNA
<213> ORGANISM: Gordonibacter urolithinfaciens

<400> SEQUENCE: 26

| atgagcaatc | cgaatgccgc | cgtagcggca | agggaagcca | aacctgttga | gaagacgccg | 60 |
| tcgtacgcct | ggccatgcct | catcacgtcg | gtcctggccg | gcatcgcgct | ggtcttcgcc | 120 |
| tggcagtggc | tgccgggcat | cacgttcccg | gtgttcaaga | actggctggc | cgagaacaac | 180 |
| gcgctgttcg | ccaacccggc | caacttcgag | ctgatgtcga | acgtcatggg | cctcgtgcct | 240 |
| atcggcgcgc | tgatcatggc | cctgcccgcc | tcgtacctgg | tgcgcaagat | cggcccgaaa | 300 |
| gccgcgaccg | tcgccggcct | cgcgctcggc | gccgtcggca | cggccgtgag | cgccgtcttc | 360 |
| gtgggcgaca | acttctacgc | gttcctcgtg | gggcgcttca | ttctgggcgt | ggccctggcc | 420 |
| accaccatcg | tcgcaggccc | cacctgcgtg | tcggtgtggt | ccccgatgc | cacgcgcggg | 480 |
| cgcgccatgg | ccatctggtc | catctgggcg | cccgtgggca | tcttcgtcat | caacttcatc | 540 |
| ggcaacaacg | tgttcgagat | ggcgggcagc | gacatggtgg | cgttccagtg | gatctgggtc | 600 |
| gctgtcatcg | tcgtgttcgc | cgtgatcttc | gccatcgtgt | tccgcgagcc | gcgcgagaac | 660 |
| gagcggtcgc | aggtgtctcc | cgagcgcaag | tccttcaaag | aggtccttcc | gttcttcaag | 720 |
| agccgccagc | tgtggtgcct | gatcctcatg | ttcgccatct | acaactacgt | caactacggc | 780 |
| ttcagccagt | acctgaagac | ctggatgcaa | acccccgagc | tgctgggcgg | cctgggctgg | 840 |

-continued

```
gatgcggcgg ccgccggcct gtggggcggc ctgatctgcg cgtgcggcgc gctggccccc      900
atcggcggct tgatcctcga caagacgccc agggataaga agtacctctg cgtcgtggtg      960
ggcatcctgt tcctggcgct cgcatccgcc acgttctcgc aggtcacgtt cttcctcccc     1020
tacgtcgtgt tcttctgcgc cggcaacatg ctgctcaatg cctgctgccg cccgctcgtg     1080
ccgacgctcg tgttcaaggg cggcgccacg gccgtggcct tcggcttgtc gttcctgacg     1140
ctgggccagt acgcgggcca gatgttcacg agctacgtca tgcatccgtt cagcgacacg     1200
ctgaccgccg cctccaatgt ggccatcgag gccaagcagg ccgtgctcgc ttccggcggc     1260
accccggccg acttcggccc cgccatcgca caagcggccc aggaggccgc cgccgctggt     1320
atccacgtcg accctatgct tgccgtgtat gcgctcgtgc ccgtgagcat cgtgggcatc     1380
ctactcgcct tcggcgtgaa gccctctaag aagcaggccg cgagcgctcc cgccggcaaa     1440
cccgcagacg aggcagccgc acagcactaa                                      1470
```

<210> SEQ ID NO 27
<211> LENGTH: 514
<212> TYPE: PRT
<213> ORGANISM: Gordonibacter pamelaeae

<400> SEQUENCE: 27

```
Val Arg Pro Ser Arg His Asn Pro Ser Thr Pro Cys Lys Glu Ala Ser
1               5                   10                  15

Asp Glu Arg Gly Glu Thr Met Ser Asn Pro Ala Ala Thr Ala Asn
            20                  25                  30

Gly Ala Pro Ala Ala Lys Pro Val Glu Lys Thr Pro Ser Tyr Ala Trp
        35                  40                  45

Pro Cys Leu Ile Val Ser Leu Leu Ala Ala Val Gly Ile Val Phe Ala
    50                  55                  60

Trp Met Trp Leu Pro Gly Ile Thr Phe Pro Val Phe Lys Asn Trp Leu
65                  70                  75                  80

Ala Glu Asn Asn Ala Phe Phe Ala Asn Pro Ala Asn Phe Gly Leu Leu
                85                  90                  95

Ser Asn Val Met Gly Leu Val Pro Ile Gly Ala Leu Ile Met Ala Leu
            100                 105                 110

Pro Thr Thr Ile Leu Val Arg Lys Phe Gly Ala Lys Ala Thr Thr Ile
        115                 120                 125

Ile Gly Val Gly Cys Ala Val Val Gly Ser Ala Ile Ser Ala Ala Phe
    130                 135                 140

Val Gly Ser Asn Phe Tyr Val Phe Leu Ala Gly Arg Phe Ile Leu Gly
145                 150                 155                 160

Leu Gly Leu Ser Thr Thr Val Val Ser Gly Pro Thr Cys Val Ser Met
                165                 170                 175

Trp Phe Pro Asp Ala Thr Arg Gly Arg Ala Met Ala Ile Trp Ser Cys
            180                 185                 190

Trp Ala Pro Val Gly Ile Phe Leu Ser Asn Phe Val Asn Asp Gly Val
        195                 200                 205

Tyr His Leu Val Gly Ser Asn Met Ala Asn Leu Gln Trp Val Trp Val
    210                 215                 220

Ala Val Ala Ala Val Phe Gly Ile Leu Phe Ala Val Val Phe Arg Asp
225                 230                 235                 240

Pro Arg Glu Asn Glu Arg Ser Gln Val Ser Pro Glu Arg Lys Pro Leu
                245                 250                 255
```

```
Lys Ala Val Leu Lys Phe Phe Lys Ser Arg Gln Leu Trp Cys Leu Ile
                260                 265                 270

Ile Met Phe Ala Ile Phe Asn Tyr Met Asn Tyr Ala Phe Ser Gln Tyr
            275                 280                 285

Leu Lys Thr Trp Leu Gln Thr Pro Glu Ala Leu Gly Gly Phe Gly Trp
        290                 295                 300

Asp Ala Thr Thr Ala Gly Leu Trp Gly Gly Leu Ile Val Ala Cys Gly
305                 310                 315                 320

Ala Leu Ala Pro Leu Gly Gly Leu Ile Leu Asp Lys Thr Pro Lys Ser
                325                 330                 335

Lys Lys Tyr Leu Cys Val Val Gly Ile Leu Gly Leu Thr Ile Cys
            340                 345                 350

Ser Ala Leu Ala Phe His Ala Glu Phe Phe Ile Pro Tyr Val Ile Phe
                355                 360                 365

Phe Cys Ile Gly Asn Met Met Leu Asn Ala Cys Cys Arg Pro Leu Val
        370                 375                 380

Pro Thr Phe Val Phe Lys Gly Gly Ala Thr Ala Val Ala Phe Gly Leu
385                 390                 395                 400

Ser Phe Leu Thr Leu Gly Gln Tyr Ala Gly Gln Ile Val Thr Ser Tyr
                405                 410                 415

Ala Leu Ala Pro Phe Asn Glu Gly Leu Thr Ala Ala Ser Asn Val Ala
                420                 425                 430

Ile Asn Ala Lys Gln Ala Val Leu Ala Ser Gly Gly Thr Pro Ala Asp
            435                 440                 445

Phe Gly Pro Ala Ile Gly Gln Ala Val Gln Glu Ala Met Ala Gln Gly
        450                 455                 460

Ile His Val Asp Pro Met Leu Ala Phe Trp Ala Leu Val Pro Ile Gly
465                 470                 475                 480

Val Val Gly Cys Leu Leu Ala Phe Gly Val Lys Pro Ser Lys Lys Gln
                485                 490                 495

Ala Ala Gly Ala Pro Ala Ala Lys Pro Ala Glu Gly Glu Ala Ala Ala
                500                 505                 510

Gln His

<210> SEQ ID NO 28
<211> LENGTH: 1545
<212> TYPE: DNA
<213> ORGANISM: Gordonibacter pamelaeae

<400> SEQUENCE: 28
ttagtgttgc gcagccgcct cgccttcggc aggcttggcg gcggggcgc cggcggcctg      60 cttcttggac ggtttcacgc cgaacgcgag caggcagccc acgacgccga tggggacgag     120
tgcccagaag gcgagcatcg gatccacatg gatgccctgc gccatggcct cctgcacggc     180
ctggccaatg gccgggccga agtcggccgg ggtgccgccg gaggcgagca cggcctgctt     240
ggcgttgatg gccacgttgg aggccgcggt gaggccctcg ttgaagggcg cgagcgcgta     300
gctcgttacg atctggccgg cgtactggcc gagcgtcagg aacgacaggc cgaacgcgac     360
ggcggtagcg ccgcccttga acacgaacgt gggcacgagc gggcggcagc aggcattgag     420
catcatgttg ccgatgcaga agaagatgac gtacgggatg aagaactcgg cgtggaaggc     480
caacgcagag cagatggtga gtcccaggat gcccacgacg acgcacaggt acttcttgga     540
tttcggcgtt ttgtcgagga tgaggccgcc aagcggggcc agcgctccgc aggcgacgat     600
caggccgccc caaaggccgg cggtcgtggc atcccagccg aagccgccga gcgcttcggg     660
```

```
cgtctgcagc cacgtcttga ggtactggct gaacgcgtag ttcatgtagt tgaagatggc    720
gaacatgata atgaggcacc acagttggcg gctcttgaag aacttgagca cggccttgag    780
cggcttgcgc tcgggcgaca cctgggagcg ctcgttctcg cgcgggtcgc ggaacacgac    840
ggcgaacagg atgccgaaca cggcggccac ggcgacccat acccactgga ggttcgccat    900
attggagccc accagatggt acacgccgtc gttcacgaag ttcgacagga agattcccac    960
gggcgcccag cacgaccaaa tggccatggc gcgtccgcgc gtagcgtccg gaaccacat   1020 ggaaacgcag gtgggaccgg acacgacggt ggtggacaga cccaggccca gaatgaagcg   1080
gccggccagg aacacgtaga agttgctgcc cacgaacgcc gcgctgatgg cgctgccgac   1140
gaccgcgcag cccacgccga tgatcgtggt ggccttcgcg ccgaacttgc gcacgagaat   1200
ggtggtgggc agcgccatga tcagcgcgcc gatgggcacg agacccatga cgttggacag   1260
caggccgaag ttggctggat ttgcgaagaa cgcgttgttc tcggccagcc agttcttgaa   1320
caccgggaac gtgatgcccg gaagccacat ccacgcgaac acgatgccca cggccgccaa   1380
gagcgacacg atgaggcacg gccacgcgta ggatggcgtc ttctccacgg gcttggccgc   1440
gggtgcgccg ttggctgtgg cagcagcagg attgctcata gtttcccctc tttcatcgga   1500
cgcctccttg caaggcgttg acggattgtg ccgggaaggg cgcac                  1545
```

<210> SEQ ID NO 29
<211> LENGTH: 352
<212> TYPE: PRT
<213> ORGANISM: Gordonibacter urolithinfaciens

<400> SEQUENCE: 29

```
Met Ala Asp Asn Lys Val Ile Asp Ile Asn Met His Phe Leu Pro Thr
1               5                   10                  15

Asp Leu Phe Thr Asn Glu Glu Val Leu Asn Gly Phe Leu Tyr Ser Ala
            20                  25                  30

Pro Ile Thr Met Gly Leu Lys Ala Tyr Arg Gly Lys Thr Pro Asp Gly
        35                  40                  45

Ala Lys Asp Gln Ile Val Leu Ala Thr Glu Asp Gly Lys Asp Ile Leu
    50                  55                  60

Asn Tyr Val Glu Gly Asp Tyr Thr Leu Glu Thr Lys Leu Arg Ala Met
65                  70                  75                  80

Asp Glu Val Gly Val Asp Ile Ala Leu Leu Arg Met Pro Val Trp Gln
                85                  90                  95

Glu Trp Leu Pro Leu Asp Met Cys Lys Ile Val Asn Asp Gln Ala Ala
            100                 105                 110

Glu Met Cys Arg Gln Ser Glu Gly Arg Leu Tyr Ala Asn Ala Val Leu
        115                 120                 125

Pro Pro Trp Gly Arg Lys Glu Asp Ile Tyr Glu Leu Glu Arg Cys Leu
    130                 135                 140

Gly Asp Leu Gly Met Val Gly Val Gln Phe Ala Cys Cys Tyr Gly Asp
145                 150                 155                 160

Lys Phe Leu Asp Asp Glu Leu Phe Lys Pro Tyr Leu Lys Val Leu Asn
                165                 170                 175

Asp Lys Lys Val Pro Cys Ala Ile His His Thr Pro Gly Gln Asn Ser
            180                 185                 190

Phe Gly Asn Phe Ala Asp Tyr Thr Pro Leu Arg Arg Glu Leu Gly Arg
        195                 200                 205

Ile His Val Gln Ala Thr Ala Val Gly Arg Glu Val Tyr Ser Gly Met
```

```
                    210                 215                 220
Phe Asp Glu Phe Pro Asp Leu Lys Phe Ile His Thr Met Phe Gly Gly
225                 230                 235                 240

Asn Trp Phe Ala Leu Lys Asp Leu Leu Ala Pro His Val Ser Val Lys
                245                 250                 255

Lys Lys Glu Ala Met Asn Arg Leu Ala Thr Asn Val Asp Arg Glu Ala
                260                 265                 270

Tyr Asp Arg Tyr Leu Ala Asn Asn Ile Tyr Phe Asp Met Thr His Pro
            275                 280                 285

Met Ser Trp Ser Lys Asp Gln Leu Glu Leu Ala Val Lys Thr Cys Gly
            290                 295                 300

Ala Asp His Leu Leu Leu Gly Ser Ser Phe Pro Val Phe Tyr Glu Trp
305                 310                 315                 320

Met Ala Arg Ser Val Gly Ser Val Lys Ala Leu Asp Val Thr Gln Glu
                325                 330                 335

Glu Lys Asp Leu Met Leu Gly Gly Asn Ala Ala Lys Leu Phe Asn Leu
                340                 345                 350

<210> SEQ ID NO 30
<211> LENGTH: 1059
<212> TYPE: DNA
<213> ORGANISM: Gordonibacter urolithinfaciens

<400> SEQUENCE: 30
atggcagaca caaggtcat cgacatcaac atgcacttcc tgcccaccga cctgttcacg     60
aacgaggagg tgctcaacgg ctttctgtac tccgccccca tcaccatggg gctcaaggcc    120
taccgcggca agacgcccga cggcgccaag accagatcg tgcttgccac cgaggacggc     180
aaggacatcc tgaactacgt ggagggcgac tacacgctgg agacgaagct ccgcgccatg    240
gacgaggtgg gcgttgacat cgcgcttctg cgcatgccgg tgtggcagga atggctgccg    300
ctcgacatgt gcaagatcgt gaacgaccag gccgccgaga tgtgccgtca gtcggaaggg    360
cgcctgtacg ccaacgccgt gctgccgccg tggggccgca aggaggatat ctacgagctg    420
gagcgctgcc tgggcgacct cggcatggtg gcgtgcaat cgcctgctg ctacggcgac      480 aagttcctcg acgacgagct gttcaagccc tacctgaagg tgctcaacga caagaaggtg    540
ccctgcgcca tccaccatac gcccggacag aactcgttcg caacttcgc cgactacacg     600 cccctgcgac gcgagctcgg ccgtatccac gtgcaggcca ccgcagtggg ccgcgaggtg    660
tactcgggca tgttcgacga gttccccgac ctcaagttca tccacacgat gttcggcggc    720
aactggttcg cgctcaagga cctgctcgcc ccgcacgtgt cggtgaagaa gaaggaggct    780
atgaaccgcc tggccaccaa cgtcgaccgc gaggcgtacg accgctacct agccaacaac    840
atctacttcg acatgacgca ccccatgagc tggagcaagg accagctcga gctcgccgtg    900
aagacgtgcg gcgccgacca cctgcttctg ggctcttcgt tccccgtgtt ctacgagtgg    960
atggcccgct cggtgggctc ggtgaaggcc ctcgacgtca cgcaggagga gaaggacctc   1020
atgctgggcg gcaacgcggc gaagctgttc aacctgtag                          1059

<210> SEQ ID NO 31
<211> LENGTH: 352
<212> TYPE: PRT
<213> ORGANISM: Gordonibacter pamelaeae

<400> SEQUENCE: 31

Met Ala Asp Asn Lys Val Ile Asp Ile Asn Met His Phe Leu Pro Thr
```

```
  1               5                  10                  15
Asp Leu Phe Thr Asn Glu Glu Val Leu Asn Gly Phe Leu Tyr Ser Ala
                 20                  25                  30

Pro Ile Thr Met Gly Leu Lys Ala Tyr Arg Gly Lys Thr Pro Asp Gly
                 35                  40                  45

Ala Lys Asp Gln Ile Val Leu Ala Thr Glu Asp Gly Lys Asp Ile Leu
 50                  55                  60

Asn Tyr Val Glu Gly Asp Tyr Thr Leu Glu Thr Lys Leu Arg Ala Met
 65                  70                  75                  80

Asp Glu Val Gly Val Asp Ile Ala Leu Leu Arg Met Pro Val Trp Gln
                 85                  90                  95

Glu Trp Leu Pro Leu Asp Met Cys Arg Ile Val Asn Asp Gln Ala Ala
                100                 105                 110

Glu Met Cys Arg Gln Ser Glu Gly Arg Leu Tyr Ala Asn Ala Val Leu
                115                 120                 125

Pro Pro Trp Gly Arg Lys Glu Asp Ile Tyr Glu Leu Glu Arg Cys Leu
                130                 135                 140

Gly Glu Leu Gly Met Val Gly Val Gln Phe Ala Cys Cys Tyr Gly Asp
145                 150                 155                 160

Lys Phe Leu Asp Asp Glu Leu Phe Lys Pro Tyr Leu Lys Val Leu Asn
                165                 170                 175

Asp Lys Lys Val Pro Cys Ala Ile His His Thr Pro Gly Gln Asn Ala
                180                 185                 190

Phe Gly Asn Phe Ala Asp Tyr Thr Pro Leu Arg Arg Glu Leu Gly Arg
                195                 200                 205

Ile His Val Gln Ala Thr Ala Val Gly Arg Glu Val Tyr Ser Gly Met
                210                 215                 220

Phe Asp Glu Phe Pro Asp Leu Lys Phe Ile His Thr Met Phe Gly Gly
225                 230                 235                 240

Asn Trp Phe Ala Leu Lys Asp Ile Leu Ala Pro His Val Ser Lys Gln
                245                 250                 255

Lys Lys Glu Ala Met Asn Arg Leu Ala Thr Asn Val Asp Arg Glu Ala
                260                 265                 270

Tyr Asp Arg Tyr Leu Ala Asn Asn Ile Tyr Phe Asp Met Thr His Pro
                275                 280                 285

Met Ser Trp Ser Lys Asp Gln Leu Glu Leu Ala Val Lys Thr Cys Gly
                290                 295                 300

Ala Asp His Leu Leu Leu Gly Ser Ser Phe Pro Val Phe Tyr Glu Trp
305                 310                 315                 320

Met Ala Arg Ser Val Gly Ser Val Lys Ala Leu Asp Val Ser Gln Glu
                325                 330                 335

Glu Lys Asp Leu Met Leu Gly Gly Asn Ala Ala Lys Leu Phe Asn Leu
                340                 345                 350
```

<210> SEQ ID NO 32
<211> LENGTH: 1059
<212> TYPE: DNA
<213> ORGANISM: Gordonibacter pamelaeae

<400> SEQUENCE: 32
atggctgaca caaggtcat cgacatcaac atgcacttcc tgcccaccga cctgttcacg     60
aacgaggagg tgctcaacgg ctttctgtac tccgcgccca tcaccatggg gctcaaggcc    120
taccgcggca agacgcccga cggcgccaag gaccagatcg tgctggccac cgaggacggc    180

-continued

```
aaggacatcc tgaactacgt ggagggcgac tacacgctgg agacgaagct gcgcgccatg    240
gacgaggtgg gcgttgacat cgcgcttctg cgcatgccgg tgtggcagga atggctgccg    300
ctcgacatgt gcaggatcgt gaacgaccag gccgccgaga tgtgccgcca gtcggagggg    360
cgtctgtacg ccaatgccgt gctgccgccg tggggccgca aggaggacat ctacgagctg    420
gagcgctgcc tgggcgagct gggcatggtg gtgtgcagt tcgcctgctg ctacggcgac    480
aagttcctcg acgacgagct gttcaagccc tacctcaaag tgctcaacga caagaaggtg    540
ccctgcgcca tccaccacac gcccggccag aacgcgttcg gcaacttcgc cgactacacg    600
ccgctgcgcc gcgagctcgg ccgcatccac gtgcaggcca ccgcggtggg ccgcgaggtg    660
tactccggca tgttcgacga gttccccgac ctcaagttca tccacacgat gttcggcggc    720
aactggttcg cgctcaagga cattttggca ccgcacgttt cgaagcagaa gaaggaggcc    780
atgaaccgcc tggccaccaa cgtcgaccgc gaggcgtacg accgctatct cgccaacaac    840
atctacttcg acatgacgca ccccatgagc tggagcaagg accagctgga gctcgccgtg    900
aagacgtgcg gcgccgacca cctgctgctg ggctcgtcgt tcccggtgtt ctacgagtgg    960
atggcccgct cggtgggatc ggtgaaggcg ctcgacgttt cgcaggagga aaggacctc   1020 atgctgggcg gcaacgcggc gaagctgttc aacctgtag                          1059
```

<210> SEQ ID NO 33
<211> LENGTH: 42
<212> TYPE: DNA
<213> ORGANISM: Artificial Sequence
<220> FEATURE:
<223> OTHER INFORMATION: primer 33

<400> SEQUENCE: 33

```
aaaggatcca tgagcaatcc gaatgccgcc gtagcggcaa gc                        42
```

<210> SEQ ID NO 34
<211> LENGTH: 42
<212> TYPE: DNA
<213> ORGANISM: Artificial Sequence
<220> FEATURE:
<223> OTHER INFORMATION: primer 34

<400> SEQUENCE: 34

```
gttgaattct tagtgctgtg cggctgcctc gtctgcgggt tt                        42
```

<210> SEQ ID NO 35
<211> LENGTH: 43
<212> TYPE: DNA
<213> ORGANISM: Artificial Sequence
<220> FEATURE:
<223> OTHER INFORMATION: primer 35

<400> SEQUENCE: 35

```
gccggatccc atggcagaca acaaggtcat cgacatcaac atg                       43
```

<210> SEQ ID NO 36
<211> LENGTH: 42
<212> TYPE: DNA
<213> ORGANISM: Artificial Sequence
<220> FEATURE:
<223> OTHER INFORMATION: primer 36

<400> SEQUENCE: 36

```
tatgaattcc tacaggttga acagcttcgc cgcgttgccg cc                        42
```

```
<210> SEQ ID NO 37
<211> LENGTH: 42
<212> TYPE: DNA
<213> ORGANISM: Artificial Sequence
<220> FEATURE:
<223> OTHER INFORMATION: primer 37

<400> SEQUENCE: 37
gccggatcca tggcagacaa caaggtcatc gacatcaaca tg                          42

<210> SEQ ID NO 38
<211> LENGTH: 42
<212> TYPE: DNA
<213> ORGANISM: Artificial Sequence
<220> FEATURE:
<223> OTHER INFORMATION: primer 38

<400> SEQUENCE: 38
tatgaattcc tacaggttga acagcttcgc cgcgttgccg cc                          42

<210> SEQ ID NO 39
<211> LENGTH: 51
<212> TYPE: DNA
<213> ORGANISM: Artificial Sequence
<220> FEATURE:
<223> OTHER INFORMATION: uroA1_f

<400> SEQUENCE: 39
catcaccata tgggaattat ggccgattca gcccaggccc ccgtgcagga g                51

<210> SEQ ID NO 40
<211> LENGTH: 48
<212> TYPE: DNA
<213> ORGANISM: Artificial Sequence
<220> FEATURE:
<223> OTHER INFORMATION: uroA1_r

<400> SEQUENCE: 40
agagatctaa gcttgctagt cggccttgcg gatcttgcac atcatggc                    48

<210> SEQ ID NO 41
<211> LENGTH: 48
<212> TYPE: DNA
<213> ORGANISM: Artificial Sequence
<220> FEATURE:
<223> OTHER INFORMATION: uroA2_r

<400> SEQUENCE: 41
agagatctaa gcttgctacg cctcgttgat ggcgacgatc atctgctt                    48

<210> SEQ ID NO 42
<211> LENGTH: 48
<212> TYPE: DNA
<213> ORGANISM: Artificial Sequence
<220> FEATURE:
<223> OTHER INFORMATION: uroA3_r

<400> SEQUENCE: 42
agagatctaa gcttgttacc ggtagatcgg tgtaacttcg cgctccgc                    48

<210> SEQ ID NO 43
<211> LENGTH: 49
<212> TYPE: DNA
<213> ORGANISM: Artificial Sequence
<220> FEATURE:
<223> OTHER INFORMATION: uroB1_f
```

```
<400> SEQUENCE: 43
catcaccata tgggaattat ggtagagaac gctgtcgcgg agaaggacc            49

<210> SEQ ID NO 44
<211> LENGTH: 48
<212> TYPE: DNA
<213> ORGANISM: Artificial Sequence
<220> FEATURE:
<223> OTHER INFORMATION: uroB1_r

<400> SEQUENCE: 44
agagatctaa gcttgttaca gttcctcctc cttgcagcgg tacacctt             48

<210> SEQ ID NO 45
<211> LENGTH: 48
<212> TYPE: DNA
<213> ORGANISM: Artificial Sequence
<220> FEATURE:
<223> OTHER INFORMATION: uroB2_r

<400> SEQUENCE: 45
agagatctaa gcttgctacg cgcagggcgg cacccacagg tactgctg             48

<210> SEQ ID NO 46
<211> LENGTH: 48
<212> TYPE: DNA
<213> ORGANISM: Artificial Sequence
<220> FEATURE:
<223> OTHER INFORMATION: uroB3_r

<400> SEQUENCE: 46
agagatctaa gcttgctagc ccttcttcgc tggcacgggg tcccgctc             48
```

ENZYME CAPABLE OF DEHYDROXYLATING HYDROXYL GROUP IN UROLITHIN COMPOUND

TECHNICAL FIELD

The present disclosure relates to an enzyme that dehydroxylates hydroxyl groups of urolithins.

BACKGROUND ART

Urolithins such as urolithin A and urolithin C are known as intestinal metabolites of ellagic acid derived from, inter alia, ellagitannins included in berries such as pomegranates, raspberries, blackberries, cloudberries, strawberries, and walnuts.

For synthesizing these urolithins, a method has been reported in which 2-bromo-5-methoxybenzoic acid is used as a starting material and converted to 2-bromo-5-hydroxybenzoic acid through demethylation, which is then reacted with resorcinol to form urolithin A (Non-Patent Literature 1). However, this type of chemical synthesis is not suitable in use involving urolithins as part of the materials for functional food products, including beverages and supplements.

It is known that, after ellagitannins and ellagic acids are consumed, those are metabolized by intestinal microflora and converted into urolithins. In recent years, a microorganism belonging to the species *Gordonibacter urolithinfaciens* and a microorganism belonging to the species *Gordonibacter pamelaeae* have been discovered as enterobacteria that produce urolithin C, which is a type of urolithin, from ellagic acid, and a method has been reported in which these enterobacteria are used to produce urolithin C through fermentation of ellagic acid (Patent Document 1 and Non-Patent Literature 1).

PRIOR ART DOCUMENTS

Patent Document

Patent Document 1: WO 2014/147280

Non-Patent Literature

Non-Patent Literature 1: J. Agric. Food Chem., 56, 393-400 (2008)

SUMMARY OF THE INVENTION

Problems to be Solved by the Invention

An object of the present disclosure is, at least, to provide an enzyme that dehydroxylates hydroxyl groups at predetermined positions of urolithins having hydroxyl groups at the predetermined positions.

Means for Solving the Problems

Through proteome analysis of the specific strain of *Gordonibacter urolithinfaciens*, the present inventors discovered that, when the microorganisms are cultured in a culture medium containing ellagic acid, proteins with significantly high expression levels will be obtained, in contrast to a case where the microorganisms are cultured in a culture medium that does not contain ellagic acid.

The present inventors also purified an enzyme that catalyzes a reaction in which the hydroxyl group at the 4-position of urolithins having a hydroxyl group at the 4-position is dehydroxylated from the predetermined strain, and then subjected the enzyme to proteome analysis, and the present inventors found the result that the purified enzyme that was obtained matched some of the proteins of which expression level increased significantly when the microorganism were cultured in a culture medium containing ellagic acid. The present inventors then introduced a gene that would encode for the enzyme thereof into different types of microorganism, and thereby successfully expressed the enzyme and identified the function of the gene.

It was also discovered that in the vicinity of the genome of the gene encoding the enzyme, a gene that encodes an enzyme having homology with the abovementioned gene and that catalyzes a reaction of dehydroxylating the 10-position hydroxyl group of urolithins having a hydroxyl group at the 10-position, as well as a gene that encodes ellagic acid lactonase, which hydrolyzes lactones of ellagic acid to produce urolithin M5, and a gene that encodes a urolithin transporter are present.

The present disclosure includes the following aspects.

<1> An enzyme having the following properties (1) and (2):
  (1) dehydroxylating a hydroxyl group at the 4-position of urolithins; and
  (2) in the presence of methyl viologen (MV), being activated by one or more components selected from the group consisting of: reduced nicotinamide adenine dinucleotide (NADH); reduced nicotinamide adenine dinucleotide phosphate (NADPH); flavin adenine dinucleotide (FAD); and flavin adenine mononucleotide (FMN).

<2> The enzyme according to <1>, having the following properties (3) and (4):
  (3) having an optimum pH of 5.5 or higher and 7.5 or less; and
  (4) having a SDS-PAGE result that includes a band indicating a molecular weight of 81,000 or greater and 99,000 or less.

<3> The enzyme according to <1> or <2>, having the following property (5):
  (5) having an optimum temperature of 37° C. or higher and 50° C. or lower.

<4> The enzyme according to any one of <1> to <3>, being derived from a microorganism belonging to the genus *Gordonibacter*.

<5> The enzyme according to <4>, wherein the microorganism belonging to the genus *Gordonibacter* is one or more selected from the group consisting of: a microorganism belonging to *Gordonibacter urolithinfaciens*; a microorganism belonging to *Gordonibacter pamelaeae*; and a microorganism belonging to *Gordonibacter faecihominis*.

<6> The enzyme according to any one of <1> to <5>, comprising:
  an amino acid sequence represented by SEQ ID NO: 1, and an amino acid sequence represented by SEQ ID NO: 2; or
  an amino acid sequence represented by SEQ ID NO: 13, and an amino acid sequence represented by SEQ ID NO: 14.

<7> The enzyme according to any one of <1> to <6>, comprising:
  an amino acid sequence represented by SEQ ID NO: 1, an amino acid sequence represented by SEQ ID NO: 2, and an amino acid sequence represented by SEQ ID NO: 3; or an amino acid sequence represented by SEQ ID NO: 13, an amino acid sequence represented by SEQ ID NO: 14, and an amino acid sequence represented by SEQ ID NO: 15.

<8> A polynucleotide comprising:
a base sequence represented by SEQ ID NO: 7, and a base sequence represented by SEQ ID NO: 8; or
a base sequence represented by SEQ ID NO: 19, and a base sequence represented by SEQ ID NO: 20.

<9> A polynucleotide comprising:
a base sequence represented by SEQ ID NO: 7, a base sequence represented by SEQ ID NO: 8, and a base sequence represented by SEQ ID NO: 9; or
a base sequence represented by SEQ ID NO: 19, a base sequence represented by SEQ ID NO: 20, and a base sequence represented by SEQ ID NO: 21.

<10> A recombinant vector comprising the polynucleotide according to <8> or <9>.

<11> A transformant, in which the polynucleotide according to <8> or <9> is expressively retained, or the vector according to <10> is expressively retained.

<12> The transformant according to <11>, of which host is a microorganism belonging to the genus *Rhodococcus*.

<13> A method for producing a protein encoded by the polynucleotide according to <8> or <9>, the method comprising culturing the transformant according to <11> or <12>.

<14> A method for dehydroxylating a hydroxyl group at the 4-position of urolithins, the method comprising the following Step (I):
Step (I): bringing one or more components selected from the following (i) to (iv) into contact with urolithins having a hydroxyl group at the 4-position, so as to dehydroxylate the hydroxyl group at the 4-position:
(i) the enzyme according to any one of <1> to <7>;
(ii) a protein encoded by the polynucleotide according to <8> or <9>;
(iii) a microorganism that produces the enzyme according to (i) above or the protein according to (ii) above; and
(iv) a treated product of the microorganism according to (iii) above.

<15> The method according to <14>, wherein the urolithins are urolithin M5, urolithin D, or urolithin E; and products produced by the dehydroxylation of the hydroxyl group at the 4-position of the urolithins are urolithin M6, urolithin C, and urolithin M7, respectively.

<16> An enzyme having the following properties (1) and (2):
(1) dehydroxylating a hydroxyl group at the 10-position of urolithins; and
(2) in the presence of methyl viologen (MV), being activated by one or more components selected from the group consisting of: reduced nicotinamide adenine dinucleotide (NADH); reduced nicotinamide adenine dinucleotide phosphate (NADPH); flavin adenine dinucleotide (FAD); and flavin adenine mononucleotide (FMN).

<17> The enzyme according to <16>, having the following properties (3) and (4):
(3) having an optimum pH of 5.0 or higher and 7.0 or less; and
(4) having an optimum temperature of 37° C. or higher and 42° C. or lower.

<18> The enzyme according to <16> or <17>, being derived from a microorganism belonging to the genus *Gordonibacter*.

<19> The enzyme according to <18>, wherein the microorganism belonging to the genus *Gordonibacter* is one or more selected from the group consisting of: a microorganism belonging to *Gordonibacter urolithinfaciens*; a microorganism belonging to *Gordonibacter pamelaeae*; and a microorganism belonging to *Gordonibacter faecihominis*.

<20> The enzyme according to any one of <16> to <19>, comprising:
an amino acid sequence represented by SEQ ID NO: 4, and an amino acid sequence represented by SEQ ID NO: 5; or
an amino acid sequence represented by SEQ ID NO: 16, and an amino acid sequence represented by SEQ ID NO: 17.

<21> The enzyme according to any one of <16> to <20>, comprising:
an amino acid sequence represented by SEQ ID NO: 4; an amino acid sequence represented by SEQ ID NO: 5; and an amino acid sequence represented by SEQ ID NO: 6; or
an amino acid sequence represented by SEQ ID NO: 16; an amino acid sequence represented by SEQ ID NO: 17; and an amino acid sequence represented by SEQ ID NO: 18.

<22> A polynucleotide comprising:
a base sequence represented by SEQ ID NO: 10, and a base sequence represented by SEQ ID NO: 11; or
a base sequence represented by SEQ ID NO: 22, and a base sequence represented by SEQ ID NO: 23.

<23> The polynucleotide according to <22>, comprising:
a base sequence represented by SEQ ID NO: 10, a base sequence represented by SEQ ID NO: 11, and a base sequence represented by SEQ ID NO: 12; or
a base sequence represented by SEQ ID NO: 22, a base sequence represented by SEQ ID NO: 23, and a base sequence represented by SEQ ID NO: 24.

<24> A recombinant vector comprising the polynucleotide according to <22> or <23>.

<25> A transformant, in which the polynucleotide according to <22> or <23> is expressively retained, or the vector according to <24> is expressively retained.

<26> The transformant according to <25>, of which host is a microorganism belonging to the genus *Rhodococcus*.

<27> A method for producing a protein encoded by the polynucleotide according to <22> or <23>, the method comprising culturing the transformant according to <25> or <26>.

<28> A method for producing the enzyme according to any one of <16> to <21>, the method comprising culturing the microorganism belonging to the genus *Gordonibacter*.

<29> The method according to <28>, wherein the microorganism belonging to the genus *Gordonibacter* is one or more selected from the group consisting of: a microorganism belonging to *Gordonibacter urolithinfaciens*; a microorganism belonging to *Gordonibacter pamelaeae*; and a microorganism belonging to *Gordonibacter faecihominis*.

<30> A method for dehydroxylating a hydroxyl group at the 10-position of urolithins, the method comprising the following Step (I):
Step (I): bringing one or more components selected from the following (i) to (iv) into contact with urolithins having a hydroxyl group at the 10-position, so as to dehydroxylate the hydroxyl group at the 10-position;
(i) the enzyme according to any one of <16> to <21>;
(ii) a protein encoded by the polynucleotide according to <22> or <23>;
(iii) a microorganism that produces the enzyme according to (i) above or the protein according to (ii) above; and (iv) a treated product of the microorganism according to (iii) above.

<31> The method according to <30>, wherein the urolithins are urolithin M5, urolithin M6, or urolithin M7; and products produced by the dehydroxylation of the hydroxyl group at the 10-position of the urolithins are urolithin D, urolithin C, and urolithin A, respectively.

<32> A method for producing urolithin C, the method comprising the following Steps (I) to (III):

Step (I): allowing a microorganism having an ability to produce urolithin M5 from ellagic acid to produce urolithin M5 from ellagic acid;

Step (II): bringing one or more components selected from the following (i) to (iv) into contact with the urolithin M5, so as to produce urolithin M6:
(i) the enzyme according to any one of <1> to <7>;
(ii) a protein encoded by the polynucleotide according to <8> or <9>;
(iii) a microorganism that produces the enzyme according to (i) above or the protein according to (ii) above; and
(iv) a treated product of the microorganism according to (iii) above; and Step (III): bringing one or more components selected from the following (v) to (viii) into contact with the urolithin M6, so as to produce urolithin C:
(v) the enzyme according to any one of <16> to <21>;
(vi) a protein encoded by the polynucleotide according to <22> or <23>;
(vii) a microorganism that produces the enzyme according to (v) above or the protein according to (vi) above; and
(viii) a treated product of the microorganism according to (vii) above.

<33> A method for producing urolithin C, the method comprising the following Steps (I) to (III):

Step (I): allowing a microorganism having an ability to produce urolithin M5 from ellagic acid to produce urolithin M5 from ellagic acid;

Step (II): bringing one or more components selected from the following (i) to (iv) into contact with the urolithin M5, so as to produce urolithin D:
(i) the enzyme according to any one of <16> to <21>;
(ii) a protein encoded by the polynucleotide according to <22> or <23>;
(iii) a microorganism that produces the enzyme according to (i) above or the protein according to (ii) above; and
(iv) a treated product of the microorganism according to (iii) above; and Step (III): bringing one or more components selected from the following (v) to (viii) into contact with the urolithin D, so as to produce urolithin C:
(v) the enzyme according to any one of <1> to <7>;
(vi) a protein encoded by the polynucleotide according to <8> or <9>;
(vii) a microorganism that produces the enzyme according to (v) above or the protein according to (vi) above; and
(viii) a treated product of the microorganism according to (vii) above.

<34> A method for producing urolithin A, the method comprising the following Step (I):

Step (I): allowing a microorganism having an ability to produce urolithin A from urolithin C to produce urolithin A from the urolithin C produced by the production method according to <32> or <33>.

<35> A protein, comprising:
an amino acid sequence represented by SEQ ID NO: 25; or
an amino acid sequence represented by SEQ ID NO: 27.

<36> A polynucleotide, comprising:
a base sequence represented by SEQ ID NO: 26; or
a base sequence represented by SEQ ID NO: 28.

<37> A recombinant vector comprising the polynucleotide according to <36>.

<38> A transformant, in which the polynucleotide according to <36> is expressively retained, or the vector according to <37> is expressively retained.

<39> A method for producing a protein encoded by the polynucleotide according to <36>, the method comprising culturing the transformant according to <38>.

<40> A method for promoting uptake of ellagic acid into a cell of the transformant according to <38> from outside the cell, the method comprising the following Step (I):

Step (I): bringing the transformant according to <38> into contact with ellagic acid.

<41> A method for producing urolithin M5, the method comprising the following Step (I):

Step (I): bringing the transformant according to <38>, wherein host of the transformant is a microorganism having an ability to produce urolithin M5 from ellagic acid, into contact with ellagic acid, so as to produce urolithin M5 from the ellagic acid.

<42> A method for producing urolithin C, the method comprising the following Step (I):

Step (I): bringing the transformant according to <38>, wherein host of the transformant is a microorganism having an ability to produce urolithin C from ellagic acid, into contact with ellagic acid, so as to produce urolithin C from the ellagic acid.

<43> A method for producing urolithin A, the method comprising the following Step (I) and Step (II):

Step (I): bringing the transformant according to <38>, wherein host of the transformant is a microorganism having an ability to produce urolithin C from ellagic acid, into contact with ellagic acid, so as to produce urolithin C from the ellagic acid; and Step (II): allowing a microorganism having an ability to produce urolithin A from urolithin C to produce urolithin A from the urolithin C.

<44> A protein, comprising
an amino acid sequence represented by SEQ ID NO: 29; or
an amino acid sequence represented by SEQ ID NO: 31.

<45> A polynucleotide, comprising
a base sequence represented by SEQ ID NO: 30; or
a base sequence represented by SEQ ID NO: 32.

<46> A recombinant vector comprising the polynucleotide according to <45>.

<47> A transformant, in which the polynucleotide according to <45> is expressively retained, or the vector according to <46> is expressively retained.

<48> A method for producing a protein encoded by the polynucleotide according to <45>, the method comprising culturing the transformant according to <47>.

<49> A method for producing urolithin M5, the method comprising the following Step (I):

Step (I): bringing the transformant according to <47> into contact with ellagic acid, so as to produce urolithin M5 from the ellagic acid.

<51> A method for producing urolithin A, the method comprising the following Step (I) and Step (II):

Step (I): bringing the transformant according to <47>, wherein host of the transformant is a microorganism having an ability to produce urolithin C from urolithin M5, into contact with ellagic acid, so as to produce urolithin M5 from the ellagic acid, and producing urolithin C from the urolithin M5; and Step (II): allowing a microorganism having an ability to produce urolithin A from urolithin C to produce urolithin A from the urolithin C.

Effect of the Invention

The present disclosure, at least, achieves an effect of providing an enzyme that dehydroxylates hydroxyl groups at predetermined positions of urolithins having hydroxyl groups at the predetermined positions.

MODE FOR CARRYING OUT THE INVENTION

Figure 1:
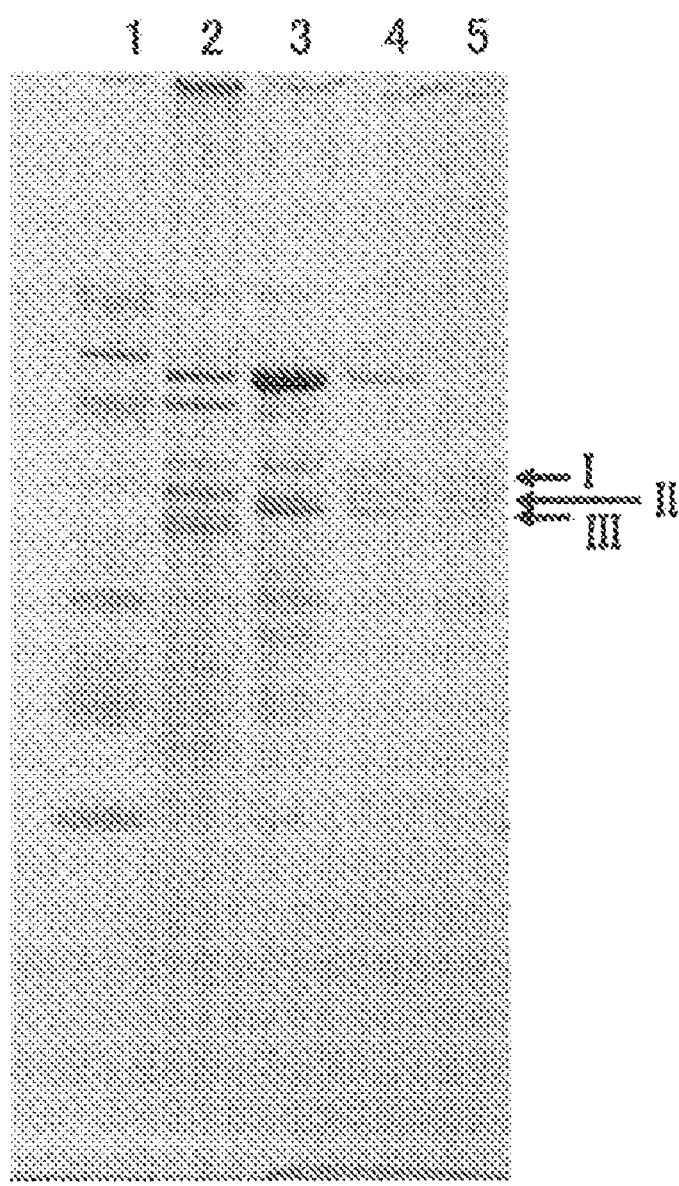
FIG. 1 (photograph as a substitute of drawing) illustrates the results obtained in one experimental example of the present disclosure through Native-PAGE of an enzyme that dehydroxylates a hydroxyl group at the 4-position of urolithins and of an enzyme that dehydroxylates the hydroxyl group at the 10-position of the urolithins.

Hereinafter, the present invention will be described in detail.

Note that each of the configurations, combinations thereof, and the like in each aspect are examples, and additions, omissions, substitutions, and other changes of the configuration may be made as appropriate within a scope that does not depart from the spirit of the present invention. The present disclosure is not limited by the aspects and is limited only by the scope of the claims.

Each aspect disclosed in the present specification can be combined with any other feature disclosed herein.

Note that in the present disclosure, the depository number of strains beginning with the wording DSM is the number assigned to the microorganisms stored by Deutsche Sammlung von Mikroorganismen and Zellkulturen GmbH (DSMZ).

Also, the depository number of strains beginning with the wording JCM is the number assigned to the microorganism stored by the RIKEN BioResource Research Center.

Urolithins are represented by the following General Formula (1):

[Chem. 1]

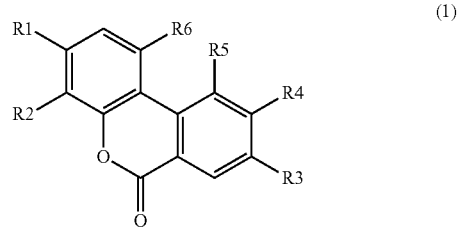

(1)

where in General Formula (1), R1 to R6 each independently represent a hydroxyl group, a hydrogen atom, or a methoxy group, and one or more of R1 to R6 are hydroxyl groups.

The hydroxyl group at the 4-position of the urolithins described in the present specification refers to the hydroxyl group of urolithins in which R2 in General Formula (1) above is a hydroxyl group, and the hydroxyl group at the 10-position refers to the hydroxyl group of the urolithins in which R5 in General Formula (1) above is a hydroxyl group.

<1-1-1 (A). Enzyme that Dehydroxylates the Hydroxyl Group at the 4-Position of Urolithins>

One aspect of the present disclosure is an enzyme that dehydroxylates the hydroxyl group at the 4-position of urolithins. More specifically, the enzyme is an enzyme that catalyzes a reaction in which the hydroxyl group at the 4-position of urolithins having a hydroxyl group at the 4-position is dehydroxylated. It is speculated that the enzyme thereof is constituted from one sub-unit, two sub-units, or three sub-units.

An enzyme according to the present aspect is an enzyme having the properties (1) and (2) below.

(1) The enzyme dehydroxylates a hydroxyl group at the 4-position of urolithins.

(2) The enzyme is, in the presence of methyl viologen (MV), activated by one or more components selected from the group consisting of: reduced nicotinamide adenine dinucleotide (NADH); reduced nicotinamide adenine dinucleotide phosphate (NADPH); flavin adenine dinucleotide (FAD); and flavin adenine mononucleotide (FMN).

The urolithins in the present aspect are preferably urolithin M5, urolithin D, or urolithin E. When the hydroxyl group at the 4-position of each of these urolithins is dehydroxylated by the enzyme according to the present aspect, urolithin M6, urolithin C, and urolithin M7 are respectively produced.

The enzyme according to the present aspect is activated by a cofactor. Examples of the cofactor include methyl viologen (MV), reduced nicotinamide adenine dinucleotide (NADH), reduced nicotinamide adenine dinucleotide phosphate (NADPH), flavin adenine dinucleotide (FAD), and flavin adenine mononucleotide (FMN).

With the cofactor of the present aspect, the activity of dehydroxylation of the hydroxyl group at the 4-position of the urolithins is increased, and therefore MV and NADH are preferably used, MV and NADPH are more preferably used, MV, NADPH, and FMN are even more preferably used, and MV, NADPH, and FAD are yet even more preferably used.

The enzyme according to the present aspect preferably has the properties (3) and (4) below.

(3) The optimum pH is preferably 5.5 or higher, and more preferably 6.0 or higher, and is preferably 7.5 or less, more preferably 7.0 or less, and even more preferably 6.5 or less.

(4) The SDS-PAGE result includes a band indicating a molecular weight of preferably 81,000 or greater, more preferably 85,000 or greater, and even more preferably 87,000 or greater, and also preferably 99,000 or less, more preferably 95,000 or less, and even more preferably 93,000 or less.

The enzyme according to the present aspect preferably has the property of (5) below.

(5) The optimum temperature is preferably 37° C. or higher, more preferably 38° C. or higher, and even more preferably 40° C. or higher, and is also preferably 50° C. or lower, more preferably 46° C. or lower, and even more preferably 44° C. or lower.

The enzyme according to the present aspect is preferably derived from a microorganism belonging to the genus *Gordonibacter*.

Such an enzyme is more preferably one or more selected from the group consisting of: a microorganism belonging to *Gordonibacter urolithinfaciens*; a microorganism belonging to *Gordonibacter pamelaeae*; and a microorganism belonging to *Gordonibacter faecihominis*.

The microorganism belonging to *Gordonibacter urolithinfaciens* is preferably of the *Gordonibacter urolithinfaciens* DSM 27213 strain.

The microorganism belonging to *Gordonibacter pamelaeae* is preferably of the DSM 19378 strain.

The microorganism belonging to *Gordonibacter faecihominis* is preferably of the JCM 16058 strain.

The *Gordonibacter urolithinfaciens* DSM 27213 strain is not limited to the same strain thereof, and may be bacteria substantially equivalent to the deposited strain. Substantially equivalent bacteria are microorganisms that belong to *Gordonibacter urolithinfaciens* and can exhibit an effect according to the present aspect, such as expressing an enzyme according to the present aspect; and furthermore, are microorganisms in which the base sequence of the 16S rRNA gene thereof has homology of preferably 98% or higher, more preferably 99% or higher, and even more 100% in relation to the base sequence of the 16S rRNA gene of the deposited strain, and the microorganisms thereof preferably have the same mycological properties as the deposited strain. Moreover, as long as the effect of the present aspect is not impaired, the strain may be a strain that is bred from the deposited strain or a strain substantially equivalent thereto, by a mutation treatment, genetic recombination, selection of a natural mutant strain, or the like.

This also applies to the *Gordonibacter pamelaeae* DSM 19378 strain and the *Gordonibacter faecihominis* JCM 16058 strain.

Microorganisms belonging to the genus *Gordonibacter* are cultured in a general culture medium that is used in culturing anaerobes, and examples of such culture medium includes Anaerobe Basal Broth (CM0957, available from ThermoFisher Scientific), Wilkins-Chalgren Anaerobe Broth (CM0643, available from ThermoFisher Scientific), GAM culture medium (available from Nissui Pharmaceutical Co., Ltd.), and a modified GAM culture medium (available from Nissui Pharmaceutical Co., Ltd.).

The culturing temperature is preferably 25° C. or higher, more preferably 30° C. or higher, and even more preferably 33° C. or higher, and is also preferably 45° C. or lower, more preferably 42° C. or lower, and even more preferably 40° C. or lower.

Furthermore, a water soluble organic material can be added as a carbon source, for example. Examples of the water soluble organic material include saccharides, such as sorbose, fructose, glucose, dextrin, and soluble starch; alcohols such as methanol; organic acids such as valeric acid, butyric acid, propionic acid, acetic acid, formic acid, and succinic acid; and amino acids such as arginine, methionine, phenylalanine, valine, and glutamic acid.

The concentration of organic material added as a carbon source in the culture medium can be adjusted, as appropriate, to facilitate efficient growth. Typically, the concentration can be selected in a range of from 0.1 to 10 wt/vol %.

In addition to the carbon source described above, a nitrogen source may be added to the culture medium. Various nitrogen compounds that may be used ordinarily in cultivation or fermentation can be used as the nitrogen source.

Examples of preferred inorganic nitrogen sources include ammonium salts and nitrates. More preferable examples of inorganic nitrogen sources include ammonium sulfate, ammonium chloride, ammonium phosphate, ammonium hydrogen phosphate, triammonium citrate, potassium nitrate and sodium nitrate.

On the other hand, examples of preferred organic nitrogen sources include amino acids, yeast extracts, peptones (such as milk-derived peptones, soybean-derived peptones, and soybean-derived peptides), meat extracts (for example, Lab Lemco powder, bonito extract, tuna extract, bonito extract, bouillon, and shellfish), liver extract, and digestive serum powder. Examples of more preferable organic nitrogen sources include arginine, cysteine, citrulline, lysine, tryptophan, yeast extract, and peptones.

Furthermore, in addition to the carbon source or nitrogen source, microbial growth factors such as extracts, vitamins, and metal salts and inorganic compounds can also be added to the culture medium. Examples of extracts include hemin, heme iron, digestive serum powder, liver extract, and blood digestion products. Examples of vitamins include biotin, folic acid, pyridoxal, thiamine, riboflavin, nicotinic acid, nicotinamide, pantothenic acid, vitamin B 12, thioctic acid, p-aminobenzoic acid, and vitamin K. Examples of metal salts and inorganic compounds include potassium dihydrogen phosphate, magnesium sulfate, manganese sulfate, sodium chloride, cobalt chloride, calcium chloride, zinc sulfate, copper sulfate, alum, sodium molybdate, potassium chloride, boric acid, and the like, nickel chloride, sodium tungstate, sodium selenate, sodium selenite, ammonium iron(II) sulfate, iron(II) citrate, sodium acetate trihydrate, magnesium sulfate heptahydrate, and manganese sulfate tetrahydrate. These metals may also be added in the form of mineral yeast.

Methods for producing a culture solution by adding plant- and/or animal-derived growth cofactors such as these inorganic compounds and vitamins are well known. The culture medium can be a liquid, a semi-solid, or a solid. A preferred form of the culture medium is a liquid culture medium.

Production of an enzyme according to the present aspect using the microorganisms belonging to the genus *Gordonibacter* is induced by adding ellagic acid or a precursor of ellagic acid, which is a raw material (substrate), to the culture medium. Examples of precursors of ellagic acid include ellagitannins such as punicalagin and geraniin. The raw material (substrate) is preferably added at an amount at which the concentration in the culture medium is from 0.01 g/L to 20 g/L.

In order to recover an enzyme according to the present aspect, the enzyme being produced by the microorganisms belonging to the genus *Gordonibacter*, the culture is recovered after production of the enzyme according to the present aspect, and in a buffer solution to which has been added a reducing agent such as cysteine, 2-mercaptoethanol, or dithiothreitol, or a protease inhibitor such as phenylmethane sulfonyl fluoride (PMFS), pepstatin A, or ethylenediamine tetra-acetic acid, the microorganisms are crushed to obtain a cell-free extract, and the enzyme can then be purified from the cell-free extract by combining, as appropriate, fractions according to protein solubility, and carrying out various types of chromatography. These may all be carried out according to routine methods.

The one sub-unit, two sub-units, or three sub-units of the *Gordonibacter urolithinfaciens* DSM 27213 strain, the sub-units thereof being presumed to constitute the enzyme according to the present aspect, are preferably selected from combinations of GuUroA1, GuUroA2, and GuUroA3.

The amino acid sequences of GuUroA1, GuUroA2, and GuUroA3 are the sequences represented by SEQ ID NOS: 1 to 3, respectively.

The base sequences of the genes encoding GuUroA1, GuUroA2, and GuUroA3 are sequences represented by SEQ ID NOS: 7 to 9, respectively.

Moreover, as previously mentioned, the enzyme according to the present aspect preferably has the property of (4). The molecular weight of from 81,000 to 99,000 is presumed to be the molecular weight of the GuUroA1 sub-unit.

The one sub-unit, the two sub-units, or the three sub-units of the *Gordonibacter pamelaeae* DSM 19378 strain, the sub-units thereof being presumed to constitute an enzyme according to the present aspect, are preferably selected from combinations of GpUroA1, GpUroA2 and GpUroA3. The amino acid sequences of GpUroA1, GpUroA2, and GpUroA3 are the sequences represented by SEQ ID NOS: 13 to 15, respectively.

The base sequences of the genes encoding GpUroA1, GpUroA2, and GpUroA3 are the sequences represented by SEQ ID NOS: 19 to 21, respectively.

Accordingly, the enzyme according to the present aspect is preferably an enzyme containing:
 one or more amino acid sequence selected from the group consisting of the amino acid sequence represented by SEQ ID NO: 1, the amino acid sequence represented by SEQ ID NO: 2, and the amino acid sequence represented by SEQ ID NO: 3; or
 one or more amino acid sequence selected from the group consisting of the amino acid sequence represented by SEQ ID NO: 13, the amino acid sequence represented by SEQ ID NO: 14, and the amino acid sequence represented by SEQ ID NO: 15.

Also, as long as GuUroA1 exhibits, as one sub-unit itself, or when constituting a unit along with GuUroA2 and/or GuUroA3, which are other sub-units, activity to dehydroxylate the hydroxyl group at the 4-position of urolithins, the GuUroA1 may be a protein formed from amino acids, the protein thereof being such that in the amino acid sequence represented by SEQ ID NO: 1, one to a plurality of amino acids are substituted or deleted, or one to a plurality of amino acids are inserted or added. One to a plurality means preferably from 1 to 80, more preferably from 1 to 50, even more preferably from 1 to 30, and particularly preferably from 1 to 10, and the same applies to a case in which the amino acids are added to the N-terminal side and/or the C-terminal side. This also applies to GpUroA1.

The substitution is preferably a conservative substitution. A conservative substitution is a mutual substitution between Phe, Trp, and Tyr when the substitution site is an aromatic amino acid, between Leu, Ile, and Val when the substitution site is a hydrophobic amino acid, between Gln and Asn when the substitution site is a polar amino acid, between Lys, Arg, and His when the substitution site is a basic amino acid, between Asp and Glu when the substitution site is an acidic amino acid, or between Ser and Thr when the substitution site is an amino acid having a hydroxyl group. Examples of the conservative substitution specifically include a substitution of Ala with Ser or Thr, a substitution of Arg with Gln, His, or Lys, a substitution of Asn with Glu, Gln, Lys, His, or Asp, a substitution of Asp with Asn, Glu, or Gln, a substitution of Cys with Ser or Ala, a substitution of Gln with Asn, Glu, Lys, His, Asp, or Arg, a substitution of Glu with Gly, Asn, Gln, Lys, or Asp, a substitution of Gly with Pro, a substitution of His with Asn, Lys, Gln, Arg, or Tyr, a substitution of Ile with Leu, Met, Val, or Phe, a substitution of Leu with Ile, Met, Val, or Phe, a substitution of Lys with Asn, Glu, Gln, His, or Arg, a substitution of Met with Ile, Leu, Val, or Phe, a substitution of Phe with Trp, Tyr, Met, Ile, or Leu, a substitution of Ser with Thr or Ala, a substitution of Thr with Ser or Ala, a substitution of Trp with Phe or Tyr, a substitution of Tyr with His, Phe, or Trp, and a substitution of Val with Met, Ile, or Leu. This also applies to GpUroA1.

Also, as long as GuUroA1 exhibits, as one sub-unit itself, or when constituting a unit along with GuUroA2 and/or GuUroA3, which are other sub-units, activity to dehydroxylate the hydroxyl group at the 4-position of urolithins, the GuUroA1 may be a protein formed from amino acids, the protein having homology of 80% or greater, preferably 90% or greater, more preferably 95% or greater, even more preferably 97% or greater, and particularly preferably 99% or greater, with respect to the overall length of the amino acid sequence represented by SEQ ID NO: 1. This also applies to GpUroA1.

Moreover, as long as GuUroA1 exhibits, as one sub-unit itself, or when constituting a unit along with GuUroA2 and/or GuUroA3, which are other sub-units, activity to dehydroxylate the hydroxyl group at the 4-position of urolithins, the GuUroA1 may be a protein encoded by a polynucleotide that hybridizes with the base sequence represented by SEQ ID NO: 7 under stringent conditions. "Stringent conditions" include, for example, conditions in which polynucleotides having homology of, for example, 80% or greater, preferably 90% or greater, more preferably 95% or greater, even more preferably 97% or greater, and particularly preferably 99% or greater hybridize, while polynucleotides having homology less than this do not hybridize. This also applies to GpUroA1.

The substitutions of the amino acids, the protein homology, and the stringent conditions and the like also apply to GuUroA2. However, with regard to GuUroA2, the "one to a plurality" is preferably from 1 to 12, more preferably from 1 to 11, even more preferably from 1 to 10, yet even more preferably from 1 to 5, and particularly preferably from 1 to 3. This also applies to GpUroA2.

In addition, the substitutions of the amino acids, the protein homology, and the stringent conditions and the like also apply to GuUroA3. However, with regard to GuUroA3, the "one to a plurality" is preferably from 1 to 7, more preferably from 1 to 6, even more preferably from 1 to 5, yet even more preferably from 1 to 3, and particularly preferably from 1 to 2. This also applies to GpUroA3.

The activity of dehydroxylating the hydroxyl group at the 4-position of urolithins through the enzyme according to the present aspect can be evaluated, for example, as in Experimental Example 5 described below.

<1-1-2 (A). Polynucleotide>

Another aspect of the present disclosure is a polynucleotide containing:
- one or more base sequences selected from the group consisting of a base sequence represented by SEQ ID NO: 7, a base sequence represented by SEQ ID NO: 8, and a base sequence represented by SEQ ID NO: 9; or
- one or more base sequences selected from a base sequence represented by SEQ ID NO: 19, a base sequence represented by SEQ ID NO: 20, and a base sequence represented by SEQ ID NO: 21.

The details of each base sequence are as described in the previous section "1-1-1 (A). Enzyme that dehydroxylates the hydroxyl group at the 4-position of urolithins".

As long as GuUroA1 exhibits, as one sub-unit itself, or when constituting a unit along with GuUroA2 and/or GuUroA3, which are other sub-units, activity to dehydroxylate the hydroxyl group at the 4-position of urolithins, the base sequence of the gene encoding GuUroA1 may be a base sequence that hybridizes with the base sequence represented by SEQ ID NO: 7 under stringent conditions. "Stringent conditions" include, for example, conditions in which polynucleotides having homology of, for example, 80% or greater, preferably 90% or greater, more preferably 95% or greater, even more preferably 97% or greater, and particularly preferably 99% or greater hybridize, while polynucleotides having homology less than this do not hybridize.

This applies also to the base sequence of the gene encoding GuUroA2 and the base sequence of the gene encoding GuUroA3. In addition, this also applies with regard to the base sequence of the gene encoding GpUroA1, the base sequence of the gene encoding GpUroA2, and the base sequence of the gene encoding GpUroA3.

<1-1-3 (A). Genetic Engineering Aspects>

Other aspects of the present disclosure include a recombinant vector containing the polynucleotide, a transformant in which the polynucleotide is expressively retained, or in which the vector is expressively retained, and a method for producing a protein encoded by the polynucleotide, the method including a step of culturing the transformant. The protein is the "enzyme that dehydroxylates the hydroxyl group at the 4-position of urolithins".

An expression vector that expresses the enzyme can be formed by inserting the polynucleotide into a known expression vector. In addition, the transformant can be obtained by transforming a microorganism or the like using the expression vector, and the transformant can then be cultured, etc. to produce the enzyme, and thereby the enzyme can be obtained.

Examples of host vector systems include, as lactic acid bacteria, *Lactococcus lactis* subsp. Cremoris-vector-pNZ8148 (available from MoBiTech, Inc.), *Lactococcus lactis*-pGKV 11 (Appl. Environ. Microbiol., 50, 540-542 (1985)), and *Lactococcus lactis/Streptococcus thermophilus/Streptococcus faecalis*, and the like—pBE194 (JP 06-253861 A), and *Lactococcus lactis* subsp. *lactis/Lactobacillus delbrueckii*, and the like—pSYE1 (JP 05-176776 A), and as bifidobacteria, *Bifidobacterium adolescentis*-pKKT427 (Nucleic Acids Research, 2009, Vol. 37, No. 1 e3 doi: 10.1093/nar/gkn884), a wide-range of *Lactobacillus bifidus*-pNC7 such as *Bifidobacterium longum* (Res. Microbiol., 147, 133-143 (1996)), and *Bifidobacterium longum*-pBS423 (Appl. Environ. Microbiol., 78, 4984-4994 (2012)).

Examples of anaerobic bacteria include *Clostridium acetobutylicum*-pTY10 (Agric. Biol. Chem., 54 (2), 437-441 (1990))/pMTL500E (Microbiol. SCI. 5: 310-315 (1988)), and ACE vector (Anaerobe, 41, 104-112 (2016)).

While expression of the enzyme requires an anaerobic environment, heterologous expression of the gene does not necessarily require an anaerobic host-vector system. For example, the *Rhodococcus erythropolis*-pTip, pNit, pCpi Vector Series (Hokkaido System Science Co., Ltd., Biotechnol. Bioeng., 86, 136-148 (2004)) can be suitably used. A specific example of the host includes the L88 strain, and a specific example of the vector includes pTipQC1.

In addition to microorganisms, various hosts and vector systems have been developed with respect to plants and animals. For example, a system in which silkworms are used (Nature 315, 592-594 (1985)), and a system that expresses heterologous proteins in large amounts in plants such as rapeseed, corn, and potatoes have been developed, and these system may be used.

<1-2-1 (A). Method for Dehydroxylating the Hydroxyl Group at the 4-Position of Urolithins>

Another aspect of the present disclosure is a method for dehydroxylating the hydroxyl group at the 4-position of urolithins. More specifically, the method is a method in which the hydroxyl group at the 4-position of urolithins having a hydroxyl group at the 4-position is dehydroxylated.

The present aspect is a method for dehydroxylating a hydroxyl group at the 4-position of urolithins, the method including the following Step (I):

Step (I): bringing one or more components selected from the following (i) to (iv) into contact with urolithins having a hydroxyl group at the 4-position, so as to dehydroxylate the hydroxyl group at the 4-position:
(i) the enzyme described in the section "1-1-1 (A). Enzyme that dehydroxylates the hydroxyl group at the 4-position of urolithins";
(ii) a protein encoded by a polynucleotide described in the section "1-1-2 (A). Polynucleotide";
(iii) a microorganism that produces the enzyme described in (i) above or the protein described in (ii) above; and
(iv) a treated product of the microorganism described in (iii) above.

(Urolithins)

The details of the urolithins in the present aspect are as described in the previously mentioned "1-1-1 (A). Enzyme that dehydroxylates the hydroxyl group at the 4-position of urolithins".

(Step (I))

In Step (I), (i) the enzyme, and (ii) the protein encoded by the polynucleotide contact each of the urolithins having a hydroxyl group at the 4-position and dehydroxylate the hydroxyl group present in the urolithins at the 4-position. In addition, with (iii) the microorganism that produces the enzyme described in (i) above or the protein described in (ii) above and (iv) the treated product of the microorganism described in (iii) above, the enzyme or protein contained in the microorganism or in the treated product of the microorganism contacts the urolithins having a hydroxyl group at the 4-position, and thereby dehydroxylates the hydroxyl group present in the urolithins at the 4-position.

With respect to (iii) the microorganism that produces the enzyme described in (i) above or the protein described in (ii) above and (iv) the treated product of the microorganism described in (iii) above, the microorganism may be obtained through a genetic engineering technique.

Examples of such a microorganism include a microorganism belonging to the genus *Gordonibacter*. Specific preferable examples of the microorganism belonging to the genus *Gordonibacter* include the same microorganism as those described in the "1-1-1 (A). Enzyme that dehydroxylates the hydroxyl group at the 4-position of urolithins" section above.

The (i) enzyme and the (ii) protein encoded by a polynucleotide are not limited those that have been purified, and may also include those that have been partially purified.

Furthermore, examples of (iv) the treated product of the microorganism include the microorganism in which the permeability of the cell membrane has been changed by treatment using a surfactant or an organic solvent such as toluene, a cell-free extract in which bacterial cells have been crushed by a treatment using glass beads or enzymes, or a treated product obtained by partially purifying the same.

For a case in which one or more components selected from the aforementioned (i) to (iv) are to be brought into contact with urolithins having a hydroxyl group at the 4-position, such contact can be implemented in water; in an organic solvent that does not easily dissolve in water, for example, in an organic solvent such as ethyl acetate, butyl acetate, toluene, chloroform, and n-hexane; or in a two-phase mixed system of the organic solvent and an aqueous medium such as ethanol or acetone. The contact can also be implemented by immobilizing the one or more components selected from the aforementioned (i) to (iv), or the contact can be implemented using a membrane reactor or the like.

Furthermore, if the one or more components selected from (i) to (iv) are the microorganism that produces the enzyme described in (i) above or the protein described in (ii) above, the contact can be implemented in a culture medium or a solution normally used in culturing the microorganism, such as a phosphate buffer.

The temperature in Step (I) is preferably 25° C. or higher, more preferably 30° C. or higher, and even more preferably 33° C. or higher, and is also preferably 55° C. or lower, more preferably 50° C. or lower, and even more preferably 42° C. or lower.

The pH in Step (I) is preferably 4.0 or higher, more preferably 5.0 or higher, and even more preferably 5.5 or higher, and is also preferably 9.0 or less, more preferably 8.0 or less, and even more preferably 7.0 or less.

In Step (I), the concentration in the reaction solution of urolithins having a hydroxyl group at the 4-position is 0.001 g/L or greater, preferably 0.01 g/L or greater, and more preferably 0.1 g/L or greater, and is also not greater than 100 g/L, preferably not greater than 20 g/L, and more preferably not greater than 10 g/L.

The present aspect may include a step of quantitatively determining the resulting product (quantitative determination step). The quantification method can be in accordance with routine methods. For example, ethyl acetate to which an acid such as formic acid has been added as necessary, is added to the culturing solution and stirred well, after which the mixture is centrifuged, and the ethyl acetate layer is extracted. The same operation can be implemented several times as necessary, and the extracted ethyl acetate layers can be combined to obtain a liquid extract of the product. The liquid extract is concentrated under reduced pressure using an evaporator or the like, dried, and dissolved in methanol. As an example, the obtained solution is then filtered using a membrane such as a polytetrafluoroethylene (PTFE) membrane to remove insoluble matter, and the resulting product can then be quantified using high performance liquid chromatography.

The present aspect may also include a step of recovering the resulting product. The recovery step includes steps such as a purification step and a concentration step. As a purification treatment in the purification step, treatments such as sterilization of the microorganism through heat; disinfection through a method such as microfiltration (MF) or ultrafiltration (UF); removal of solids and polymeric substances; extraction using an organic solvent, an ionic liquid, or the like; and adsorption and decolorization using a hydrophobic adsorbent, an ion exchange resin, an activated carbon column, or the like can be implemented. Furthermore, examples of a concentration treatment in the concentration step include concentration using an evaporator, reverse osmosis membrane, or the like.

In addition, a solution containing the resulting product can be formed into a powder through freeze drying, spray drying, or the like. In the formation of a powder, an excipient such as lactose, dextrin, or corn starch can be added.

<1-1-1 (B). Enzyme that Dehydroxylates the Hydroxyl Group at the 10-Position of Urolithins>

Another aspect of the present disclosure is an enzyme that dehydroxylates the hydroxyl groups at the 10-position of urolithins. More specifically, the enzyme is an enzyme that catalyzes a reaction in which the hydroxyl group at the 10-position of urolithins having a hydroxyl group at the 10-position is dehydroxylated. It is speculated that the enzyme thereof is constituted from one sub-unit, two sub-units, or three sub-units.

With regard to the enzyme according to the present aspect, refer to the details described in the "1-1-1 (A). Enzyme that dehydroxylates the hydroxyl group at the 4-position of urolithins" section. However, differences also exist, and thus those differences are described.

The urolithins in the present aspect are preferably urolithin M5, urolithin M6, or urolithin M7. When the hydroxyl group at the 10-position is dehydroxylated by the enzyme according to the present aspect, urolithin D, urolithin C, and urolithin A are respectively produced.

The enzyme according to the present aspect is activated by a cofactor. Examples of the cofactor include methyl viologen (MV), reduced nicotinamide adenine dinucleotide (NADH), reduced nicotinamide adenine dinucleotide phosphate (NADPH), flavin adenine dinucleotide (FAD), and flavin adenine mononucleotide (FMN).

With the cofactor of the present aspect, the activity of dehydroxylation of the hydroxyl group at the 10-position of the urolithins is increased, and therefore MV and NADH are preferably used, MV, NADPH and FMN are more preferably used, MV and NADPH are even more preferably used, MV, NADPH, and FAD are yet even more preferably used, MV, NADH and FMN are particularly preferably used, and MV, NADPH and FAD are even more particularly preferably used.

The enzyme according to the present aspect preferably has the properties (3) and (4) below.

(3) The optimum pH is preferably 5.0 or higher, and more preferably 5.5 or higher, and is preferably 7.0 or less, more preferably 6.5 or less, and even more preferably 6.0 or less.

(4) The optimum temperature is preferably 37° C. or higher, and more preferably 42° C. or higher, and is also preferably 50° C. or lower, and more preferably 42° C. or lower.

The enzyme according to the present aspect preferably has the property of (5) below.

(5) A SDS-PAGE result includes a band indicating a molecular weight of preferably 78,000 or greater, more preferably 82,000 or greater, and even more preferably 84,000 or greater, and also preferably 96,000 or less, more preferably 92,000 or less, and even more preferably 90,000 or less.

The one sub-unit, two sub-units, or three sub-units of the *Gordonibacter urolithinfaciens* DSM 27213 strain, the sub-units thereof being presumed to constitute the enzyme according to the present aspect, are preferably selected from combinations of GuUroB1, GuUroB2, and GuUroB3.

The amino acid sequences of GuUroB1, GuUroB2, and GuUroB3 are the sequences represented by SEQ ID NOS: 4 to 6, respectively.

The base sequences of the genes encoding GuUroB1, GuUroB2, and GuUroB3 are sequences represented by SEQ ID NOS: 10 to 12, respectively.

Furthermore, as mentioned previously, the enzyme according to the present aspect preferably has the property (4) described in the "1-1-1 (A). Enzyme that dehydroxylates the hydroxyl group at the 4-position of urolithins" section. The molecular weight of 78,000 or greater and 96,000 or less is presumed to be the molecular weight of the GuUroB1 sub-unit.

The one sub-unit, the two sub-units, or the three sub-units of the *Gordonibacter pamelaeae* DSM 19378 strain, the sub-units thereof being presumed to constitute an enzyme according to the present aspect, are preferably selected from combinations of GpUroB1, GpUroB2 and GpUroB3. The amino acid sequences of GpUroB1, GpUroB2, and GpUroB3 are the sequence represented by SEQ ID NOS: 16 to 18, respectively.

The base sequences of the genes encoding GpUroB1, GpUroB2, and GpUroB3 are the sequences represented by SEQ ID NOS: 22 to 24, respectively.

Accordingly, the enzyme according to the present aspect is preferably an enzyme containing:
one or more amino acid sequence selected from the group consisting of the amino acid sequence represented by SEQ ID NO: 4, the amino acid sequence represented by SEQ ID NO: 5, and the amino acid sequence represented by SEQ ID NO: 6; or
one or more amino acid sequence selected from the group consisting of the amino acid sequence represented by SEQ ID NO: 16, the amino acid sequence represented by SEQ ID NO: 17, and the amino acid sequence represented by SEQ ID NO: 18.

Also, as long as GuUroB1 exhibits, as one sub-unit itself, or when constituting a unit along with GuUroB2 and/or GuUroB3, which are other sub-units, activity to dehydroxylate the hydroxyl group at the 10-position of urolithins, the GuUroB1 may be a protein formed from amino acids, the protein thereof being such that in the amino acid sequence represented by SEQ ID NO: 4, one to a plurality of amino acids are substituted or deleted, or one to a plurality of amino acids are inserted or added. One to a plurality means preferably from 1 to 80, more preferably from 1 to 79, even more preferably from 1 to 50, yet even more preferably from 1 to 30, and particularly preferably from 1 to 10, and the same applies to a case in which the amino acids are added to the N-terminal side and/or the C-terminal side. This also applies to GpUroB1.

Furthermore, the substitutions of amino acids, the homology of proteins, the stringent conditions, and the like are the same as those of the enzyme described in the "1-1-1 (A). Enzyme that dehydroxylates the hydroxyl group at the 4-position of urolithins" section. This also applies to GpUroB1.

In addition, the substitutions of the amino acids, the protein homology, and the stringent conditions and the like also apply to GuUroB2. However, with regard to GuUroB2, the "one to a plurality" is preferably from 1 to 12, more preferably from 1 to 11, even more preferably from 1 to 10, yet even more preferably from 1 to 5, and particularly preferably from 1 to 3. This also applies to GpUroB2.

In addition, the substitutions of the amino acids, the protein homology, and the stringent conditions and the like also apply to GuUroB3. However, with regard to GuUroB3, the "one to a plurality" is preferably from 1 to 20, more preferably from 1 to 19, even more preferably from 1 to 18, yet even more preferably from 1 to 10, particularly preferably from 1 to 5, and even more particularly preferably from 1 to 3. This also applies to GpUroB3.

The activity of dehydroxylating the hydroxyl group at the 10-position of urolithins through the enzyme according to the present aspect can be evaluated, for example, by quantitatively determining the urolithin C produced as a product from urolithin M6, similar to the method described in Experimental Example 5 described below.

<1-1-2 (B). Polynucleotide>

Another aspect of the present disclosure is a polynucleotide containing:
one or more base sequences selected from the group consisting of a base sequence represented by SEQ ID NO: 10, a base sequence represented by SEQ ID NO: 11, and a base sequence represented by SEQ ID NO: 12; or
one or more base sequences selected from a base sequence represented by SEQ ID NO: 22, a base sequence represented by SEQ ID NO: 23, and a base sequence represented by SEQ ID NO: 24.

The details of each base sequence are as described in the previously mentioned "1-1-1 (B). Enzyme that dehydroxylates the hydroxyl group at the 10-position of urolithins" section.

Moreover, as long as GuUroB1 exhibits, as one sub-unit itself, or when constituting a unit along with GuUroB2 and/or GuUroB3, which are other sub-units, activity to dehydroxylate the hydroxyl group at the 10-position of urolithins, the base sequence of the gene encoding GuUroB1 may be a base sequence that hybridizes with the base sequence represented by SEQ ID NO: 10 under stringent conditions. "Stringent conditions" include, for example, conditions in which polynucleotides having homology of, for example, 80% or greater, preferably 90% or greater, more preferably 95% or greater, even more preferably 97% or greater, and particularly preferably 99% or greater hybridize, while polynucleotides having homology less than this do not hybridize.

This applies also to the base sequence of the gene encoding GuUroB2 and the base sequence of the gene encoding GuUroB3. In addition, this also applies with regard to the base sequence of the gene encoding GpUroB1, the base sequence of the gene encoding GpUroB2, and the base sequence of the gene encoding GpUroB3.

<1-1-3 (B). Genetic Engineering Aspects>

Other aspects of the present disclosure include a recombinant vector containing the polynucleotide, a transformant in which the polynucleotide is expressively retained, or in which the vector is expressively retained, and a method for producing a protein encoded by the polynucleotide, the method including a step of culturing the transformant. The protein is the "enzyme that dehydroxylates the hydroxyl group at the 10-position of urolithins".

An expression vector that expresses the enzyme can be formed by inserting the polynucleotide into a known expression vector. The transformant can be obtained by transforming microorganisms or the like using the expression vector, and the transformant can then be cultured, etc. to produce the enzyme, and thereby the enzyme can be obtained.

For other matters, the description of the "1-1-3 (A). Genetic engineering aspects" section is incorporated by reference.

<1-2-1 (B). Method for Dehydroxylating the Hydroxyl Group at the 10-Position of Urolithins>

Another aspect of the present disclosure is a method for dehydroxylating the hydroxyl group at the 10-position of urolithins. More specifically, the method is a method in which the hydroxyl group at the 10-position of urolithins having a hydroxyl group at the 10-position is dehydroxylated.

The present aspect is a method for dehydroxylating a hydroxyl group at the 10-position of urolithins, the method including the following Step (I):

Step (I): bringing one or more components selected from the following (i) to (iv) into contact with urolithins having a hydroxyl group at the 10-position, so as to dehydroxylate the hydroxyl group at the 10-position:
 (i) the enzyme described in the "1-1-1 (B). Enzyme that dehydroxylates the hydroxyl group at the 10-position of urolithins" section;
 (ii) a protein encoded by a polynucleotide described in the section "1-1-2 (B). Polynucleotide";
 (iii) a microorganism that produces the enzyme described in (i) above or the protein described in (ii) above; and
 (iv) a treated product of the microorganism described in (iii) above.

(Urolithins)

With regard to the details of the urolithins of the present aspect, the details described in the "1-1-1 (B). Enzyme that dehydroxylates the hydroxyl group at the 10-position of urolithins" section described above are incorporated herein.

(Step (I))

In Step (I), (i) the enzyme, and (ii) the protein encoded by the polynucleotide contact each of the urolithins having a hydroxyl group at the 10-position, and dehydroxylate the hydroxyl group present in the urolithins at the 10-position. In addition, with (iii) the microorganism that produces the enzyme described in (i) above or the protein described in (ii) above, and (iv) the treated product of the microorganism described in (iii) above, the enzyme or protein contained in the microorganism or in the treated product of the microorganism contacts the urolithins having a hydroxyl group at the 10-position, and thereby dehydroxylates the hydroxyl group present in the urolithins at the 10-position.

With respect to (iii) the microorganism that produces the enzyme described in (i) above or the protein described in (ii) above, and (iv) the treated product of the microorganism described in (iii) above, the microorganism may be obtained through a genetic engineering technique.

Examples of such a microorganism include a microorganism belonging to the genus *Gordonibacter*, and a microorganism belonging to the genus *Eggerthella*.

Specific preferable examples of the microorganism belonging to the genus *Gordonibacter* include the same microorganism as those described in the section "1-1-1 (A). Enzyme that dehydroxylates the hydroxyl group at the 4-position of urolithins" above.

The microorganism belonging to the genus *Eggerthella* is preferably the *Eggerthella* sp. DC3563 (NITE BP-02376) strain belonging to the genus *Eggerthella* but not applicable to an existing species.

Note that an international deposit of the *Eggerthella* sp. DC3563 (NITE BP-02376) strain was established on the basis of the Budapest Treaty on Nov. 11, 2106 by the National Institute of Technology and Evaluation at the NITE Patent Microorganisms Depositary [Address: #122, 2-5-8 Kazusakamatari, Kisarazu-shi, Chiba 292-0818, Japan].

The *Eggerthella* sp. DC3563 (NITE BP-02376) strain is not limited to the same strain thereof and may be bacteria that is substantially equivalent to the deposited strain. Substantially equivalent bacteria are microorganisms that belong to the genus *Eggerthella*, and can exhibit an effect according to the present aspect, such as dehydroxylating the hydroxyl group at the 10-position of urolithins having a hydroxyl group at the 10-position, and furthermore, are microorganisms in which the base sequence of the 16S rRNA gene thereof has homology of preferably 98% or higher, more preferably 99% or higher, and even more 100% in relation to the base sequence of the 16S rRNA gene of the deposited strain, and the microorganisms thereof preferably have the same mycological properties as the deposited strain. Moreover, as long as the effect of the present aspect is not impaired, the strain may be a strain that is bred from the deposited strain or a strain substantially equivalent thereto, by a mutation treatment, genetic recombination, selection of a natural mutant strain, or the like.

For other matters, the description of the section "1-2-1 (A). Method for dehydroxylating the hydroxyl group at the 4-position of urolithins" is incorporated by reference.

<1-3-1. Urolithin C Production Method (First Aspect)>

Another aspect of the present disclosure is a method of producing urolithin C (first aspect).

The present aspect is a method for producing urolithin C, the method including the following Steps (I) to (III):

Step (I): allowing a microorganism having an ability to produce urolithin M5 from ellagic acid to produce urolithin M5 from ellagic acid.

Step (II): bringing one or more components selected from the following (i) to (iv) into contact with the urolithin M5, so as to produce urolithin M6:
 (i) the enzyme described in the section "1-1-1 (A). Enzyme that dehydroxylates the hydroxyl group at the 4-position of urolithins";
 (ii) a protein encoded by a polynucleotide described in the section "1-1-1 (A). Polynucleotide";
 (iii) a microorganism that produces the enzyme described in (i) above or the protein described in (ii) above; and
 (iv) a treated product of the microorganism described in (iii) above.

Step (III): bringing one or more components selected from the following (v) to (viii) into contact with the urolithin M6, so as to produce urolithin C:
 (v) the enzyme described in the section "1-1-1 (B). Enzyme that dehydroxylates the hydroxyl group at the 10-position of urolithins";
 (vi) a protein encoded by a polynucleotide described in the section "1-1-1 (B). Polynucleotide";
 (vii) a microorganism that produces the enzyme described in (v) above or the protein described in (vi) above; and
 (viii) a treated product of the microorganism described in (vii) above.

(Step (I))

In Step (I), a microorganism having an ability to produce urolithin M5 from ellagic acid is allowed to produce urolithin M5 from ellagic acid.

Examples of the microorganism having an ability to produce urolithin M5 from ellagic acid include the microorganism described in Step (I) in the section entitled "1-2-1 (B). Method for dehydroxylating the hydroxyl group at the 10-position of urolithins".

As a method for producing urolithin M5 from ellagic acid, a case can be illustrated in which the target for contact with urolithins having a hydroxyl group at the 10-position with regard to the method described in the section "1-2-1 (B). Method for dehydroxylating the hydroxyl group at the 10-position of urolithins" is a microorganism that produces the enzyme described in the section "1-1-1 (B). Enzyme that dehydroxylates the hydroxyl group at the 10-position of urolithins" described above, or a microorganism that produces a protein encoded by the polynucleotide described in the section "1-1-1 (B). Polynucleotide" above.

(Step (II))

In Step (II), one or more components selected from the following (i) to (iv) are brought into contact with urolithin M5, so as to produce urolithin M6:
- (i) the enzyme described in the section "1-1-1 (A). Enzyme that dehydroxylates the hydroxyl group at the 4-position of urolithins";
- (ii) a protein encoded by a polynucleotide described in the section "1-1-1 (A). Polynucleotide";
- (iii) a microorganism that produces the enzyme described in (i) above or the protein described in (ii) above; and
- (iv) a treated product of the microorganism described in (iii) above.

In Step (II), (i) the enzyme, and (ii) the protein encoded by the polynucleotide contact each urolithin M5 having a hydroxyl group at the 4-position, and dehydroxylate the hydroxyl group present in the urolithin M5 at the 4-position. In addition, with (iii) the microorganism that produces the enzyme described in (i) above or the protein described in (ii) above, and (iv) the treated product of the microorganism described in (iii) above, the enzyme or protein contained in the microorganism or in the treated product of the microorganism contacts the urolithin M5 having a hydroxyl group at the 4-position, and thereby dehydroxylates the hydroxyl group present in the urolithin M5 at the 4-position.

The details of the aspect thereof are the same as the details described in the section "1-2-1 (A). Method for dehydroxylating the hydroxyl group at the 4-position of urolithins".

(Step (III))

In Step (III), one or more components selected from the following (v) to (viii) are brought into contact with the urolithin M6, so as to produce urolithin C:
- (v) the enzyme described in the section "1-1-1 (B). Enzyme that dehydroxylates the hydroxyl group at the 10-position of urolithins";
- (vi) a protein encoded by a polynucleotide described in the section "1-1-1 (B). Polynucleotide";
- (vii) a microorganism that produces the enzyme described in (v) above or the protein described in (vi) above; and
- (viii) a treated product of the microorganism described in (vii) above.

In Step (III), (v) the enzyme and (vi) the protein encoded by the polynucleotide contact each urolithin M6 having a hydroxyl group at the 10-position, and dehydroxylate the hydroxyl group present in the urolithin M6 at the 10-position. In addition, with (vii) the microorganism that produces the enzyme described in (v) above or the protein described in (vi) above and (viii) the treated product of the microorganism described in (vii) above, the enzyme or protein contained in the microorganism or in the treated product of the microorganism contacts the urolithin M6 having a hydroxyl group at the 10-position, and thereby dehydroxylates the hydroxyl group present in the urolithin M6 at the 10-position.

The details of the aspect thereof are the same as the details described in the section "1-2-1 (B). Method for dehydroxylating the hydroxyl group at the 10-position of urolithins".

One or more of the steps selected from the group consisting of Step (I) through Step (III) may be implemented in the same system.

The above "implemented in the same system" means that with regard to the series in which the urolithin M5 produced in Step (I) is used as is as the urolithin M5 in Step (II) to produce the urolithin M6 in Step (II), and the urolithin M6 is then used as is as the urolithin M6 in Step (III) to produce urolithin C in Step (III), the series thereof is continuously implemented in the same system. That is, for example, this series does not include a step of separating and/or purifying the urolithin M5 produced in Step (I). Note that when microorganisms are used in each step, the microorganisms in each step may be the same or different.

The present aspect may include other steps. For example, a step of quantitatively determining the obtained urolithin C (quantitative determination step), a step of purifying the obtained urolithin C (purification step), and a step of concentrating the urolithin C (concentration step) may be included. The details of these steps are the same as the details described in the section "1-2-1 (A). Method for dehydroxylating the hydroxyl group at the 4-position of urolithins" above. Further, a step of forming a solution containing urolithin C into a powder through freeze drying, spray drying, or the like may also be included. In the formation of a powder, an excipient such as lactose, dextrin, or corn starch can be added.

<1-3-2. Urolithin C Production Method (Second Aspect)>

Another aspect of the present disclosure is a method of producing C (second aspect).

The present aspect is a method for producing urolithin C, the method including the following Steps (I) to (III).

Step (I): allowing a microorganism having an ability to produce urolithin M5 from ellagic acid to produce urolithin M5 from ellagic acid.

Step (II): bringing one or more components selected from the following (i) to (iv) into contact with the urolithin M5, so as to produce urolithin D:
- (i) the enzyme described in the section "1-1-1 (B). Enzyme that dehydroxylates the hydroxyl group at the 10-position of urolithins";
- (ii) a protein encoded by a polynucleotide described in the section "1-1-1 (B). Polynucleotide";
- (iii) a microorganism that produces the enzyme described in (i) above or the protein described in (ii) above; and
- (iv) a treated product of the microorganism described in (iii) above.

Step (III): bringing one or more components selected from the following (v) to (viii) into contact with the urolithin D, so as to produce urolithin C:
- (v) the enzyme described in the section "1-1-1 (A). Enzyme that dehydroxylates the hydroxyl group at the 4-position of urolithins";
- (vi) a protein encoded by a polynucleotide described in the section "1-1-1 (A). Polynucleotide";
- (vii) a microorganism that produces the enzyme described in (i) above or the protein described in (v) above; and (viii) a treated product of the microorganism described in (vii) above.

(Step (I))

Regarding Step (I), the details described in the aforementioned "1-3-1. Urolithin C production method (first aspect)" are incorporated by reference.

(Step (II))

In Step (II), one or more components selected from the following (i) to (iv) are contacted with urolithin M5 to produce urolithin D:
- (i) the enzyme described in the section "1-1-1 (B). Enzyme that dehydroxylates the hydroxyl group at the 10-position of urolithins";
- (ii) a protein encoded by a polynucleotide described in the section "1-1-1 (B). Polynucleotide";
- (iii) a microorganism that produces the enzyme described in (i) above or the protein described in (ii) above; and
- (iv) a treated product of the microorganism described in (iii) above.

In Step (II), (i) the enzyme and (ii) the protein encoded by the polynucleotide contact each urolithin M5 having a hydroxyl group at the 10-position, and dehydroxylate the hydroxyl group present in the urolithin M5 at the 10-position. In addition, with (iii) the microorganism that produces the enzyme described in (i) above or the protein described in (ii) above and (iv) the treated product of the microorganism described in (iii) above, the enzyme or protein contained in the microorganism or in the treated product of the microorganism contacts the urolithin M5 having a hydroxyl group at the 10-position, and thereby dehydroxylates the hydroxyl group present in the urolithin M5 at the 10-position.

The details of the aspect thereof are the same as the details described in the section "1-2-1 (B). Method for dehydroxylating the hydroxyl group at the 10-position of urolithins".

In Step (III), one or more components selected from the following (v) to (viii) are contacted with the urolithin D to produce C:
- (v) the enzyme described in the section "1-1-1 (A). Enzyme that dehydroxylates the hydroxyl group at the 4-position of urolithins";
- (vi) a protein encoded by a polynucleotide described in the section "1-1-1 (A). Polynucleotide";
- (vii) a microorganism that produces the enzyme described in (i) above or the protein described in (v) above; and
- (viii) a treated product of the microorganism described in (vii) above.

In Step (III), (v) the enzyme and (vi) the protein encoded by the polynucleotide contact each urolithin D having a hydroxyl group at the 4-position, and dehydroxylate the hydroxyl group present in the urolithin D at the 4-position. In addition, with (vii) the microorganism that produces the enzyme described in (vi) above or the protein described in (vii) above and (viii) the treated product of the microorganism described in (vii) above, the enzyme or protein contained in the microorganism or in the treated product of the microorganism contacts the urolithin D having a hydroxyl group at the 4-position, and thereby dehydroxylates the hydroxyl group present in the urolithin D at the 4-position.

The details of the aspect thereof are the same as the details described in the section "1-2-1 (A). Method for dehydroxylating the hydroxyl group at the 4-position of urolithins".

The Steps (I) to (III) may be implemented in the same system.

The above "implemented in the same system" means that with regard to the series in which the urolithin M5 produced in Step (I) is used as is as the urolithin M5 in Step (II) to produce the urolithin D in Step (II), and the urolithin D is then used as is as the urolithin D in Step (III) to produce urolithin C in Step (III), the series thereof is continuously implemented in the same system. That is, for example, this series does not include a step of separating and/or purifying the urolithin M5 produced in Step (I). Note that when microorganisms are used in each step, the microorganisms in each step may be the same or different.

The present aspect may include other steps. The details of these steps are the same as the details described in the section "1-3-1. Urolithin C production method (first aspect)".

<1-3-3. Urolithin a Production Method (First Aspect)>

Another aspect of the present disclosure is a method (first aspect) for producing urolithin A.

The present aspect is a method for producing urolithin A, the method including Step (I).

Step (I): allowing a microorganism having an ability to produce urolithin A from urolithin C to produce urolithin A from the urolithin C produced by the method described in "1-3-1. Urolithin C production method (first aspect)".

The steps of the "1-3-1. Urolithin C production method (first aspect)" of the present aspect are described below. In this case, Step (I) described above corresponds to Step (IV) below.

Namely, the present aspect is a method for producing urolithin A, the method including Steps (I) to (IV):

Step (I): allowing a microorganism having an ability to produce urolithin M5 from ellagic acid to produce urolithin M5 from ellagic acid.

Step (II): bringing one or more components selected from the following (i) to (iv) into contact with the urolithin M5, so as to produce urolithin M6:
- (i) the enzyme described in the section "1-1-1 (A). Enzyme that dehydroxylates the hydroxyl group at the 4-position of urolithins";
- (ii) a protein encoded by a polynucleotide described in the section "1-1-1 (A). Polynucleotide";
- (iii) a microorganism that produces the enzyme described in (i) above or the protein described in (ii) above; and
- (iv) a treated product of the microorganism described in (iii) above.

Step (III): bringing one or more components selected from the following (v) to (viii) into contact with the urolithin M6, so as to produce urolithin C:
- (v) the enzyme described in the section "1-1-1 (B). Enzyme that dehydroxylates the hydroxyl group at the 10-position of urolithins";
- (vi) a protein encoded by a polynucleotide described in the section "1-1-1 (B). Polynucleotide";
- (vii) a microorganism that produces the enzyme described in (v) above or the protein described in (vi) above; and
- (viii) a treated product of the microorganism described in (vii) above.

Step (IV): allowing a microorganism having an ability to produce urolithin A from urolithin C to produce urolithin A from the urolithin C.

(Step (I) to Step (III))

Regarding Step (I) to Step (III), the details described in the aforementioned "1-3-1. Urolithin C production method (first aspect)" are incorporated by reference.

(Step (IV))

In Step (IV), a microorganism having an ability to produce urolithin A from urolithin C is allowed to produce urolithin A from urolithin C.

Examples of the microorganism having an ability to produce urolithin A from urolithin C include a microorganism belonging to the genus *Clostridium*.

Even among the microorganism belonging to the genus *Clostridium*, a microorganism belonging to *Clostridium bolteae*, a microorganism belonging to *Clostridium asparagiforme*, and a microorganism belonging to *Clostridium citroniae* are preferable.

Furthermore, with regard to the microorganism belonging to *Clostridium bolteae*, a DSM 29485 strain, a DSM 15670 strain, and a JCM 12243 strain are more preferable, and the DSM 15670 strain is even more preferable.

Among the microorganism belonging to *Clostridium asparagiforme*, a DSM 15981 strain is preferable.

Among the microorganism belonging to *Clostridium citroniae*, a DSM 19261 strain is preferable.

As a microorganism of *Clostridium* sp. belonging to the genus *Clostridium* but not applicable to an existing species, the *Clostridium* sp. DC 3656 (NITE ABP-02708) strain is preferable.

A deposit of the *Clostridium* sp. DC 3656 strain (NITE ABP-02708) was established in Japan with the depository number NITE P-02708 on 8 May 2018 by the National Institute of Technology and Evaluation (NITE) at the NITE Patent Microorganisms Depositary [Address: #122, 2-5-8 Kazusakamatari, Kisarazu-shi, Chiba 292-0818, Japan]. Subsequently, a request (date received: 15 Jul. 2020) was made for a transfer of control of the same strain to an international depository on the basis of the Budapest Treaty by the National Institute of Technology and Evaluation of the NITE Patent Microorganisms Depositary [Address: #122, 2-5-8 Kazusakamatari, Kisarazu-shi, Chiba 292-0818, Japan], and a receipt number of NITE ABP-02708 was assigned to the strain.

*Clostridium* sp. DC 3656 (NITE ABP-02708) is not limited to the same strain thereof and may be bacteria that substantially equivalent to the deposited strain. Substantially equivalent bacteria are microorganisms that belong to the genus *Clostridium* and can exhibit an effect according to the present aspect, such as being able to produce urolithin A from urolithin C, and furthermore, are microorganisms in which the base sequence of the 16S rRNA gene thereof has homology of preferably 98% or higher, more preferably 99% or higher, and even more 100% in relation to the base sequence of the 16S rRNA gene of the deposited strain, and the microorganisms thereof preferably have the same mycological properties as the deposited strain. Moreover, as long as the effect of the present disclosure is not impaired, the strain may be a strain that is bred from the deposited strain or a strain substantially equivalent thereto, by a mutation treatment, genetic recombination, selection of a natural mutant strain, or the like.

This also applies to the *Clostridium bolteae* DSM 29485 strain and DSM 15670 strain, the JCM 12243 strain, the *Clostridium asparagiforme* DSM 15981 strain, and the *Clostridium citroniae* DSM19261 strain.

As a method for producing urolithin A from urolithin C, a case can be illustrated in which the target for contact with urolithins having a hydroxyl group at the 4-position with regard to the method described in section "1-2-1 (A). Method for dehydroxylating the hydroxyl group at the 4-position of urolithins" is a microorganism that produces the enzyme described in the section "1-1-1 (A). Enzyme that dehydroxylates the hydroxyl group at the 4-position of urolithins" described above, or a microorganism that produces a protein encoded by the polynucleotide described in the section "1-1-1 (A). Polynucleotide" above.

One or more of the steps selected from the group consisting of Step (I) through Step (IV) may be implemented in the same system.

The above "implemented in the same system" means that with regard to the series in which the urolithin M5 produced in Step (I) is used as is as the urolithin M5 in Step (II) to produce urolithin M6, the urolithin M6 produced in Step (II) is then used as is as the urolithin M6 in Step (III) to produce urolithin C, and the urolithin C produced in Step (III) is then used as is as the urolithin C in Step (IV) to produce urolithin A in Step (IV), the series thereof is continuously implemented in the same system. That is, for example, this series does not include a step of separating and/or purifying the urolithin M5 produced in Step (I). Note that when microorganisms are used in each step, the microorganisms in each step may be the same or different.

The present aspect may include other steps. The details of these steps are the same as the details described in the section "1-3-1. Urolithin C production method (first aspect)".

<1-3-4. Urolithin a Production Method (Second Aspect)>

Another aspect of the present disclosure is a method (second aspect) for producing urolithin A.

The present aspect is a method for producing urolithin A, the method including Step (I):

Step (I): allowing a microorganism having an ability to produce urolithin A from urolithin C to produce urolithin A from the urolithin C produced by the method described in "1-3-2. Urolithin C production method (second aspect)".

The steps of the "1-3-2. Urolithin C production method (second aspect)" of the present aspect are described below. In this case, Step (I) described above corresponds to Step (IV) below.

Namely, the present aspect is a method for producing urolithin A, the method including Steps (I) to (IV):

Step (I): allowing a microorganism having an ability to produce urolithin M5 from ellagic acid to produce urolithin M5 from ellagic acid.

Step (II): bringing one or more components selected from the following (i) to (iv) into contact with the urolithin M5, so as to produce urolithin D:

- (i) the enzyme described in the section "1-1-1 (B). Enzyme that dehydroxylates the hydroxyl group at the 10-position of urolithins";
- (ii) a protein encoded by a polynucleotide described in the section "1-1-1 (B). Polynucleotide";
- (iii) a microorganism that produces the enzyme described in (i) above or the protein described in (ii) above; and
- (iv) a treated product of the microorganism described in (iii) above.

Step (III): bringing one or more components selected from the following (v) to (viii) into contact with the urolithin D, so as to produce urolithin C:

- (v) the enzyme described in the section "1-1-1 (A). Enzyme that dehydroxylates the hydroxyl group at the 4-position of urolithins";
- (vi) a protein encoded by a polynucleotide described in the section "1-1-1 (A). Polynucleotide";
- (vii) a microorganism that produces the enzyme described in (i) above or the protein described in (v) above; and
- (viii) a treated product of the microorganism described in (vii) above.

Step (IV): allowing a microorganism having an ability to produce urolithin A from urolithin C to produce urolithin A from the urolithin C.

(Step (I) to Step (III))

Regarding Step (I) to Step (III), the details described in the aforementioned "1-3-1. Urolithin C production method (first aspect)" are incorporated by reference.

(Step (IV))

In Step (IV), a microorganism having an ability to produce urolithin A from urolithin C is allowed to produce urolithin A from urolithin C. Regarding Step (IV), the details described in the aforementioned "1-3-3. Urolithin A production method (first aspect)" section are incorporated by reference.

One or more of the steps selected from the group consisting of Step (I) through Step (IV) may be implemented in the same system.

The above "implemented in the same system" means that with regard to the series in which the urolithin M5 produced in Step (I) is used as is as the urolithin M5 in Step (II) to produce urolithin D, the urolithin D produced in Step (II) is then used as is as the urolithin D in Step (III) to produce urolithin C, and the urolithin C produced in Step (III) is then used as is as the urolithin C in Step (IV) to produce urolithin A in Step (III), the series thereof is continuously implemented in the same system. That is, for example, this series does not include a step of separating and/or purifying the urolithin M5 produced in Step (I). Note that when microorganisms are used in each step, the microorganisms in each step may be the same or different.

The present aspect may include other steps. The details of these steps are the same as the details described in the section "1-3-1. Urolithin C production method (first aspect)".

<2-1-1. Ellagic Acid Transporter>

Another aspect of the present disclosure is an ellagic acid transporter.

The ellagic acid transporter according to the present aspect is preferably derived from a microorganism belonging to the genus *Gordonibacter*.

The ellagic acid transporter thereof is more preferably one or more selected from the group consisting of: a microorganism belonging to *Gordonibacter urolithinfaciens*; a microorganism belonging to *Gordonibacter pamelaeae*; and a microorganism belonging to *Gordonibacter faecihominis*.

The microorganism belonging to *Gordonibacter urolithinfaciens* is preferably of the *Gordonibacter urolithinfaciens* DSM 27213 strain.

The microorganism belonging to *Gordonibacter pamelaeae* is preferably of the DSM 19378 strain.

The microorganism belonging to *Gordonibacter faecihominis* is preferably of the JCM 16058 strain.

The amino acid sequence of the ellagic acid transporter derived from the *Gordonibacter urolithinfaciens* DSM 27213 strain is the sequence represented by SEQ ID NO: 25. Also, the base sequence of the gene encoding the ellagic acid transporter thereof is the sequence represented by SEQ ID NO: 26.

The amino acid sequence of the ellagic acid transporter derived from the *Gordonibacter pamelaeae* DSM 19378 strain is the sequence represented by SEQ ID NO: 27. Also, the base sequence of the gene encoding the ellagic acid transporter thereof is the sequence represented by SEQ ID NO: 28.

Therefore, the ellagic acid transporter according to the present aspect is preferably a protein (an ellagic acid transporter) containing the amino acid sequence represented by SEQ ID NO: 25 or containing the amino acid sequence represented by SEQ ID NO: 27.

Also, the ellagic acid transporter derived from the *Gordonibacter urolithinfaciens* DSM 27213 strain may be a protein formed from amino acids, the protein thereof being such that in the amino acid sequence represented by SEQ ID NO: 25, one to a plurality of amino acids are substituted or deleted, or one to a plurality of amino acids are inserted or added, as long as the protein exhibits an ellagic acid transporter activity. One to a plurality means preferably from 1 to 50, more preferably from 1 to 49, even more preferably from 1 to 48, yet even more preferably from 1 to 30, particularly preferably from 1 to 10, and more particularly preferably from 1 to 5, and the same applies to a case in which the amino acids are added to the N-terminal side and/or the C-terminal side.

The details of an aspect of substitution are the same as the details described in the section "1-1-1 (A). Enzyme that dehydroxylates the hydroxyl group at the 4-position of urolithins" above.

Also, the ellagic acid transporter derived from the *Gordonibacter urolithinfaciens* DSM 27213 strain may be a protein having homology of 80% or greater, preferably 90% or greater, more preferably 95% or greater, even more preferably 97% or greater, and particularly preferably 99% or greater in relation to the entire length of the amino acid sequence represented by SEQ ID NO: 25, as long as the protein exhibits an ellagic acid transporter activity.

Also, the ellagic acid transporter derived from the *Gordonibacter urolithinfaciens* DSM 27213 strain may be a protein encoded by a polynucleotide that hybridizes under stringent conditions with a base sequence represented by SEQ ID NO: 26, as long as the protein exhibits an ellagic acid transporter activity. "Stringent conditions" include, for example, conditions in which polynucleotides having homology of, for example, 80% or greater, preferably 90% or greater, more preferably 95% or greater, even more preferably 97% or greater, and particularly preferably 99% or greater hybridize, while polynucleotides having homology less than this do not hybridize.

The details regarding substitutions of the amino acids, protein homology, stringent conditions, and the like are also applicable to an ellagic acid transporter derived from the *Gordonibacter pamelaeae* DSM 19378 strain. However, with regard to an ellagic acid transporter derived from the DSM 19378 strain, the "one to a plurality" is preferably from 1 to 52, more preferably from 1 to 51, even more preferably from 1 to 50, yet even more preferably from 1 to 30, particularly preferably from 1 to 10, and even more particularly preferably from 1 to 5.

The ellagic acid transporter activity from an ellagic acid transporter according to the present aspect can be evaluated, for example, as described in Experimental Example 18-1 below.

<2-1-2. Polynucleotide Containing a Gene Encoding an Ellagic Acid Transporter>

Another aspect of the present disclosure is a polynucleotide containing a base sequence represented by SEQ ID NO: 26 or containing a base sequence represented by SEQ ID NO: 28. The details of each base sequence are as previously described.

The base sequence of a gene encoding the ellagic acid transporter derived from the *Gordonibacter urolithinfaciens* DSM 27213 strain may be a base sequence that hybridizes with the base sequence represented by SEQ ID NO: 26 under stringent conditions, as long as the protein encoded by the gene thereof exhibits an ellagic acid transporter activity. "Stringent conditions" include, for example, conditions in which polynucleotides having homology of, for example, 80% or greater, preferably 90% or greater, more preferably 95% or greater, even more preferably 97% or greater, and particularly preferably 99% or greater hybridize, while polynucleotides having homology less than this do not hybridize.

This matter is also applicable to a base sequence of a gene encoding an ellagic acid transporter derived from the *Gordonibacter pamelaeae* DSM 19378 strain.

<2-1-3. Genetic Engineering Aspects>

Other aspects of the present disclosure include a recombinant vector containing the polynucleotide described in the section "2-1-2. Polynucleotide containing a gene encoding an ellagic acid transporter", a transformant in which the polynucleotide described in the section "2-1-2. Polynucleotide containing a gene encoding an ellagic acid transporter" is expressively retained, or in which the vector is expressively retained, and a method for producing a protein encoded by the polynucleotide, the method including a step of culturing the transformant. The protein is the "ellagic acid transporter".

The details of these aspects are similar to the details described in the "1-1-3 (A). Genetic engineering aspects" section.

The transformant promotes the uptake of ellagic acid into the cell thereof from outside the cell. Accordingly, another preferable aspect is a method of promoting the uptake of ellagic acid into the cell of the transformant from outside the cell, the method including the following Step (I) below:

Step (I): bringing the transformant into contact with ellagic acid.

The details of the transformant are similar to the details described in the previously mentioned "1-1-3 (A). Genetic engineering aspects" section. Furthermore, an example of an "aspect in which the transformant is caused into contact with ellagic acid" is an aspect in which the microorganism that produces the enzyme described in (i) or the microorganism that produces the protein described in (ii) are used in the method described in the section "1-2-1 (A). Method for dehydroxylating the hydroxyl group at the 4-position of urolithins".

<2-1-4. Urolithin M5 Production Method (First Aspect)>

Another aspect of the present disclosure is a method (first aspect) for producing urolithin M5.

The present aspect is a method for producing urolithin M5, the method including the following Step (I):

Step (I): bringing the transformant described in the section "2-1-3. Genetic engineering aspects", wherein host of the transformant is a microorganism having an ability to produce urolithin M5 from ellagic acid, into contact with ellagic acid, so as to produce urolithin M5 from the ellagic acid.

(Step (I))

In Step (I), a transformant described in the section "2-1-3. Genetic engineering aspects", wherein host of the transformant is a microorganism having an ability to produce urolithin M5 from ellagic acid, is brought into contact with ellagic acid, so as to produce urolithin M5 from the ellagic acid.

The microorganism, which is the host and has the ability to produce urolithin M5 from ellagic acid, may be *E. coli*, which is commonly used as a host for transformation, but other examples can include the microorganism described in the section "1-2-1 (B). Method for dehydroxylating the hydroxyl group at the 10-position of urolithins" above.

Furthermore, an example of an aspect of contact between the transformant and ellagic acid is an aspect in which the microorganism that produces the enzyme described in (i) or the microorganism that produces the protein described in (ii) are used in the method described in the section "1-2-1 (A). Method for dehydroxylating the hydroxyl group at the 4-position of urolithins".

The present aspect may include other steps. The details of these steps are the same as the details described in the section "1-3-1. Urolithin C production method (first aspect)". Also, for example, urolithins may be produced in accordance with the method for producing urolithins described in the present specification, using the urolithin M5 that is produced. In addition, the present aspect may be implemented with a step of producing urolithin M5 from an ellagic acid in the method for producing urolithins described herein.

<2-1-5. Urolithin C Production Method (Third Aspect)>

Another aspect of the present disclosure is a method for producing urolithin C (third aspect).

The present aspect is a method for producing urolithin C, the method including the following Step (I):

Step (I): bringing the transformant described in the section "2-1-3. Genetic engineering aspects", wherein host of the transformant is a microorganism having an ability to produce urolithin C from ellagic acid, into contact with ellagic acid, so as to produce urolithin C from the ellagic acid.

(Step (I))

In Step (I), a transformant described in the section "2-1-3. Genetic engineering aspects", wherein host of the transformant is a microorganism having an ability to produce urolithin C from ellagic acid, is brought into contact with ellagic acid.

The microorganisms having the ability to produce urolithin C from ellagic acid may be *E. coli*, which is commonly used as a host for transformation, but other examples can include the microorganisms described in the section "1-3-1. Urolithin C production method (first aspect)" above.

Furthermore, an example of an aspect of contact between the transformant and ellagic acid is an aspect in which the microorganism that produces the enzyme described in (i) or the microorganism that produces the protein described in (ii) are used in the method described in the section "1-2-1 (A). Method for dehydroxylating the hydroxyl group at the 4-position of urolithins".

The present aspect may include other steps. The details of these steps are the same as the details described in the section "1-3-1. Urolithin C production method (first aspect)". Also, for example, urolithins may be produced in accordance with the method for producing urolithins described in the present specification, using the urolithin C that is produced. In addition, the present aspect may be implemented with a step of producing urolithin C from an ellagic acid in the method for producing urolithins described herein.

<2-1-6. Urolithin a Production Method (Third Aspect)>

Another aspect of the present disclosure is a method for producing urolithin A (third aspect).

The present aspect is a method for producing urolithin A, the method including the following Step (I):

Step (I): allowing a microorganism having the ability to produce urolithin A from urolithin C to produce urolithin A from the urolithin C produced by the production method described in the section "2-1-5. Urolithin C production method (third aspect)".

The steps of the "2-1-5. Urolithin C production method (third aspect)" of the present aspect are described below. In this case, Step (I) described above corresponds to Step (II) below.

That is, the present aspect is a method for producing urolithin A, the method including the following Steps (I) and (II):

Step (I): bringing the transformant described in the section "2-1-3. Genetic engineering aspects", wherein host of the transformant is a microorganism having an ability to produce urolithin C from ellagic acid, into contact with ellagic acid, so as to produce urolithin C from the ellagic acid.

Step (II): allowing a microorganism having the ability to produce urolithin A from urolithin C to produce urolithin A from the urolithin C.

(Step (I))

Regarding Step (I), the details described in the aforementioned "2-1-5. Urolithin C production method (third aspect)" are incorporated by reference.

(Step (II))

In Step (II), a microorganism having the ability to produce urolithin A from urolithin C is caused to produce urolithin A from urolithin C. Regarding Step (II), the details described in the aforementioned "1-3-3. Urolithin A production method (first aspect)" section are incorporated by reference.

Steps (I) and (II) may be implemented in the same system.

The above "implemented in the same system" means that with regard to the series in which the urolithin C produced in Step (I) is used as is as the urolithin C in Step (II) to produce the urolithin A in Step (II), the series is continuously implemented in the same system. That is, for example, this series does not include a step of separating and/or purifying the urolithin C produced in Step (I). Note that when microorganisms are used in each step, the microorganisms in each step may be the same or different.

The present aspect may include other steps. The details of these steps are the same as the details described in the section "1-3-1. Urolithin C production method (first aspect)".

<2-2-1. Lactonase>

Another aspect of the present disclosure is a lactonase.

Lactonases exhibit activity of catalyzing a reaction in which at least one of the two ester bonds present in ellagic acid is hydrolyzed. For example, a lactonase exhibits activity of catalyzing a reaction in which urolithin M5 is produced from ellagic acid.

The lactonase according to the present aspect is preferably derived from a microorganism belonging to the genus *Gordonibacter*.

The lactonase is more preferably one or more selected from the group consisting of: a microorganism belonging to *Gordonibacter urolithinfaciens*; a microorganism belonging to *Gordonibacter pamelaeae*; and a microorganism belonging to *Gordonibacter faecihominis*.

The microorganism belonging to *Gordonibacter urolithinfaciens* is preferably of the *Gordonibacter urolithinfaciens* DSM 27213 strain.

The microorganism belonging to *Gordonibacter pamelaeae* is preferably of the DSM 19378 strain.

The microorganism belonging to *Gordonibacter faecihominis* is preferably of the JCM 16058 strain.

The amino acid sequence of the lactonase of the *Gordonibacter urolithinfaciens* DSM 27213 strain is the sequence represented by SEQ ID NO: 29. Furthermore, the base sequence of the gene encoding the lactonase thereof is the sequence represented by SEQ ID NO: 30.

The amino acid sequence of the lactonase derived from the *Gordonibacter pamelaeae* DSM 19378 strain is the sequence represented by SEQ ID NO: 31. Moreover, the base sequence of the gene encoding the lactonase thereof is the sequence represented by SEQ ID NO: 32.

Therefore, the lactonase according to the present aspect is preferably a protein (lactonase) containing the amino acid sequence represented by SEQ ID NO: 29 or containing the amino acid sequence represented by SEQ ID NO: 31.

Also, the lactonase derived from the *Gordonibacter urolithinfaciens* DSM 27213 strain may be a protein formed from amino acids, the protein thereof being such that in the amino acid sequence represented by SEQ ID NO: 29, one to a plurality of amino acids are substituted or deleted, or one to a plurality of amino acids are inserted or added, as long as the protein exhibits lactonase activity. One to a plurality means preferably from 1 to 36, more preferably from 1 to 35, even more preferably from 1 to 20, yet even more preferably from 1 to 10, and particularly preferably from 1 to 5, and the same applies to a case in which the amino acids are added to the N-terminal side and/or the C-terminal side.

The details of an aspect of substitution are the same as the details described in the section "1-1-1 (A). Enzyme that dehydroxylates the hydroxyl group at the 4-position of urolithins" above.

Also, the lactonase derived from the *Gordonibacter urolithinfaciens* DSM 27213 strain may be a protein having homology of 80% or greater, preferably 90% or greater, more preferably 95% or greater, even more preferably 97% or greater, and particularly preferably 99% or greater in relation to the entire length of the amino acid sequence represented by SEQ ID NO: 29, as long as the protein exhibits lactonase activity.

Furthermore, the lactonase derived from the *Gordonibacter urolithinfaciens* DSM 27213 strain may be a protein encoded by a polynucleotide that hybridizes under stringent conditions with a base sequence represented by SEQ ID NO: 30, as long as the protein exhibits lactonase activity. "Stringent conditions" include, for example, conditions in which polynucleotides having homology of, for example, 80% or greater, preferably 90% or greater, more preferably 95% or greater, even more preferably 97% or greater, and particularly preferably 99% or greater hybridize, while polynucleotides having homology less than this do not hybridize.

The details regarding substitutions of the amino acids, protein homology, stringent conditions, and the like are also applicable to an ellagic acid transporter derived from the *Gordonibacter pamelaeae* DSM 19378 strain. However, with regard to the ellagic acid transporter derived from the *Gordonibacter pamelaeae* DSM 19378 strain, the "one to a plurality" is preferably from 1 to 36, more preferably from 1 to 35, even more preferably from 1 to 20, yet even more preferably from 1 to 10, and particularly preferably from 1 to 5.

The lactonase activity from the lactonase according to the present aspect can be evaluated, for example, as follows. A reaction solution containing 20 mM of a potassium phosphate buffer (pH 6.5), 1 mg/mL of ellagic acid, and a lactonase is prepared and reacted for 3 hours at 37° C., after which the urolithin M5 that is produced is measured through high-performance liquid chromatography (HPLC) under the following conditions.

<HPLC Conditions>

Column: Cosmosil 5C18-AR-II (4.6 mm inner diameter× 150 mm length)

Eluent: ultrapure water (Milli Q water)/acetonitrile/formic acid=80/20/1

Flow rate: 1 mL/min

Column temperature: 40° C.

Detection: UV (349 nm)

<2-2-2. Polynucleotide Containing a Gene Encoding a Lactonase>

Another aspect of the present disclosure is a polynucleotide containing a base sequence represented by SEQ ID NO: 30 or containing a base sequence represented by SEQ ID NO: 32. The details of each base sequence are as previously described.

The base sequence of a gene encoding the lactonase derived from the *Gordonibacter urolithinfaciens* DSM 27213 strain may be a base sequence that hybridizes with the base sequence represented by SEQ ID NO: 30 under stringent conditions, as long as the protein encoded by the gene thereof exhibits lactonase activity. "Stringent conditions" include, for example, conditions in which polynucleotides having homology of, for example, 80% or greater, preferably 90% or greater, more preferably 95% or greater, even more preferably 97% or greater, and particularly preferably 99% or greater hybridize, while polynucleotides having homology less than this do not hybridize.

This matter is also applicable to a base sequence of a gene encoding lactonase derived from the *Gordonibacter pamelaeae* DSM 19378 strain.

<2-2-3. Genetic Engineering Aspects>

Other aspects of the present disclosure include a recombinant vector containing the polynucleotide described in the section "2-2-2. Polynucleotide containing a gene encoding a lactonase", a transformant in which the polynucleotide described in the section "2-2-2. Polynucleotide containing a gene encoding lactonase" is expressively retained, or in which the vector is expressively retained, and a method for producing a protein encoded by the polynucleotide, the method including a step of culturing the transformant. The protein is the "lactonase".

The details of these aspects are similar to the details described in the "1-1-3 (A). Genetic engineering aspects" section.

Also, the transformant is one having an activity of catalyzing a reaction in which at least one of the two ester bonds present in ellagic acid is hydrolyzed. Accordingly, a preferred aspect is also a method of promoting the reaction that hydrolyzes at least one of the two ester bonds present in the ellagic acid, the method including the following Step (I):

Step (I): bringing the transformant into contact with ellagic acid.

The details of the transformant are similar to the details described in the previously mentioned "1-1-3 (A). Genetic engineering aspects" section. Furthermore, an example of an "aspect in which the transformant is caused into contact with ellagic acid" is an aspect in which the microorganism that produces the enzyme described in (i) or the microorganism that produces the protein described in (ii) are used in the method described in the section "1-2-1 (A). Method for dehydroxylating the hydroxyl group at the 4-position of urolithins".

With the transformant in which the polynucleotide described in the section "2-2-2. Polynucleotide containing a gene encoding lactonase" is expressively retained, or in which the vector is expressively retained, it is preferable that expression of the polynucleotide described in the section "2-1-2. Polynucleotide containing a gene encoding an ellagic acid transporter" also be possible. That is, with the transformant, it is preferable that the lactonase and the ellagic acid transporter are co-expressed.

<2-2-4. Urolithin M5 Production Method (Second Aspect)>

Another aspect of the present disclosure is a method (second aspect) for producing urolithin M5.

The present aspect is a method for producing urolithin M5, the method including the following Step (I):

Step (I): bringing the transformant described in the section "2-2-3. Genetic engineering aspects" into contact with ellagic acid, so as to produce urolithin M5 from the ellagic acid.

(Step (I))

In Step (I), the transformant described in the section "2-2-3. Genetic engineering aspects" is caused into contact with ellagic acid, so as to produce urolithin M5 from the ellagic acid.

The transformant described in the section "2-2-3. Genetic engineering aspects" is a microorganism having the ability to produce urolithin M5 from ellagic acid in order to express lactonase.

Furthermore, an example of an aspect of contact between the transformant and ellagic acid is an aspect in which the microorganism that produces the enzyme described in (i) or the microorganism that produces the protein described in (ii) are used in the method described in the section "1-2-1 (A). Method for dehydroxylating the hydroxyl group at the 4-position of urolithins".

The present aspect may include other steps. The details of these steps are the same as the details described in the section "1-3-1. Urolithin C production method (first aspect)". Also, for example, urolithins may be produced in accordance with the method for producing urolithins described in the present specification, using the urolithin M5 that is produced. In addition, the present aspect may be implemented with a step of producing urolithin M5 from an ellagic acid in the method for producing urolithins described herein.

<2-2-5. Urolithin C Production Method (Fourth Aspect)>

Another aspect of the present disclosure is a method for producing urolithin C (fourth aspect).

The present aspect is a method for producing urolithin C, the method including the following Step (I):

Step (I): bringing the transformant described in the section "2-2-3. Genetic engineering aspects", wherein host of the transformant is a microorganism having an ability to produce urolithin C from urolithin M5, into contact with ellagic acid, so as to produce urolithin M5 from the ellagic acid, and then produce urolithin C from the urolithin M5.

(Step (I))

In Step (I), the transformant described in the section "2-2-3. Genetic engineering aspects", wherein host of the transformant is a microorganism having an ability to produce urolithin C from urolithin M5, is brought into contact with ellagic acid, so as to produce urolithin M5 from the ellagic acid, and then produce urolithin C from the urolithin M5.

The transformant described in the section "2-2-3. Genetic engineering aspects" is a microorganism having the ability to produce urolithin M5 from ellagic acid in order to express lactonase.

Also, the microorganism, which is the host and has the ability to produce urolithin C from urolithin M5, may be *E. coli*, which is commonly used as a host for transformation, but other examples can include the microorganism described in the section "1-2-1 (B). Method for dehydroxylating the hydroxyl group at the 10-position of urolithins" above.

Furthermore, an example of an aspect of contact between the transformant and ellagic acid is an aspect in which the microorganism that produces the enzyme described in (i) or the microorganism that produces the protein described in (ii) are used in the method described in the section "1-2-1 (A). Method for dehydroxylating the hydroxyl group at the 4-position of urolithins".

The present aspect may include other steps. The details of these steps are the same as the details described in the section "1-3-1. Urolithin C production method (first aspect)". Also, for example, urolithins may be produced in accordance with the method for producing urolithins described in the present specification, using the urolithin C that is produced. In addition, in the method for producing urolithins described herein, the present aspect may be implemented with a step of producing urolithin M5 from ellagic acid, and a step of producing urolithin C from the urolithin M5.

<2-2-6. Urolithin a Production Method (Fourth Aspect)>

Another aspect of the present disclosure is a method (fourth aspect) for producing urolithin A.

The present aspect is a method for producing urolithin A, the method including the following Step (I) and (II):

Step (I): bringing the transformant described in the section "2-2-3. Genetic engineering aspects", wherein host of the transformant is a microorganism having an ability to produce urolithin C from urolithin M5, into contact with ellagic acid, so as to produce urolithin M5 from the ellagic acid, and then produce urolithin C from the urolithin M5.

Step (II): allowing a microorganism having the ability to produce urolithin A from urolithin C to produce urolithin A from the urolithin C.

(Step (I))

Regarding Step (I), Step (I) described in the section "2-2-5. Urolithin C production method (fourth aspect)" is incorporated by reference.

(Step (II))

In Step (II), a microorganism having the ability to produce urolithin A from urolithin C is allowed to produce urolithin A from urolithin C. Regarding Step (II), the details described in the aforementioned "1-3-3. Urolithin A production method (first aspect)" section are incorporated by reference.

Steps (I) and (II) may be implemented in the same system. The above "implemented in the same system" means that the series in which the urolithin C produced in Step (I) is used as is as the urolithin C in Step (II) to produce the urolithin A in Step (II) is continuously implemented in the same system. That is, for example, this series does not include a step of separating and/or purifying the urolithin C produced in Step (I). Note that when microorganisms are used in each step, the microorganism in each step may be the same or different.

The present aspect may include other steps. The details of these steps are the same as the details described in the section "1-3-1. Urolithin C production method (first aspect)".

EXAMPLES

Examples are described below, but none of the examples are interpreted to be limiting.

Experimental Example 1: Preparation of Bacterial Cells for Proteome Analysis

A 10 mL ABB culture medium (ANAEROBE BASAL BROTH, Oxoid Limited, Code CM0957) containing 0.1% of ellagic acid (Sigma-Aldrich Corporation) and a 10 mL ABB culture medium (ANAEROBE BASAL BROTH, Oxoid Limited, Code CM0957) not containing the ellagic acid were both inoculated with the *Gordonibacter urolithinfaciens* DSM 27213 strain, and then cultured for 16 days at 37° C. in an anaerobic gas ($N_2/H_2/CO_2$=80:10:10) environment.

The culturing solutions were centrifuged to collect bacterial cells, and the bacterial cells were then used in proteome analysis.

Experimental Example 2: Proteome Analysis

The bacterial cells prepared in Experimental Example 1 were lysed using a lysate (7 M urea, 2 M thiourea, 2% CHAPS (3-[(3-cholamidopropyl)dimethylammonio]propanesulfonate), 10 mM DTT (dithiothreitol), and 50 mM tris-hydrochloric acid buffer (pH 7.0)), and were then subjected to proteome analysis through the method described in AMB Express, 2:37 (2012).

As a result, in comparison to the case in which culturing was implemented with the culture medium not containing ellagic acid, in the case in which culturing was implemented with a culture medium containing ellagic acid, proteins with significantly increased expression, that is, proteins for which expression was induced by the ellagic acid, were detected. The proteins were then analyzed on the basis of genomic information, and CD2938, CD2940, CD2941, CD2942 and CD2943, as well as CD2949, CD2950 and CD2952 were identified. GENETYX (Genetyx Corporation) was used was for analysis of gene information such as homology analysis.

Experimental Example 3: Protein Function Prediction

The functions of the amino acid sequences of CD2938, CD2940, CD2941, CD2942 and CD2943 were predicted through a homology search with known proteins. The results were as follows.

CD2938 was presumed to be "anaerobic dehydrogenase having Se-Cys (selenocysteine) and Mo (molybdenum)-pterin bonding regions".

CD2940 was presumed to be a "hydrogenase component having an Fe—S (iron-sulfur) cluster".

CD2941 exhibited homology with "cations and various drug delivery pumps".

It is presumed that these CD2938, CD2940, and CD2941 may be sub-units that constitute an enzyme that dehydroxylates the hydroxyl group at the 4-position of urolithins. These genes were named GuuroA1, GuuroA2, and GuuroA3. In addition, these genes are genes encoding for GuUroA1, GuUroA2, and GuUroA3, respectively.

CD2942 was presumed to be a "metal-dependent hydrolase", and the gene thereof was named uroH. This gene encodes a lactonase. The lactonase thereof exhibits activity of catalyzing a reaction in which at least one of the two ester bonds present in ellagic acid is hydrolyzed.

The CD2943 was presumed to be a "permease belonging to the major facilitator superfamily" and was named uroT. In the biosynthesis pathway of urolithins, it is speculated that CD2943 functions as a transporter for uptake of ellagic acid into the bacterial cells.

Similar to CD2938 and CD2940, CD2949 and CD2950 are presumed to be "anaerobic dehydrogenase having Se-Cys (selenocysteine) and Mo (molybdenum)-pterin bonding regions" and a "hydrogenase component having an Fe—S (iron-sulfur) cluster", respectively.

The CD2952 is presumed to be related to "heme utilization or adsorption".

Thus, it is presumed that CD2949, CD2950, and CD2952 may be sub-units that constitute an enzyme that dehydroxylates the hydroxyl group at the 10-position of urolithins. These genes were named GuuroB1, GuuroB2, and GuuroB3. In addition, these genes encode GuUroB1, GuUroB2, and GuUroB3, respectively.

The homology between CD2938 and CD2949, the homology between CD2940 and CD2950, and the homology between CD2941 and CD2951 were 42%, 50%, and 17%, respectively, and thus the possibility that "CD2938 and CD2940", "CD2949 and CD2950", "CD2938 and CD2940 and CD2941" and "CD2949 and CD2950 and CD2952" function as complexes was suggested.

Experimental Example 4: Purification of Enzyme that Dehydroxylates the Hydroxyl Group at the 4-Position of Urolithins (Culturing of Microorganisms)

As a pre-culture, 20 mL of a modified GAM culture medium (Nihon Pharmaceutical Co., Ltd.) containing 0.1 mg/mL of ellagic acid was added to a 100 mL Erlenmeyer flask and then inoculated with the *Gordonibacter urolithinfaciens* DSM 27213 strain, after which the mixture was shaken at 80 rpm and cultured in an anaerobic chamber at 37° C. for 5 to 6 days.

A 2 L Erlenmeyer flask containing 1.75 L of the same culture medium was inoculated with a pre-culturing solution, and then shaken at 80 rpm and cultured in an anaerobic chamber for 7 to 9 days at 37° C.

The obtained culturing solution was centrifuged (8,000 rpm, 15 min, 4° C.) to prepare bacterial cells as a precipitated fraction.

(Preparation of Ultra-Centrifuged Supernatant)

The obtained bacterial cells were suspended in a 50 mM potassium phosphate buffer (KPB, pH 6.5), and the bacteria were crushed using a Kubota Insonator Model 201M (Kubota Corporation). The ultrasonic crushed liquid was centrifuged at 8,500 rpm for 30 minutes at 4° C., and the supernatant was then centrifuged for 60 minutes at 20,000 g to obtain a supernatant, which was then used as a cell-free extract. The obtained cell-free extract was then ultra-centrifuged at 100,000 g for 110 minutes to obtain a supernatant fraction.

(Enzyme Purification (Mono Q First Time))

The obtained ultra-centrifuged supernatant was subjected to anion exchange chromatography using a Mono Q 5/50 column (GE Healthcare Japan Corp.).

Eluent A: 50 mM KPB (pH 6.5)
Eluent B: 50 mM KPB (pH 6.5) and 1 M NaCl
Flow rate: 0.8 mL/min.

Gradient elution from the eluent A to the eluent B was implemented, the active fraction of the enzyme was collected and concentrated by gel filtration, and the resulting product was used as a 1st Mono Q fraction.

(Enzyme Purification (Superdex 200))

The obtained 1st Mono Q fraction was subjected to gel filtration chromatography using the Superdex 200 Increase 10/300 GL (Ge Healthcare Japan Corp.).

Eluent: 50 mM KPB (pH 6.5) and 150 mM NaCl
Flow rate: 0.25 mL/min

The active fraction of the enzyme was collected and concentrated by ultra-filtration, and the obtained product was used as a Superdex fraction.

(Enzyme Purification (Mono Q Second Time))

The resulting Superdex fraction was purified again by anion exchange chromatography through Mono Q.

Eluent A: 50 mM KPB (pH 6.5)
Eluent B: 50 mM KBP (pH 6.5) and 1 M NaCl
Flow rate: 0.8 mL/min.

Gradient elution from the eluent A to the eluent B was implemented, the active fraction of the enzyme was collected and concentrated by gel filtration, and the resulting product was used as a 2nd Mono Q fraction.

The purification process of the enzyme thus far is summarized in Table 1.

Experimental Example 5: Measuring the Activity of the Enzyme that Dehydroxylates the Hydroxyl Group at the 4-Position of Urolithins The activity of dehydroxylating the hydroxyl group at the 4-position of urolithins was measured for each fraction obtained in Experimental Example 4. Urolithin M5 was used as the urolithin having a hydroxyl group at the 4-position. When the hydroxyl group at the 4-position was dehydroxylated, urolithin M6 was produced.

An amount of 30 µL of a reaction solution for measuring enzyme activity was inserted into a 200 µL tube for PCR with the reaction solution containing 1 mg/mL of urolithin M5, 10 mM of NADPH (reduced nicotinamide adenine dinucleotide phosphate), 0.2 mM of FAD (flavin adenine dinucleotide), 10 mM of MV (methyl viologen), 50 mM of KPB (potassium phosphate buffer, pH 6.5) and each fraction. The gas phase was set to the gas phase in the anaerobic chamber (Vinyl Anaerobic Chamber available from Coy Labs), and the materials were reacted at 37° C. for 90 minutes. Next, after the reaction was completed, 60 µL of N,N-dimethylacetamide containing 1% formic acid was added to the reaction solution and mixed, after which the supernatant of centrifugation was analyzed by HPLC.

HPLC was carried out under the following conditions, and the resulting urolithin M6 was quantitatively determined (detection wavelength: 348 nm).

<HPLC Conditions>

Column: COSMOSIL 5C18-ARII (4.6 mm inner diameter×150 mm length, available from Nacalai Tesque, Inc.)
Eluent: ultrapure water (Milli Q water)/acetonitrile (CH$_3$CN)/formic acid=80/20/1
Flow rate: 1.0 mL/min
Temperature: 40° C.
Detection: PDA (photodiode array)

Enzyme activity 1 U was the amount of enzyme for catalyzing the production of 1 µmol of urolithin M6 in 90 minutes.

The results are shown in Table 1.

TABLE 1

| Step | Volume (mL) | Protein (mg) | Enzyme Activity (U) | Specific Activity (U/mg) | Purification Scale Factor |
|---|---|---|---|---|---|
| Ultra-centrifuged supernatant | 10.0 | 8.52 | 0.542 | 0.0637 | 1 |
| 1st Mono Q | 1.50 | 0.77 | 0.085 | 0.111 | 1.74 |
| Superdex 200 | 1.35 | 0.0480 | 0.00541 | 0.113 | 1.77 |
| 2nd Mono Q | 0.150 | 0.00192 | 0.000223 | 0.116 | 1.83 |

Experimental Example 6: Native-PAGE of Enzyme that Dehydroxylates a Hydroxyl Group at the 4-Position of Urolithins and of an Enzyme that Dehydroxylates the Hydroxyl Group at the 10-Position of the Urolithins The enzyme fractions purified thus far were subjected to unmodified polyacrylamide electrophoresis (Native-PAGE) using a 5 to 20% gradient gel (PAGEL, NPG-520 L, ATTO Corp.), the resulting bands were semi-dry blotted with a PVDF membrane (Immobilon-P Transfer membrane, available from Millipore) using HorizeBLOT AE6677G (available from ATTO Corp.), each band was cut out, and the sequence was analyzed using an amino acid sequencer.

The results are illustrated in FIG. 1. In FIG. 1, 1 is a molecular weight marker lane, 2 is the lane of the ultra-centrifuged supernatant fraction, 3 is the lane of the first Mono Q fraction, 4 is the lane of the Superdex fraction, and 5 is lane of second Mono Q fraction.

From the amino acid sequence of band I, band I is presumed to be formate-tetrahydrofolate ligase.

Two types of amino acid sequences are obtained in band II, and these are presumed to be GuUroB1 (protein corresponding to the gene GuuroB1) and GuUroB2 (protein corresponding to the gene GuuroB2), respectively.

Two types of amino acid sequences are also obtained in band III, and these are presumed to be GuUroA1 (protein corresponding to the gene GuuroA1) and GuUroA2 (protein corresponding to the gene GuuroA2).

Experimental Example 7: SDS-PAGE of Enzyme that Dehydroxylates a Hydroxyl Group at the 4-Position of Urolithins and of an Enzyme that Dehydroxylates the Hydroxyl Group at the 10-Position of the Urolithins The enzyme fractions purified thus far were subjected to sodium dodecyl sulphate-polyacrylamide gel electrophoresis (SDS-PAGE) using a 5 to 20% gradient gel (e-PAGEL, E-R520L, available from ATTO Corp.), and the molecular weight was evaluated. The Protein Molecular Weight Marker (Broad) available from Takara Bio Inc. was used as the molecular weight marker.

The resulting bands were semi-dry blotted with a PVDF membrane (Immobilon-P Transfer membrane, available from Millipore) using HorizeBLOT AE6677G (available from ATTO Corp.), each band was cut out, and the sequence was analyzed using an amino acid sequencer.

Figure 2:
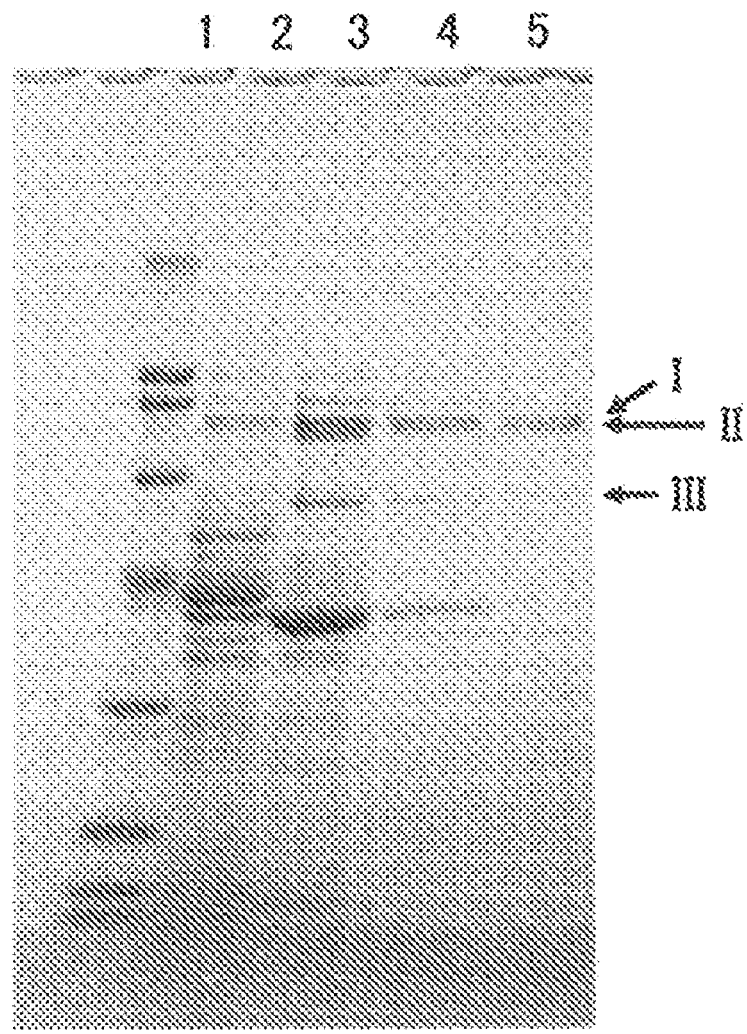
FIG. 2 (photograph as a substitute of drawing) illustrates the results obtained in one experimental example of the present disclosure through SDS-PAGE of an enzyme that dehydroxylates a hydroxyl group at the 4-position of urolithins and of an enzyme that dehydroxylates the hydroxyl group at the 10-position of the urolithins.

The results are illustrated in FIG. 2. In FIG. 2, 1 is a molecular weight marker lane, 2 is the lane of the ultra-centrifuged supernatant fraction, 3 is the lane of the first Mono Q fraction, 4 is the lane of the Superdex fraction, and 5 is lane of the second Mono Q fraction.

The amino acid sequences of band I and band II obtained in the 2nd Mono Q fraction in lane 5 were analyzed together, and as a result, two types of amino acid sequences were obtained. These amino acid sequences were identified as GuUroA1 (protein corresponding to the gene GuuroA1) and GuUroB1 (protein corresponding to the gene GuuroB1), respectively. The molecular mass of each band was assumed to be 90.0 kDa and 87.0 kDa, respectively.

From the amino acid sequence of band III, band III is presumed to be formate-tetrahydrofolate ligase.

Experimental Example 8: Effect of Cofactors on the Activity of Enzymes that Dehydroxylate the Hydroxyl Group at the 4-Position of Urolithins Cofactors of the concentrations listed in Table 2 were added to a reaction solution obtained by removing NADPH, FAD, and MV from the reaction solution for measuring enzyme activity described in Experimental Example 5, and the mixture was reacted, after which the produced urolithin M6 was quantitatively determined. The 1st Mono Q fraction was used as the enzyme. With the amount of urolithin M6 produced under the conditions indicated for No. 12 in Table 2 (10 mM MV, 10 mM NADPH, 0.2 mM FAD) considered to be 100%, the amount of urolithin M6 produced under each condition was expressed as a relative activity.

The results are summarized as shown in Table 2 below.

Activity was confirmed in cases where NADH, NADPH, FMN, or MV was added alone, as compared to a case in which none of these were added.

A synergistic increase in activity was also confirmed in cases in which NADH or NADPH was present along with the presence of MV.

A significant increase in activity was confirmed in cases in which FAD or FMN was present along with the presence of MV and NADPH.

The optimal condition was a combination of 10 mM MV, 10 mM NADPH, and 0.2 mM FAD.

In the following experimental examples, this condition was used as a standard activity measurement condition.

TABLE 2

| No. | Enzyme | Cofactors (mM) | | | | | Relative Activity |
| | | MV | NADH | NADPH | FAD | FMN | |
| --- | --- | --- | --- | --- | --- | --- | --- |
| 1 | — | — | — | — | — | — | 0.0% |
| 2 | + | — | — | — | — | — | 0.0% |
| 3 | + | — | 10 | — | — | — | 2.4% |
| 4 | + | — | — | 10 | — | — | 0.8% |
| 5 | + | — | — | — | 0.2 | — | 0.0% |
| 6 | + | — | — | — | — | 0.2 | 0.0% |
| 7 | + | 10 | — | — | — | — | 0.8% |
| 8 | + | 10 | 10 | — | — | — | 12.0% |
| 9 | + | 10 | — | 10 | — | — | 24.8% |
| 10 | + | 10 | — | — | 0.2 | — | 0.8% |
| 11 | + | 10 | — | — | — | 0.2 | 0.0% |
| 12 | + | 10 | — | 10 | 0.2 | — | 100% |
| 13 | + | 10 | — | 10 | — | 0.2 | 94.4% |

Experimental Example 9: Temperature Dependency of Enzymes that Dehydroxylate the Hydroxyl Group at the 4-Position of Urolithins Under the standard activity measurement conditions described in Experimental Example 8, the reaction temperature was changed, and the activity was measured.

Figure 3:
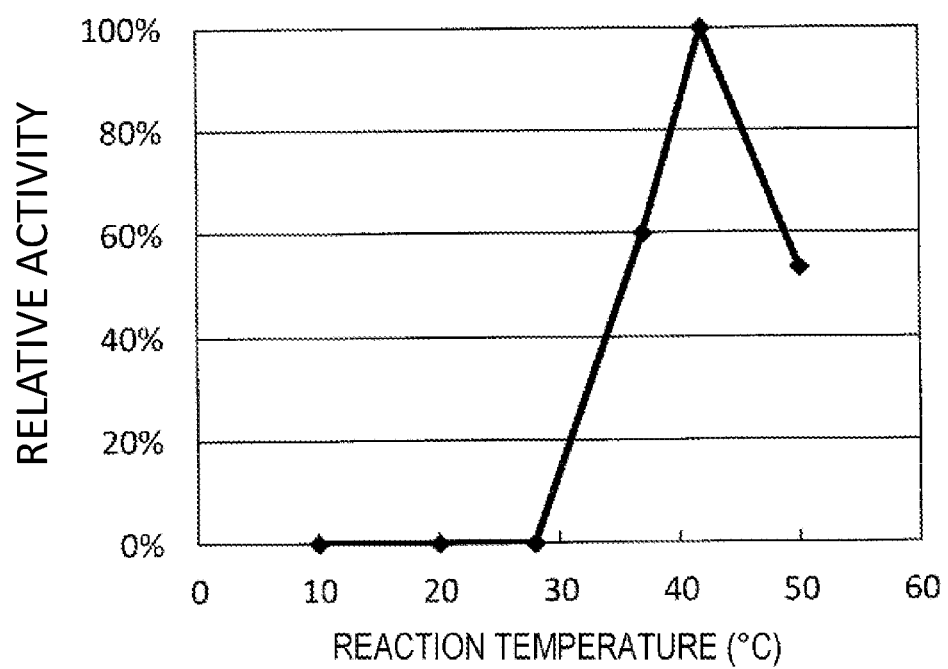
FIG. 3 is a graph illustrating the temperature dependency of an enzyme that dehydroxylates the hydroxyl group at the 4-position of urolithins in one experimental example of the present disclosure.

The results are illustrated in FIG. 3. The optimum temperature was 42° C., and the activity at that time was considered to be 100%. In the temperature range of 37 to 50° C., an activity of 50% or greater was exhibited.

Experimental Example 10: pH Dependency of Enzymes that Dehydroxylate the Hydroxyl Group at the 4-Position of Urolithins Under the standard activity measurement conditions described in Experimental Example 8, the pH was changed using the following buffer, and the activity was measured.

Citric acid buffer: 50 mM citric acid-sodium citrate buffer

Acetic acid buffer: 50 mM acetic acid-sodium acetate buffer

Potassium phosphate buffer: 50 mM $K_2HPO_4$—$KH_2PO_4$ buffer

Tris-HCl buffer: 50 mM Tris-hydrochloride buffer

Figure 4:
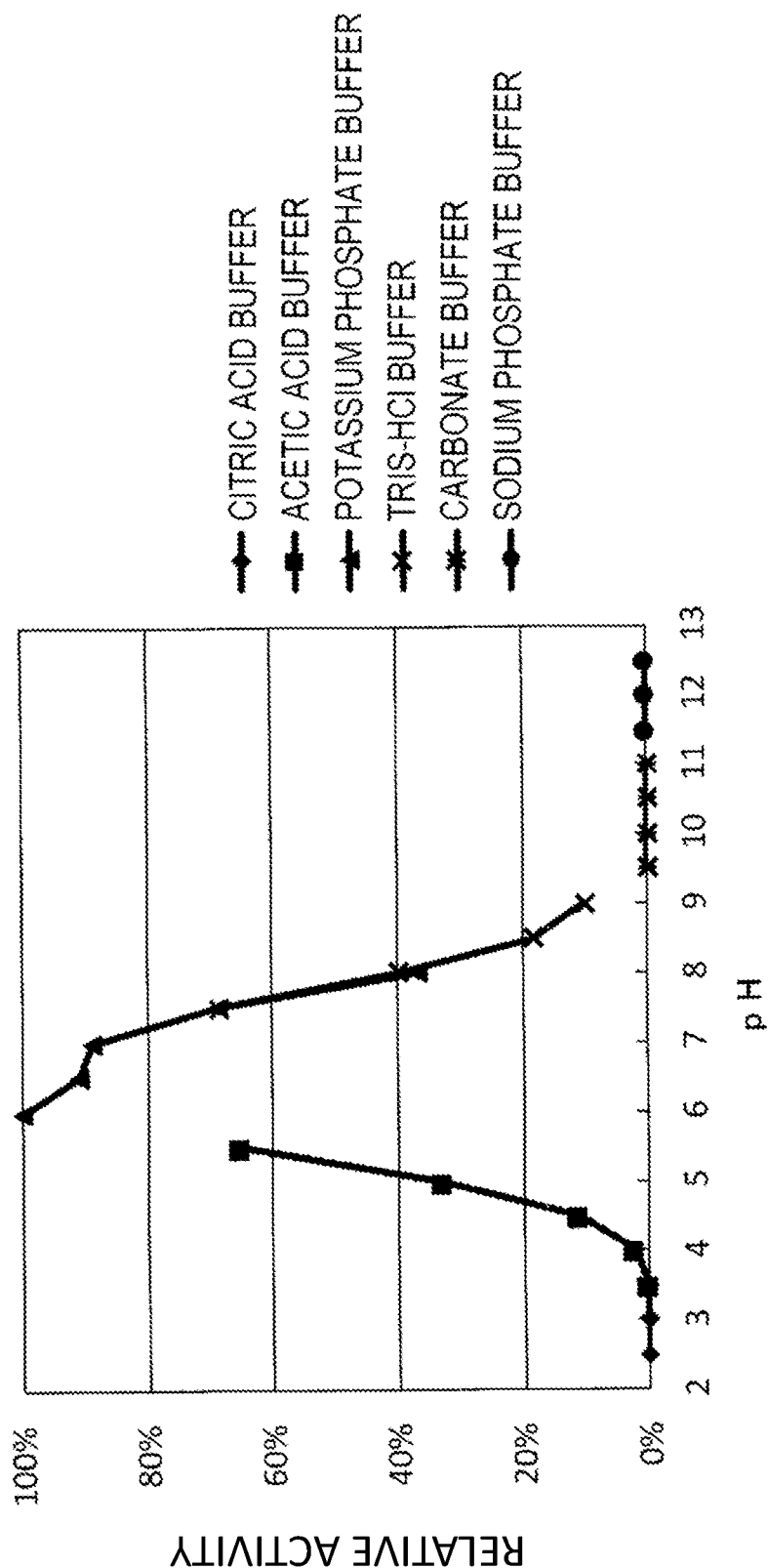
FIG. 4 is a graph illustrating the pH dependency of enzymes that dehydroxylate the hydroxyl group at the 4-position of urolithins in one experimental example of the present disclosure.

Carbonate buffer: 50 mM $Na_2CO_3$—$NaHCO_3$ buffer
Sodium phosphate buffer: 50 mM $Na_3PO_4$—$Na_2HPO_4$ buffer The results are illustrated in FIG. 4. The optimum pH was 6.0, and activity of 80% or more of the activity in optimum conditions was exhibited in a pH range of from 6.0 to 7.0.

Experimental Example 11: Temperature Stability of Enzymes that Dehydroxylate the Hydroxyl Group at the 4-Position of Urolithins The enzyme was maintained at a temperature of from 4 to 60° C. for 12 hours, after which the activity was measured at the standard activity measurement conditions described in Experimental Example 8.

Figure 5:
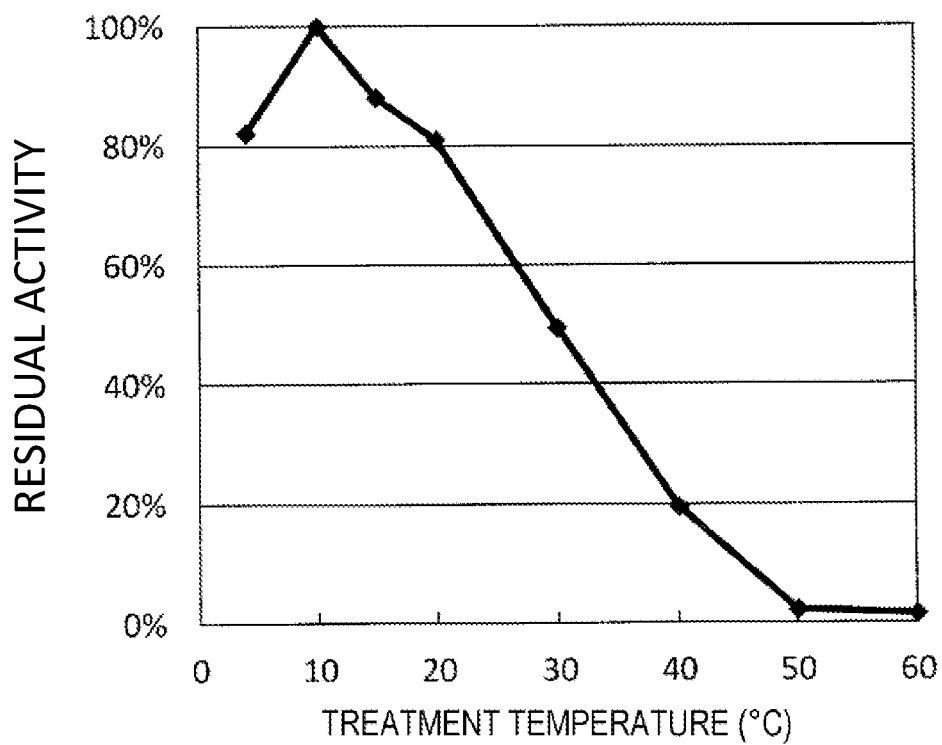
FIG. 5 is a graph illustrating the temperature stability of an enzyme that dehydroxylates the hydroxyl group at the 4-position of urolithins in one experimental example of the present disclosure.

The results are illustrated in FIG. 5. The optimum temperature was 10° C., and when the residual activity at 10° C. was considered to be 100%, a residual activity of 80% or greater was exhibited in a temperature range of from 4 to 20° C.

Experimental Example 12: pH Stability of Enzymes that Dehydroxylate the Hydroxyl Group at the 4-Position of Urolithins An amount of 90 µL of each of the following buffers at a molar concentration of 100 mM was added to 10 µL of the 1st Mono Q fraction as an enzyme, and the mixture was concentrated 10-fold through ultra-filtration, after which the resulting product was held at 4° C. for 12 hours. Subsequently, 60 µL of 50 mM KPB (pH 6.5) was added to restore the pH, and then the activity was measured under the standard activity measurement conditions described in Experimental Example 8.

Figure 6:
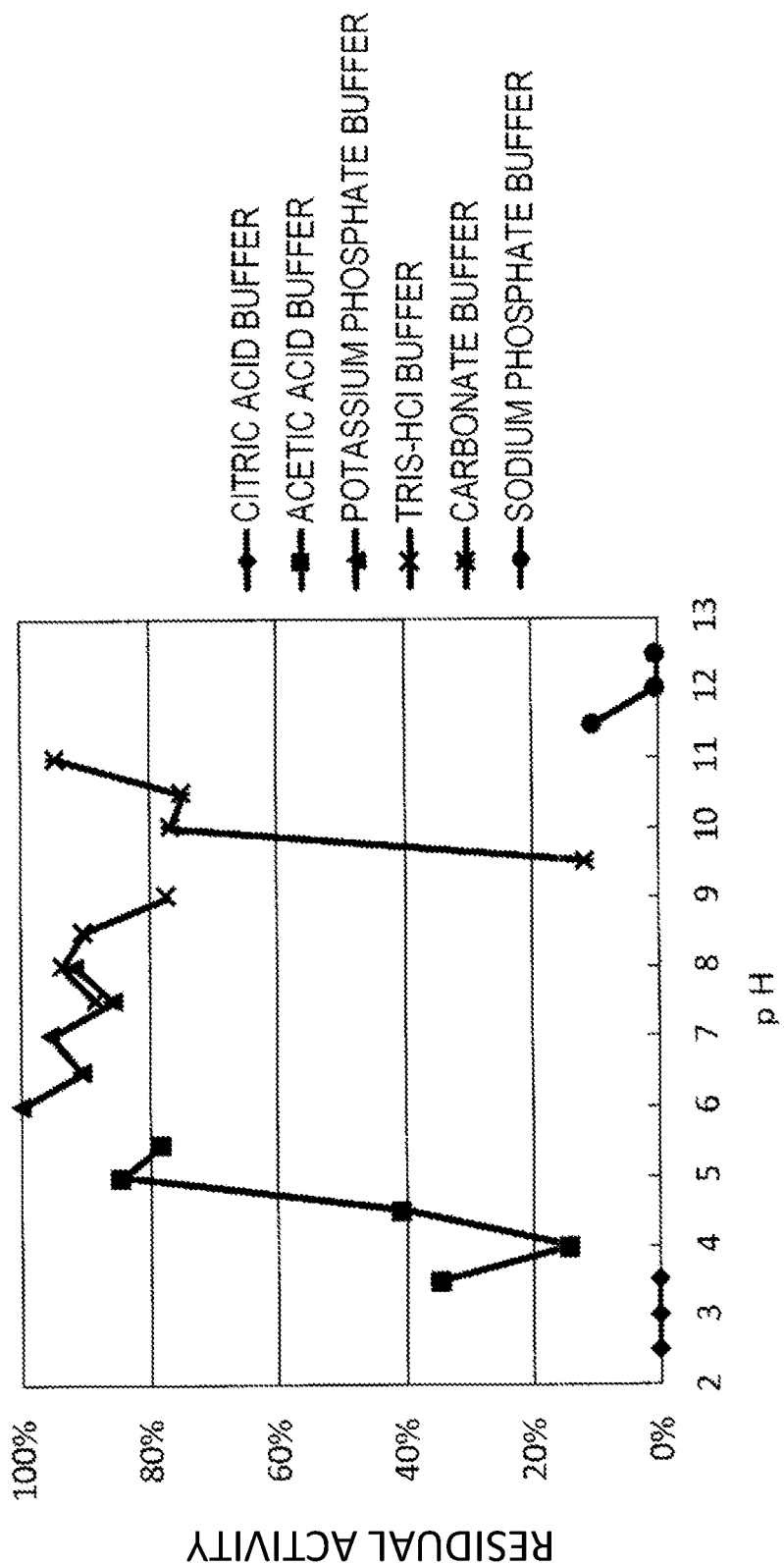
FIG. 6 is a graph illustrating the pH stabilities of enzymes that dehydroxylate the hydroxyl group at the 4-position of urolithins in one experimental example of the present disclosure.

Citric acid buffer: 50 mM citric acid-sodium citrate buffer
Acetic acid buffer: 50 mM acetic acid-sodium acetate buffer
Potassium phosphate buffer: 50 mM $K_2HPO_4$—$KH_2PO_4$ buffer
Tris-HCl buffer: 50 mM Tris-hydrochloride buffer
Carbonate buffer: 50 mM $Na_2CO_3$—$NaHCO_3$ buffer
Sodium phosphate buffer: 50 mM $Na_3PO_4$—$Na_2HPO_4$ buffer The results are illustrated in FIG. 6. The most stable pH was 6.0 (potassium phosphate buffer). Thus, the activity at a pH of 6.0 was considered to be 100%, and on the basis thereof, the residual activity was 75% or greater in a pH range of from 5.0 to 9.0. The residual activity was also 75% or greater in a pH range of from 10.0 to 11.0 (carbonate buffer).

Experimental Example 13: Construction of a Plasmid Expressing an Ellagic Acid Transporter Genomic DNA was prepared from the *Gordonibacter urolithinfaciens* DSM 27213 strain. This genomic DNA was then used as a template, and the ellagic acid transporter gene (uroT) was amplified by PCR using the following primer set and then inserted into the BamHI and EcoRI sites of the expression vector pRSFDuet-1 to construct pRSFDuet-1_uroT.

(SEQ ID NO: 33)
5'-AAAGGATCCATGAGCAATCCGAATGCCGCCGTAGCGGCAAGC-3'

(SEQ ID NO: 34)
5'-GTTGAATTCTTAGTGCTGTGCGGCTGCCTCGTCTGCGGGTTT-3'

Experimental Example 14: Construction of a Plasmid Expressing Lactonase

Genomic DNA was prepared from the *Gordonibacter urolithinfaciens* DSM 27213 strain according to a routine method. This genomic DNA was then used as a template, and the lactonase gene (uroH) was amplified by PCR using the primer set below and then inserted into the BamHI and EcoRI sites of the expression vector pET-21b(+) to construct pET21b_UroH.

(SEQ ID NO: 35)
5'-GCCGGATCCCATGGCAGACAACAAGGTCATCGACATCAACATG-3'

(SEQ ID NO: 36)
5'-TATGAATTCCTACAGGTTGAACAGCTTCGCCGCGTTGCCGCC-3'

Experimental Example 15: Expression of Ellagic Acid Transporter in *E. coli*

The *E. coli* Rosetta2 (DE3) strain was transformed with pRSFDuet-1_uroT through the Ca method.

The obtained transformed strain was shaken and cultured at 37° C. for 4 hours in an LB culture medium containing 5 mL of 34 µg/mL chloramphenicol and/or 39 µg/mL kanamycin. IPTG was added to the culture solution to a molar concentration of 1 mM and then subjected to induced culturing at 30° C. for 4 hours.

The obtained culturing solution was centrifuged and washed with 0.85% NaCl to prepare wet bacterial cells.

Experimental Example 16: Expression of Lactonase and Ellagic Acid Transporter with Respect to *E. coli*

The *E. coli* Rosetta2 (DE3) strain was transformed with pET21b_UroH and pRSFDuet-1_uroT through the Ca method.

The obtained transformed strain was shaken and cultured at 37° C. for 4 hours in an LB culture medium containing 5 mL of 34 µg/mL chloramphenicol and/or 39 µg/mL kanamycin. IPTG was added to the culture solution to a molar concentration of 1 mM and then subjected to induced culturing at 30° C. for 4 hours.

The obtained culturing solution was centrifuged and washed with 0.85% NaCl to prepare wet bacterial cells.

Experimental Example 17: Expression of Lactonase with Respect to *E. coli*

The *E. coli* Rosetta2 (DE3) strain was transformed with pET21b_UroH through the Ca method.

The obtained transformed strain was shaken and cultured at 37° C. for 4 hours in an LB culture medium containing 5 mL of 34 µg/mL chloramphenicol and/or 39 µg/mL kanamycin. IPTG was added to the culture solution to a molar concentration of 1 mM and then subjected to induced culturing at 30° C. for 4 hours.

The obtained culturing solution was centrifuged and washed with 0.85% NaCl to prepare wet bacterial cells.

Experimental Example 18-1: Production of Urolithin M5 from Ellagic Acid Using a Transformed Strain The bacterial cells contained in 3 mL of each of the culturing solutions obtained in Experimental Example 15, Experimental Example 16, and Experimental Example 17 were reacted at 37° C. for 4 hours in a 100 mM KPB (pH 6.5) buffer containing 5 mg of ellagic acid, and the amount of urolithin M5 that was produced was determined for each case. Note that the quantitative determination of the urolithin M5 was implemented in the same manner as in Experimental Example 5.

The results are shown in Table 3. Note that the scale factor in Table 3 is a relative value with respect to the production amount of urolithin M5 when only the uroH gene was introduced (Experimental Example 17).

When only the uroT gene was introduced (Experimental Example 15), no urolithin M5 was produced.

When only the uroH gene was introduced (Experimental Example 17), urolithin M5 was produced at a molar concentration of 0.960 mM.

When the uroH gene and the uroT gene were introduced (Experimental Example 16), urolithin M5 was produced at a molar concentration of 1.22 mM, and the production amount of urolithin M5 increased 1.3 times in comparison to the case in which only the uroH gene was introduced (Experimental Example 17).

TABLE 3

| Expression Genes | Urolithin M5 (mM) | Scale Factor |
|---|---|---|
| uroH | 0.960 | 1.0 |
| uroT | 0.000 | 0.0 |
| uroH and uroT | 1.220 | 1.3 |

Experimental Example 18-2: Production of Urolithin M5 from Ellagic Acid Using a Deposited Strain Ellagic acid was added to an ABB culture medium (available from Oxoid Limited) with the final concentration of ellagic acid being 1 g/L, after which the mixture was heated and sterilized, the gas phase was purged with a gas of $N_2$:$CO_2$:$H_2$ (80%/10%/10%), and the resulting product was used as a basal culture medium. The basal culture medium was inoculated with the *Gordonibacter faecihominis* JCM 16058 strain and anaerobically cultured at 37° C. for 14 days.

The amount of urolithins in the culture solution after cultivation was quantitatively determined by the following method.

Urolithins were extracted from 5 mL of the culture solution with an equal amount of ethyl acetate, and the resulting ethyl acetate phase was concentrated under reduced pressure and dried to obtain a solid. The dry solid obtained in this manner was re-dissolved in 0.5 mL of methanol, and the amount of urolithins was quantitatively analyzed through HPLC.

HPLC was performed under the conditions described below.
HPLC Analysis Conditions:
Column: Inertsil ODS-3 (250×4.6 mm) (available from GL Sciences, Inc.)
Eluent: water/acetonitrile/acetic acid=74/25/1
Flow rate: 1.0 mL/min
Column temperature: 40° C.
Detection: 305 nm As a reference sample, urolithins available from DALTON PHARMA were dissolved in DMSO and used. As a result, urolithin M5 was obtained at a molar concentration of 450 µM.

Experimental Example 19-1: Production of Urolithin a from Urolithin C

As a urolithin A precursor, urolithin C was added to an ABB culture medium (available from Oxoid Limited) at an amount to achieve a final concentration of 1 g/L, after which the mixture was heated and sterilized, the gas phase was purged with a gas of $N_2$:$CO_2$:$H_2$ (80%/10%/10%), and the resulting product was used as a basal culture medium. The basal culture medium was inoculated with the *Clostridium bolteae* JCM 12243 strain, the DSM 15670 strain, or the DSM 29485 strain and anaerobically cultured at 37° C. After culturing was completed, urolithins were extracted from 5 mL of the culture solution using an equal amount of ethyl acetate, and the obtained ethyl acetate phase was concentrated under reduced pressure and dried to obtain a solid. The dry solid obtained in this manner was re-dissolved in 0.5 mL of methanol, and the amount of urolithins was quantitatively determined and analyzed through HPLC.

The HPLC conditions were as follows.
<HPLC Conditions>
Column: Inertsil ODS-3 (4.6 mm inner diameter×250 mm length, 5 µm) (available from GL Sciences, Inc.)
Eluent A: 1% formic acid
B: Acetonitrile containing 1% formic acid
Flow rate: 1 mL/min
Column temperature: 40° C.
Detection: UV (305 nm)

Also, as a reference sample, urolithins available from DALTON PHARMA were dissolved in DMSO and used.

As a result, two weeks of culturing resulted in the conversion of 89%, 100%, and 89% of the added urolithin C to urolithin A, respectively for each strain.

Experimental Example 19-2: Production of Urolithin A from Urolithin C

Experimental Example 19-2 was conducted in the same manner as Experimental Example 19-1 with the exception that the *Clostridium asparagiforme* DSM 15981 strain was used and culturing was implemented for five days, and as a result, 95% of the added urolithin C was converted to urolithin A.

Experimental Example 19-3: Production of Urolithin A from Urolithin C

Experimental Example 19-3 was conducted in the same manner as Experimental Example 19-1 with the exception that the *Clostridium citroniae* DSM 19261 strain was used and culturing was implemented for five days, and as a result, 82% of the added urolithin C was converted to urolithin A.

Experimental Example 19-4: Production of Urolithin A from Urolithin C

An ABB culture medium (available from Oxoid Limited) containing 0.1% of ellagic acid (Sigma-Aldrich Corporation) was inoculated with the *Clostridium bolteae* JCM 12243 strain and the *Gordonibacter pamelaeae* DSM 19378 strain, and then cultured in the same manner as in Experimental Example 19-1, and as a result, after two weeks of culturing, 67% of the added ellagic acid was converted to urolithin A.

Experimental Example 19-5: Production of Urolithin A from Urolithin C

Culturing was implemented in the same manner as in Experimental Example 19-4 with the exception that the *Clostridium bolteae* JCM 12243 strain and the *Gordonibacter urolithinfaciens* DSM 27213 strain were used, and as a result, after two weeks of culturing, 62% of the added ellagic acid was converted to urolithin A.

Experimental Example 19-6: Production of Urolithin A from Urolithin C

Culturing was implemented in the same manner as in Experimental Example 19-4 with the exception that the *Clostridium asparagiforme* DSM 15981 strain and the *Gordonibacter urolithinfaciens* DSM 27213 strain were used, and as a result, after 5 days of culturing, 60% of the added ellagic acid was converted to urolithin A.

Experimental Example 19-7: Production of Urolithin A from Urolithin C

Culturing was implemented in the same manner as in Experimental Example 19-4 with the exception that the *Clostridium citroniae* DSM 19261 strain and the *Gordonibacter urolithinfaciens* DSM 27213 strain were used, and as a result, after 5 days of culturing, 60% of the added ellagic acid was converted to urolithin A.

Experimental Example 19-8: Production of Urolithin A from Urolithin C

Urolithin C was added as a substrate to an ABB culture medium (available from Oxide Limited), after which the mixture was heated and sterilized, the gas phase was purged with a gas of $N_2:CO_2:H_2$ (80%/10%/10%), and the resulting product was used as a culture medium. The culture medium containing urolithin C at a final concentration of 1.0 g/L was inoculated with the *Clostridium* sp. DC 3656 (NITE ABP-02708) strain and then anaerobically cultured at 37° C. for 5 days. After the culturing was completed, the culturing solution was analyzed by HPLC under the following conditions.
<HPLC Conditions>
 Column: Inertsil ODS-3 (4.6 mm inner diameter×250 mm length) (available from GL Sciences, Inc.)
 Eluent: water/acetonitrile/acetic acid=74/25/1
 Flow rate: 1.0 mL/min
 Column temperature: 40° C.
 Detection: UV (305 nm)
As a result, urolithin A was produced from urolithin C with a molar yield of 89%.

Experimental Example 19-9: Production of urolithin C from ellagic acid using a deposited strain Ellagic acid was added at a final concentration of 1 g/L to an ABB culture medium (available from Oxoid Limited), after which the mixture was heated and sterilized, the gas phase was purged with a gas of $N_2:CO_2:H_2$ (80%/10%/10%), and the resulting product was used as a basal culture medium. The basal culture medium was then inoculated with the *Eggerthella* sp. DC 3563 (NITE BP-02376) strain and anaerobically cultured for two weeks at 37° C. The amount of urolithins in the culture solution after cultivation was quantitatively determined by the following method.

Urolithins were extracted from 5 mL of the culture solution with an equal amount of ethyl acetate, and the resulting ethyl acetate phase was concentrated under reduced pressure and dried to obtain a solid. The dry solid obtained in this manner was re-dissolved in 0.5 mL of methanol, and the amount of urolithins was quantitatively analyzed through HPLC.

HPLC was performed under the conditions described below.
HPLC Analysis Conditions:
 Column: Inertsil ODS-3 (250×4.6 mm) (available from GL Sciences, Inc.)
 Eluent: water/acetonitrile/acetic acid=74/25/1
 Flow rate: 1.0 mL/min
 Column temperature: 40° C.
 Detection: 305 nm As a reference sample, urolithins available from DALTON PHARMA were dissolved in DMSO and used. As a result, urolithin C was obtained at a molar yield of 90.3% with respect to the added ellagic acid.

Experimental Example 20: Measurement of Lactonase Activity

Genomic DNA derived from the *Gordonibacter urolithinfaciens* DSM 27213 strain was used as a template, and the lactonase gene was cloned by PCR using the following primer set and then inserted into pET-28a(+), and thereby an expression plasmid pET-28a_GuUroH-Histag (N) that can be expressed as a protein with His-tag added to the N-terminal side of lactonase was constructed.

(SEQ ID NO: 37)
5'-GCCGGATCCATGGCAGACAACAAGGTCATCGACATCAACATG-3'

(SEQ ID NO: 38)
5'-TATGAATTCCTACAGGTTGAACAGCTTCGCCGCGTTGCCGCC-3'

The *E. coli* Rosetta2 (DE3) strain was transformed with pET-28a_GuUroH-Histag (N) through the Ca method.

The obtained transformed strain was shaken and cultured at 37° C. for 2.5 hours in an LB culture medium containing 5 mL of 34 µg/mL chloramphenicol and/or 30 µg/mL kanamycin. IPTG was added to the culture solution to a molar concentration of 0.1 mM and then subjected to induced culturing at 30° C. for 7 hours to obtain bacterial cells, and the bacterial cells thereof were then crushed, and a cell-free extract was prepared. The obtained cell-free extract was used to carry out a reaction for 7 hours at 37° C., and the amount of urolithin M5 produced from ellagic acid, which was the raw material (substrate), was quantitatively determined through HPLC. The HPLC conditions were as follows.
<HPLC Conditions>
 Column: Cosmosil 5C18-AR-II (4.6 mm inner diameter× 150 mm length)
 Eluent A: 1% formic acid
  B: Acetonitrile containing 1% formic acid
 Flow rate: 1 mL/min
 Column temperature: 40° C.
 Detection: UV (urolithin M5, 349 nm; urolithin M6, 348 nm; urolithin C, 337 nm)

As a result, the specific activity of the cell-free extract was 15.7 mU/mg-protein. Note that 1 U indicates the activity of catalyzing the production of 1 µmol of urolithin M5 in 1 minute under the conditions described above.

Experimental Example 20-1: Construction of a Vector Expressing an Enzyme that Dehydroxylates the Hydroxyl Group at the 4-Position of Urolithins, and of a Transformed Strain The *Rhodococcus* sp. expression vector pTipQC1 (Hokkaido System Science Co., Ltd.) was digested using the restriction enzymes EcoRI and BamHI, and linearized plasmid was obtained through gel extraction.

The primer sets described in Table 4 were used, and each gene fragment was amplified by PCR using, as a template, genomic DNA of the *Gordonibacter urolithinfaciens* DSM 27213 strain, and each inserted DNA fragment was obtained by gel extraction.

The linearized plasmid and each inserted DNA fragment were connected using NEBuilder HiFi DNA Assembly Mastermix (New England Biolabs Inc.).

TABLE 4

| Primer Set | | |
|---|---|---|
| Constructed Plasmid | Forward Primer | Reverse Primer |
| For pTIpQC1_uroA123 uroA123: | uroA1_f (SEQ ID NO: 39) | uroA3_r (SEQ ID NO: 42) |
| For pTIpQC1_uroA12 uroA12: | uroA1_f (SEQ ID NO: 39) | uroA2_r (SEQ ID NO: 41) |
| For pTIpQC1_uroA1 uroA12: | uroA1_f (SEQ ID NO: 39) | uroA1_r (SEQ ID NO: 40) |

The base sequences of the primers in the table are as follows.

```
uroA1_f:
                                  (SEQ ID NO: 39)
5'-catcaccatatgggaattATGGCCGATTCAGCCCAGGCCCCCGTGCA

GGAG-3' uroA1_r:
                                  (SEQ ID NO: 40)
5'-agagatctaagcttgCTAGTCGGCCTTGCGGATCTTGCACATCATGG

C-3' uroA2_r:
                                  (SEQ ID NO: 41)
5'-agagatctaagcttgCTACGCCTCGTTGATGGCGACGATCATCTGCT

T-3' uroA3_r:
                                  (SEQ ID NO: 42)
5'-agagatctaagcttgTTACCGGTAGATCGGTGTAACTTCGCGCTCCG

C-3'
```

The details of the constructed plasmids in the table are as follows.

pTIpQC1_uroA123 is a plasmid in which GuuroA1, GuuroA2, and GuuroA3 were inserted at the EcoR1 and BamHI sites of pTipQC1.

pTIpQC1_uroA12 is a plasmid in which GuuroA1 and GuuroA2 were inserted at the EcoR1 and BamHI sites of pTipQC1.

pTIpQC1_uroA1 is a plasmid in which GuuroA1 was inserted at the EcoR1 and BamHI sites of pTipQC1.

The vector was cloned using the *E. coli* DH5a strain as a host. Ampicillin was used as a selectable marker.

The produced plasmid was introduced into *Rhodococcus erythropolis* L88 (Hokkaido System Science Co., Ltd.) through electroporation. Chloramphenicol was used as the selectable marker.

The formed colony was cultured in an LB culture medium (20 µg/mL chloramphenicol) (28° C.), and a glycerol stock (30% glycerol) was prepared from the culture solution and stored (−80° C.), and then used to measure heterologous expression and enzyme activity.

Experimental Example 20-2: Expression of Enzyme that Dehydroxylates the Hydroxyl Group at the 4-Position of Urolithins An amount of 5 mL of an LB culture medium containing 20 µg/mL of chloramphenicol was added as a pre-culture to a 10 mL test tube, and then inoculated with the transformed strain and cultured while shaking at 300 rpm and 28° C.

A 50 mL Erlenmeyer flask tube containing 23 mL of an LB culture medium containing 20 µg/mL of chloramphenicol was inoculated with 1 mL of the pre-culturing solution, and then cultured while shaking at 200 rpm and 28° C. for 7 hours, after which 0.1 µg/mL of thiostrepton was added to induce an enzyme for 16 hours.

Bacterial cells were collected by centrifugation (8,000 rpm, 10 min, 4° C.) and then washed twice with physiological saline to form dormant bacterial cells, which were then used in a reaction for measuring enzyme activity.

Experimental Example 20-3: Measuring the Activity of an Enzyme that Dehydroxylates the Hydroxyl Group at the 4-Position of Urolithins A reaction for the measuring activity was carried out under the following conditions.

A reaction solution containing 0.5 mg/mL of urolithin M5 or urolithin M6, 10 mM of reduced nicotinamide adenine dinucleotide phosphate (NADPH), 0.2 mM of flavin adenine dinucleotide (FAD), 10 mM of methyl viologen (MV), and 50 mM of a potassium phosphate buffer (pH 6.5) was reacted in AnaeroPack at 37° C. for 3 h while shaking at 200 spm.

An amount of 100 µL of the reaction solution was added to N,N-dimethylacetamide (DMA) containing 200 µL of 1% formic acid and mixed, after which the centrifuged supernatant was analyzed by HPLC, and the product was quantitatively determined.

The results are presented in Table 5. With the host L88 strain (*R. erythropolis* L88), urolithin M6 could not be detected, but the production of urolithin M6 was confirmed with the transformed strain (*R. erythropolis*_uroA123) containing GuuroA1, GuuroA2 and GuuroA3 and the transformed strain (*R. erythropolis*_uroA12) containing GuuroA1 and GuuroA2. In addition, with the transformed strain (*R. erythropolis*_uroA1) containing only GuuroA1, production of urolithin M6 could not be confirmed.

From these results, it was confirmed that at least GuuroA1 and GuuroA2 are required to produce urolithin M6 from urolithin M5. Also, with the host L88 strain, a host-derived protein may be complementary to the function of GuuroA3.

TABLE 5

| Evaluated Strain | Urolithin M5 (Residual substrate) [mM] | Urolithin M6 (Product) [mM] |
|---|---|---|
| R. erythropolis L88 | 2.60 | Not detected |
| R. erythropolis_uroA123 | 1.85 | 0.90 |
| R. erythropolis_uroA12 | 2.42 | 0.29 |
| R. erythropolis_uroA1 | 2.36 | Not detected |

Experimental Example 21-1: Construction of a Vector Expressing an Enzyme that Dehydroxylates the Hydroxyl Group at the 10-Position of Urolithins, and of a Transformed Strain The Rhodococcus sp. expression vector pTipQC1 (Hokkaido System Science Co., Ltd.) was digested using the restriction enzymes EcoRI and BamHI, and linearized plasmid was obtained through gel extraction.

The primer sets described in Table 6 were used, and each gene fragment was amplified by PCR using, as a template, genomic DNA of the Gordonibacter urolithinfaciens DSM 27213 strain, and each inserted DNA fragment was obtained by gel extraction.

The linearized plasmid and each inserted DNA fragment were connected using NEBuillder HiFi DNA Assembly Mastermix (New England Biolabs Inc.).

TABLE 6

| Primer Set | | |
|---|---|---|
| Constructed Plasmid | Forward primer | Reverse primer |
| For pTipQC1_uroB123 uroB123: | uroB1_f (SEQ ID NO: 43) | uroB3_r (SEQ ID NO: 46) |
| For pTipQC1_uroB12 uroB12: | uroB1_f (SEQ ID NO: 43) | uroB2_r (SEQ ID NO: 45) |
| For pTipQC1_uroB1 uroB1: | uroB1_f (SEQ ID NO: 43) | uroB1_r (SEQ ID NO: 44) |

The primer sequences in the table are as follows.

```
uroB1_f:
                                        (SEQ ID NO: 43)
5'-catcaccatatgggaattATGGTAGAGAACGCTGTCGCGGAGAAGGA
CC-3' uroB1_r:
                                        (SEQ ID NO: 44)
5'-agagatctaagcttgTTACAGTTCCTCCTCCTTGCAGCGGTACACCT
T-3' uroB2_r:
                                        (SEQ ID NO: 45)
5'-agagatctaagcttgCTACGCGCAGGGCGGCACCCACAGGTACTGCT
G-3' uroB3_r:
                                        (SEQ ID NO: 46)
5'-agagatctaagcttgCTAGCCCTTCTTCGCTGGCACGGGGTCCCGCT
C-3'
```

The details of the constructed plasmids in the table are as follows.

pTIpQC1_uroB123 is a plasmid in which GuuroB1, GuuroB2, and GuuroB3 were inserted at the EcoR1 and BamHI sites of pTipQC1.

pTIpQC1_uroB12 is a plasmid in which GuuroB1 and GuuroB2 were inserted at the EcoR1 and BamHI sites of pTipQC1.

pTIpQC1_uroB1 is a plasmid in which GuuroB1 was inserted at the EcoR1 and BamHI sites of pTipQC1.

The vector was cloned using the E. coli DH5a strain as a host. Ampicillin was used as a selectable marker.

The produced plasmid was introduced into Rhodococcus erythropolis L88 (Hokkaido System Science Co., Ltd.) through electroporation. Chloramphenicol was used as the selectable marker.

The formed colony was cultured in an LB culture medium (20 µg/mL chloramphenicol) (28° C.), and a glycerol stock (30% glycerol) was prepared from the culture solution and stored (−80° C.), and then used to measure heterologous expression and enzyme activity.

Experimental Example 21-2: Expression of Enzyme that Dehydroxylates the Hydroxyl Group at the 10-Position of Urolithins An amount of 5 mL of an LB culture medium containing 20 µg/mL of chloramphenicol was added as a pre-culture to a 10 mL test tube, and then inoculated with the transformed strain and cultured while shaking at 300 rpm and 28° C. for 2 to 3 days.

A 50 mL Erlenmeyer flask tube containing 25 mL of an LB culture medium containing 20 µg/mL of chloramphenicol was inoculated with 1% of the pre-culturing solution, and then cultured while shaking at 200 rpm and 28° C. for 7 hours, after which 0.2 µg/mL of thiostrepton was added to induce an enzyme for 48 hours.

Bacterial cells were collected by centrifugation (8,000 rpm, 10 min, 4° C.) and washed twice with a physiological saline solution to form dormant bacterial cells, which were then used in a reaction for measuring enzyme activity.

Experimental Example 21-3: Measuring the Dehydroxylation Activity of Bacterial Cells that Dehydroxylate the Hydroxyl Group at the 10-Position of Urolithins A reaction for the measuring activity was carried out under the following conditions.

A reaction solution containing 0.5 mg/mL of urolithin M6, 10 mM of methyl viologen (MV), 2 mg/mL of sodium hyposulfite, 2 mg/mL of sodium bicarbonate, and 50 mM of a potassium phosphate buffer (pH 6.5) was reacted in AnaeroPack at 37° C. for 12 h while shaking at 200 spm.

An amount of 100 µL of the reaction solution was added to N,N-dimethylacetamide (DMA) containing 200 µL of 1% formic acid and mixed, after which the centrifuged supernatant was analyzed by HPLC, and the product was quantitatively determined.

Figure 7:
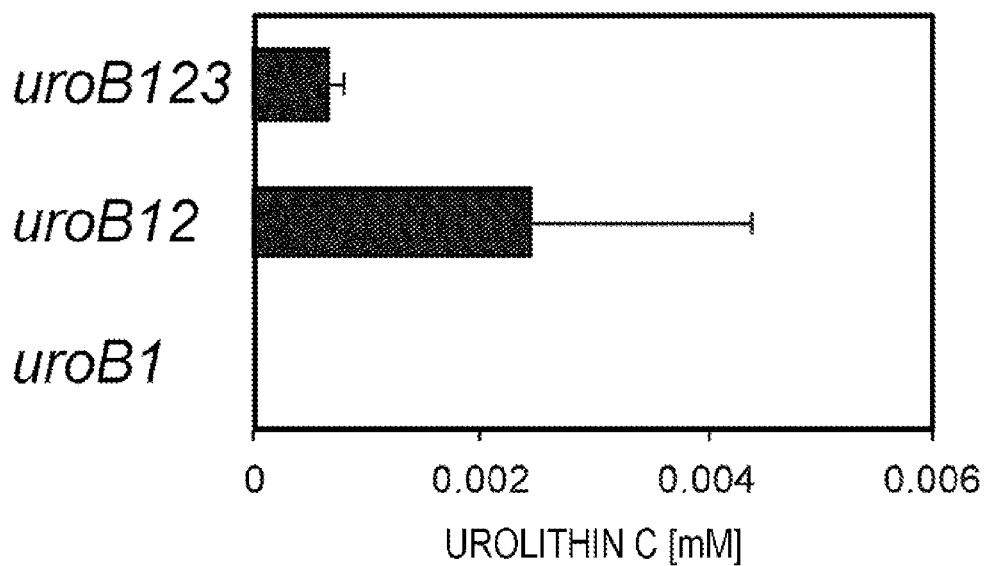
FIG. 7 is a graph illustrating the dehydroxylation activity of bacterial cells that dehydroxylate the hydroxyl group at the 10-position of urolithins in one experimental example of the present disclosure.

The results are presented in FIG. 7. With the host L88 strain (R. erythropolis L88), urolithin C could not be detected, but the production of urolithin M6 was confirmed with the transformed strain (R. erythropolis_uroB123, uroB123 in FIG. 7) containing GuuroB1, GuuroB2 and GuuroB3 and the transformed strain (R. erythropolis_uroB12, uroB12 in FIG. 7) containing GuuroB1 and GuuroB2. In addition, with the transformed strain (R. erythropolis_uroA1, uroB1 in FIG. 7) containing only GuuroB1, production of urolithin C could not be confirmed.

From these results, it was confirmed that at least GuuroB1 and GuuroB2 are required to produce urolithin C from urolithin M6. Also, with the host L88 strain, a host-derived protein may be complementary to the function of GuuroB3.

Experimental Example 22-1: Production of an Enzyme that Dehydroxylates the Hydroxyl Group at the 10-Position of Urolithins 20 mL of a modified GAM culture medium (Nissui Pharmaceutical Co., Ltd.) containing 0.1 mg/mL of ellagic acid was inoculated with the *Gordonibacter urolithinfaciens* DSM 27213 strain and cultured at 37° C. for 5 to 6 days while shaking. In addition, 1.75 L of the same culture medium was inoculated with 10 mL of the obtained pre-culturing solution and then cultured at 37° C. for 7 to 9 days while shaking.

Bacterial cells were collected by centrifugation and washed twice with physiological saline, and washed bacterial cells were obtained.

Experimental Example 22-2: Partial Purification of an Enzyme that Dehydroxylates the Hydroxyl Group at the 10-Position of Urolithins Washed bacterial cells were suspended in a buffer and crushed by ultrasonic waves for 40 minutes.

A supernatant obtained by centrifuging (8,500 rpm, 30 minutes, 4° C.) the solution of crushed cells and then further subjecting to high-speed centrifuging (20,000 g, 60 min, 4° C.) was used as a cell-free extract.

The cell-free extract was then subjected to ultra-centrifugation (100,000 g, 110 min, 4° C.), and the supernatant thereby obtained was used as an ultra-centrifuged supernatant fraction. This ultra-centrifuged supernatant fraction was then used in an analysis of the following scientific properties of the enzyme.

Experimental Example 23-1: Method for Measuring the Activity of the Enzyme that Dehydroxylates the Hydroxyl Group at the 10-Position of Urolithins For the ultra-centrifuged supernatant fraction obtained in Experimental Example 22-2, the activity of dehydroxylating the hydroxyl group at the 10-position of urolithins was measured. Urolithin M6 was used as the urolithin having a hydroxyl group at the 10-position. When the hydroxyl group at the 10-position is dehydroxylated, urolithin C is produced.

An amount of 20 µL of a reaction solution for measuring enzyme activity was inserted into a 200 µL tube for PCR with the reaction solution containing 0.5 mg/mL of urolithin M6, 10 mM of NADPH (reduced nicotinamide adenine dinucleotide phosphate), 0.2 mM of FAD (flavin adenine dinucleotide), 10 mM of MV (methyl viologen), 50 mM of KPB (potassium phosphate buffer, pH 6.5) and a fraction obtained in Experimental Example 22-1. The gas phase was set to the gas phase in the anaerobic chamber (Vinyl Anaerobic Chamber available from Coy Labs), and the materials were reacted at 37° C. for 120 minutes. Next, after the reaction was completed, 40 µL of N,N-dimethylacetamide containing 1% formic acid was added to the reaction solution and mixed, after which the supernatant of centrifugation was analyzed by HPLC.

HPLC was carried out under the following conditions, and the resulting urolithin C was quantitatively determined (detection wavelength: 348 nm).

<HPLC Conditions>
Column: COSMOSIL 5C18-ARII (4.6 mm inner diameter×150 mm length, available from Nacalai Tesque, Inc.)
Eluent: ultrapure water (Milli Q water)/acetonitrile ($CH_3CN$)/formic acid=80/20/1
Flow rate: 1.0 mL/min
Temperature: 40° C.
Detection: PDA (photodiode array) (The urolithin C was measured by UV absorption at 337 nm.)

The results of this experimental example correspond to the results listed for No. 9 in Table 7 for Experimental Example 23-2.

Experimental Example 23-2: Effect of Cofactors on the Activity of Enzymes that Dehydroxylate the Hydroxyl Group at the 10-Position of Urolithins The enzyme solution obtained in Experimental Example 22-2 was used, cofactors of the concentrations described in Table 7 were added to a reaction solution obtained by removing NADPH, FAD, and MV from the reaction solution for measuring enzyme activity described in Experimental Example 23-1, and the mixture was reacted, after which the produced urolithin C was quantitatively determined.

With the amount of urolithin C produced under the conditions indicated for No. 9 in Table 7 (10 mM of MV, 10 mM of NADPH, 0.2 mM of FAD) considered to be 100%, the amount of urolithin C produced under each condition was expressed as a relative activity. Note that in the following experimental examples, the conditions shown in No. 9 in Table 7 were used as standard activity measurement conditions.

TABLE 7

| | Cofactors (W) | | | | | |
|---|---|---|---|---|---|---|
| No. | NADH | NADPH | FAD | FMN | MV | Relative Activity |
| 1 | — | — | — | — | — | 0.0% |
| 2 | — | — | — | — | 10 | 0.0% |
| 3 | 10 | — | — | — | 10 | 24.7% |
| 4 | — | 10 | — | — | 10 | 40.3% |
| 5 | — | — | 0.2 | — | 10 | 0.0% |
| 6 | — | — | — | 0.2 | 10 | 0.0% |
| 7 | 10 | — | 0.2 | — | 10 | 43.3% |
| 8 | 10 | — | — | 0.2 | 10 | 52.7% |
| 9 | — | 10 | 0.2 | — | 10 | 100% |
| 10 | — | 10 | — | 0.2 | 10 | 28% |

Experimental Example 24: Temperature Dependency of Enzymes that Dehydroxylate the Hydroxyl Group at the 10-Position of Urolithins Under the standard activity measurement conditions described in Experimental Example 23-2, the reaction temperature was changed, and the activity was measured.

Figure 8:
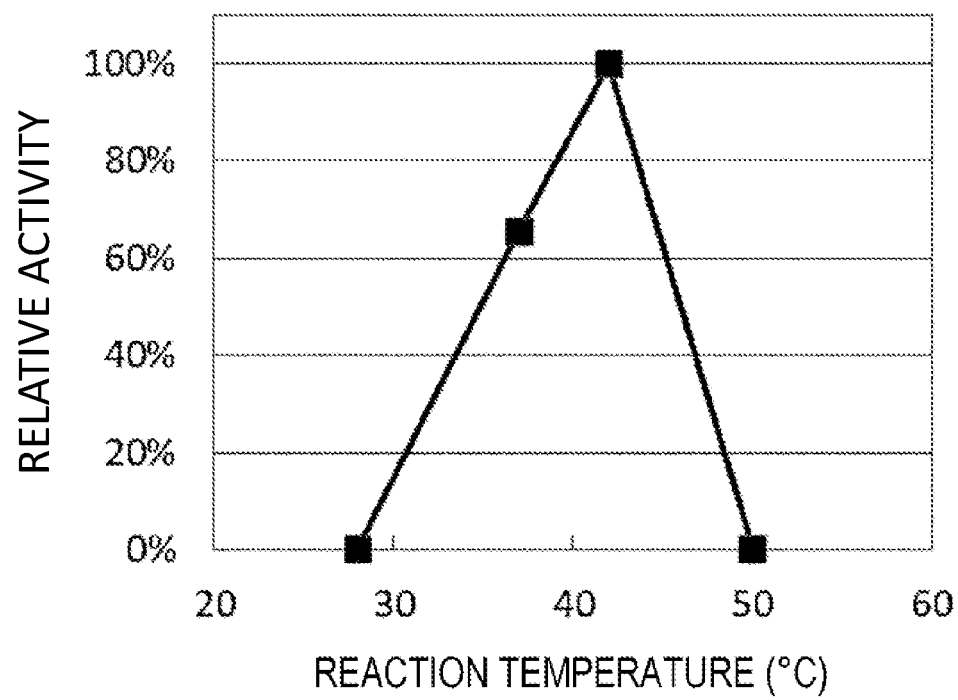
FIG. 8 is a graph illustrating the temperature dependency of an enzyme that dehydroxylates the hydroxyl group at the 10-position of urolithins in one experimental example of the present disclosure.

The results are illustrated in FIG. 8. The optimum temperature was 42° C.

Experimental Example 25: pH Dependency of Enzymes that Dehydroxylate the Hydroxyl Group at the 10-Position of Urolithins Under the standard activity measurement conditions described in Experimental Example 23-2, the pH was changed using the following buffer, and the activity was measured.

Figure 9:
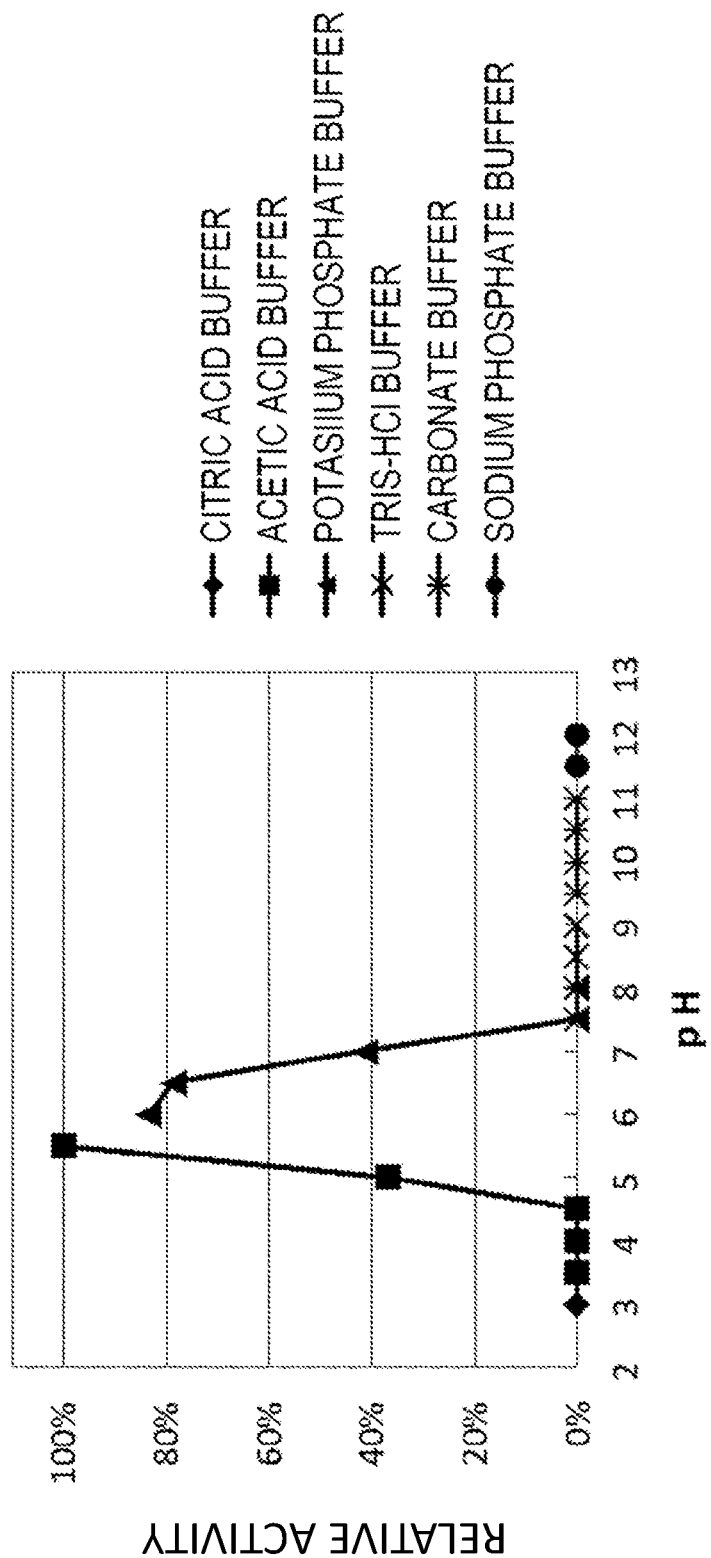
FIG. 9 is a graph illustrating the pH dependency of enzymes that dehydroxylate the hydroxyl group at the 10-position of urolithins in one experimental example of the present disclosure.

Citric acid buffer: 50 mM citric acid-sodium citrate buffer
Acetic acid buffer: 50 mM acetic acid-sodium acetate buffer
Potassium phosphate buffer: 50 mM $K_2HPO_4$—$KH_2PO_4$ buffer
Tris-HCl buffer: 50 mM Tris-hydrochloride buffer
Carbonate buffer: 50 mM $Na_2CO_3$—$NaHCO_3$ buffer
Sodium phosphate buffer: 50 mM $Na_3PO_4$—$Na_2HPO_4$ buffer The results are illustrated in FIG. 9. The optimum pH was 5.5.

Experimental Example 26: Production of Urolithin C from Urolithin M5 Using a Deposited Strain Urolithin M5 was added to an ABB culture medium (available from Oxoid Limited) at an amount to achieve a final concentration of 3.3 mM, after which the mixture was heated and sterilized, the gas phase was purged with a gas of $N_2$:$CO_2$:$H_2$ (80%/10%/10%), and the resulting product was used as a basal culture medium. The basal culture medium was inoculated with the *Gordonibacter urolithinfaciens* DSM 27213 strain and anaerobically cultured at 37° C. After culturing was completed, an equivalent amount of DMSO was added to 1 mL of the culturing solution to dissolve the urolithins, and the urolithins were subjected to a quantitative analysis by HPLC.

HPLC was implemented under the conditions described below.

HPLC Conditions:
   Column: Inertsil ODS-3 (φ4.6 mm×250 mm, 5 μm) (available from GL Sciences, Inc.)
   Eluent A: 1% formic acid
      B: Acetonitrile containing 1% formic acid
   Flow rate: 1 mL/min
   Column temperature: 40° C.
   Detection: UV (305 nm)

As a result, 0.0707 mM of urolithin C was produced by culturing for 14 days.

---

The invention claimed is:

1. A recombinant vector for expression in a microorganism comprising a polynucleotide consisting essentially of:
(a) a first base sequence consisting of SEQ ID NO: 7, and a second base sequence consisting of SEQ ID NO: 8; or
(b) a first base sequence consisting of SEQ ID NO: 7, a second base sequence consisting of SEQ ID NO: 8, and a third base sequence consisting of SEQ ID NO: 9; or
(c) a fourth base sequence consisting of SEQ ID NO: 19, and a fifth base sequence consisting of SEQ ID NO: 20; or
(d) a fourth base sequence consisting of SEQ ID NO: 19, a fifth base sequence consisting of SEQ ID NO: 20, and a sixth base sequence consisting of SEQ ID NO: 21.

2. A microbial transformant,
(a) in which a polynucleotide is expressively retained, wherein the polynucleotide consists essentially of:
(a-1) a first base sequence consisting of SEQ ID NO: 7, and a second base sequence consisting of SEQ ID NO: 8; or
(a-2) a first base sequence consisting of SEQ ID NO: 7, a second base sequence consisting of SEQ ID NO: 8, and a third base sequence consisting of SEQ ID NO: 9; or
(a-3) a fourth base sequence consisting of SEQ ID NO: 19, and a fifth base sequence consisting of SEQ ID NO: 20; or
(a-4) a fourth base sequence consisting of SEQ ID NO: 19, a fifth base sequence consisting of SEQ ID NO: 20, and a sixth base sequence consisting of SEQ ID NO: 21; or
(b) in which the vector according to claim 1 is expressively retained.

3. The microbial transformant according to claim 2, wherein the transformant is a transformed microorganism belonging to the genus *Rhodococcus*.

4. The recombinant vector according to claim 1, wherein the vector is expressed in a bacteria.

5. The microbial transformant according to claim 2, wherein the transformant is a transformed bacteria.

6. The recombinant vector according to claim 1, wherein the vector is expressed in a microorganism belonging to the genus *Rhodococcus*.

* * * * *